United States Patent
Coenegracht et al.

(10) Patent No.: US 12,292,612 B2
(45) Date of Patent: May 6, 2025

(54) CABLE FIXATION DEVICES AND ARRANGEMENTS WITH IMPROVED INSTALLATION AND SPACE UTILIZATION AT TELECOMMUNICATIONS ENCLOSURES

(71) Applicant: COMMSCOPE TECHNOLOGIES LLC, Hickory, NC (US)

(72) Inventors: Philippe Coenegracht, Hasselt (BE); Ward Declercq, Antwerp (BE); Samory De Zitter, Mechelen (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 18/531,924

(22) Filed: Dec. 7, 2023

(65) Prior Publication Data
US 2024/0168251 A1    May 23, 2024

Related U.S. Application Data

(63) Continuation of application No. 17/798,231, filed as application No. PCT/US2021/017678 on Feb. 11, 2021, now Pat. No. 11,867,872.

(60) Provisional application No. 62/972,864, filed on Feb. 11, 2020.

(51) Int. Cl.
*G02B 6/44* (2006.01)
(52) U.S. Cl.
CPC ................. *G02B 6/4477* (2013.01)
(58) Field of Classification Search
None
See application file for complete search history.

(56) References Cited

U.S. PATENT DOCUMENTS

| | | |
|---|---|---|
| 4,991,928 A | 2/1991 | Zimmer |
| 5,048,920 A | 9/1991 | Newell |
| 5,820,082 A | 10/1998 | Wright |
| 5,835,660 A | 11/1998 | Jung et al. |
| 6,504,986 B1 | 1/2003 | Wambeke et al. |
| 7,254,307 B2 | 8/2007 | Xin |
| 7,783,152 B2 | 8/2010 | Knorr et al. |
| 8,538,227 B2 | 9/2013 | Cowen et al. |
| 8,903,216 B2 | 12/2014 | Thompson et al. |
| 10,379,310 B2 * | 8/2019 | Aznag ............... G02B 6/4446 |
| 11,422,327 B2 | 8/2022 | Bryon et al. |

(Continued)

FOREIGN PATENT DOCUMENTS

| | | |
|---|---|---|
| CN | 1169543 A | 1/1998 |
| CN | 107111092 A | 8/2017 |

(Continued)

OTHER PUBLICATIONS

Extended European Search Report for corresponding EP Appln. 21754682.9, dated Jan. 23, 2024 (7 pages).

(Continued)

*Primary Examiner* — Jerry Rahll
(74) *Attorney, Agent, or Firm* — Merchant & Gould P.C.

(57) ABSTRACT

Devices, arrangements and methods for fixing telecommunications cables relative to a telecommunications closure. Features of the devices and arrangements can make more efficient use of an interior closure volume and enhance a closure's capabilities with respect to handling different types of telecommunications cables and optical fiber routing schemes.

18 Claims, 52 Drawing Sheets

(56) References Cited

U.S. PATENT DOCUMENTS

| | | |
|---|---|---|
| 11,841,543 B2 | 12/2023 | Cams et al. |
| 11,867,872 B2 | 1/2024 | Coenegracht et al. |
| 2006/0228087 A1 | 10/2006 | Bayazit et al. |
| 2007/0047897 A1 | 3/2007 | Cooke et al. |
| 2008/0170832 A1 | 7/2008 | Mullaney et al. |
| 2008/0236861 A1 | 10/2008 | Bartholoma et al. |
| 2009/0211219 A1 | 8/2009 | Buchmüller |
| 2010/0054689 A1 | 3/2010 | Mullaney et al. |
| 2010/0092147 A1* | 4/2010 | Desard .............. G02B 6/4477 385/136 |
| 2010/0183270 A1 | 7/2010 | Davis et al. |
| 2012/0230646 A1 | 9/2012 | Thompson et al. |
| 2012/0288248 A1 | 11/2012 | Chapa Ramirez et al. |
| 2013/0209052 A1 | 8/2013 | Subhash et al. |
| 2014/0079366 A1 | 3/2014 | Rodriguez et al. |
| 2014/0112628 A1 | 4/2014 | Keenum et al. |
| 2015/0378106 A1 | 12/2015 | Allen et al. |
| 2016/0134092 A1 | 5/2016 | Bonvallat et al. |
| 2018/0157002 A1* | 6/2018 | Bishop .............. H02G 15/013 |
| 2020/0233152 A1* | 7/2020 | Prevratil ........... G02B 6/4455 |
| 2021/0208356 A1 | 7/2021 | Collart et al. |
| 2022/0120975 A1 | 4/2022 | Geens et al. |
| 2022/0196959 A1 | 6/2022 | Cams et al. |

FOREIGN PATENT DOCUMENTS

| | | |
|---|---|---|
| DE | 3726719 A1 | 2/1989 |
| DE | 200 12 572 U1 | 2/2001 |
| EP | 1 020 750 A2 | 7/2000 |
| EP | 1 139 127 A2 | 10/2001 |
| EP | 2 148 231 A1 | 1/2010 |
| EP | 2 647 095 B1 | 8/2014 |
| EP | 3 032 304 B1 | 11/2018 |
| JP | H09-304631 A | 11/1997 |
| JP | 2004212840 A | 7/2004 |
| KR | 10-0952825 B1 | 4/2010 |
| KR | 10-2017-0009550 A | 1/2017 |
| WO | 00/75704 A1 | 12/2000 |
| WO | 02/073281 A1 | 9/2002 |
| WO | 02/097505 A1 | 12/2002 |
| WO | 2008/118927 A1 | 10/2008 |
| WO | 2009/040566 A1 | 4/2009 |
| WO | 2009/106874 A1 | 9/2009 |
| WO | 2012/121955 A1 | 9/2012 |
| WO | 2013/037746 A1 | 3/2013 |
| WO | 2013/149857 A1 | 10/2013 |
| WO | 2013/149922 A1 | 10/2013 |
| WO | 2013/174992 A1 | 11/2013 |
| WO | 2014/173439 A1 | 10/2014 |
| WO | 2015/028619 A2 | 3/2015 |
| WO | 2016/000901 A1 | 1/2016 |
| WO | 2017/114936 A1 | 7/2017 |
| WO | 2018/154125 A1 | 8/2018 |
| WO | 2018/192917 A1 | 10/2018 |
| WO | 2019/034613 A1 | 2/2019 |
| WO | 2019/072782 A1 | 4/2019 |
| WO | 2019/072852 A1 | 4/2019 |
| WO | 2019/160995 A1 | 8/2019 |
| WO | 2019/241502 A1 | 12/2019 |
| WO | 2020/104395 A1 | 5/2020 |
| WO | 2020/154418 A1 | 7/2020 |
| WO | 2020/212365 A1 | 10/2020 |
| WO | 2020/219571 A1 | 10/2020 |
| WO | 2021/011386 A1 | 1/2021 |
| WO | 2021/055282 A1 | 3/2021 |
| WO | 2021/055285 A1 | 3/2021 |
| WO | 2021/055356 A1 | 3/2021 |

OTHER PUBLICATIONS

ARS Cable Anchor Bracket, Prysmian Group, AC001(8): 1-2 (Apr. 2012).

FIST-GB2 Installation Instruction, FIST-Generic Box, Tyco Electronics Raychem NV, 1-28 (2001).

International Search Report and Written Opinion of the International Searching Authority for International Patent Application No. PCT/US2021/017678 mailed Jun. 25, 2021, 15 pages.

* cited by examiner

CABLE FIXATION DEVICES AND ARRANGEMENTS WITH IMPROVED INSTALLATION AND SPACE UTILIZATION AT TELECOMMUNICATIONS ENCLOSURES

CROSS-REFERENCE TO RELATED APPLICATION

This application is a continuation of U.S. application Ser. No. 17/798,231, filed Aug. 8, 2022, now U.S. Pat. No. 11,867,872, which is a National Stage Application of PCT/US2021/017678, filed on Feb. 11, 2021, which claims the benefit of U.S. Patent Application Ser. No. 62/972,864, filed on Feb. 11, 2020, the disclosures of which are incorporated herein by reference in their entirety. To the extent appropriate, a claim of priority is made to each of the above disclosed applications.

TECHNICAL FIELD

The present disclosure relates to telecommunications enclosures, and more particularly to devices and arrangements for fixing portions of telecommunications cables to telecommunications enclosures.

BACKGROUND

Telecommunications systems typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, wave division multiplexers, fiber management trays, cable organizing and routing components, etc.

It is often preferred for telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to reseal the enclosures. Other telecommunications enclosures take the form of elongated sleeves formed by wrap around covers or half-shells having longitudinal edges that are joined by clamps or other retainers. Still other telecommunications enclosures include two half-pieces that are joined together through clamps, wedges or other structures.

In certain applications, the enclosure/housing needs to be water and contaminant (e.g., dust) proof or water-resistant. In particular, water, moisture, cleaning fluids, dust etc., present at the exterior of the housing/enclosure should be prevented by the housing/enclosure from reaching components within the interior of the enclosure/housing. To provide such protection, enclosures can include a seal (e.g., a gel seal) around the perimeter of the enclosure or portions of the perimeter of the enclosure. One or more sealing blocks (e.g., gel blocks) housed in one of the housing pieces can be compressed against corresponding sealing blocks in another housing piece to form a seal therebetween. To accommodate cables or entering the enclosure through ports in the enclosure wall, corresponding sealing blocks positioned at the port locations of the enclosure can include sealing blocks that define cable passages such that the sealing blocks can be compressed around the cable forming a seal.

Typically, cables entering telecommunications enclosures must be fixed in place inside the enclosure. Within the closure, and depending on the type of cable, protective components of the cable, such as a jacket, a buffer tube, strength members, etc., are stripped, truncated, or removed, allowing the optical fibers held by the cable to be managed within the closure.

SUMMARY

In general terms, the present disclosure is directed to improvements in the fixation of cables at telecommunications closures.

Devices and arrangements according to the present disclosure can increase fiber management capabilities at a telecommunications closure having a given external profile.

Fiber management capabilities can include the number of fibers that can be managed at the telecommunications closure, as well as the types of cables managed at the telecommunications closure.

A given telecommunications closure is configured to route fibers from one or more provider side telecommunications cables to one or more subscriber side telecommunications cables. The cables enter the closure, typically through sealed ports defined by the closure, and the fibers of those cables are then managed within the interior volume of the closure by a technician. Fiber management can include, for example, fiber storage (typically in loops or portions of loops), splicing, splitting, wave division multiplexing, indexing, and so forth.

The particular fiber management needs for a given closure can change over time, requiring cables and cable fixation components to be swapped for others.

A given telecommunications closure can support one or more of: feeder cables, branch cables, connectorized and non-connectorized drop (or distribution) cables, loose fibers, fiber ribbons, etc. Some cables that enter a telecommunications closure include rigid strength rods that must be fixed relative to the closure. Some cables that enter a telecommunications closure include strength yarn, e.g., made from aramid fibers, that must be fixed relative to the closure. Some fibers are spliced to other fibers at splices that are supported within the closure. The optical fibers of connectorized drop cables are terminated at optical fiber connectors. The connectors at some drop cables can be connected to other connectorized fibers at panels (or banks) of adapters mounted within the closure.

The portions of the cables that enter the closure through the closure ports are typically jacketed with outer protective jackets. Seal blocks positioned at the cable ports seal around the outer jackets of the cables. For feeder and drop cables, the bare fibers are exposed within the closure by stripping the outer jacket, and a remaining end portion of the outer jacket is fixed to cable fixation assemblies within the closure. Exposed aramid yarn and/or rigid strength rods of such cables are also anchored within the closure, often to the same cable fixation assembly as the outer jacket. Fixation of cables and strength members relative to the closure can help to avoid fiber breakage and disruption of the closure seal due to lateral loads on the cables.

For connectorized cables (such as cables connectorized with LC-form factor, SC-form factor, MPO-form factor, or other form factor connectors), in some examples the outer jacket will be continuous all the way to the connector such that there is no need to anchor strength yarn with respect to the closure. To minimize the amount of space needed to assemble a panel of connectorized cables within a closure, it can be desirable to minimize the amount of cable slack that is stored within the closure. However, reducing the amount of slack of the drop cables can make it more challenging to fix the outer jackets of the drop cables relative to the closure. Aspects of the present disclosure relate to devices that facilitate fixation of connectorized drop cables after they have been connected to an adapter panel or parking panel supported by a closure. A parking panel is a bank of adapter like structures that receive fiber optic connectors for storage but do not include structures for optically connecting the connectors to other connectors. The parked connectors are stored at the parking panel it they are needed for active signal connections.

Different regions of a closure volume can be set up for different types of cable fixation and fiber management. For example, a closure can include a main support structure that can support feeder cable fixation on one side of the structure and connectorized and non-connectorized drop cables on the opposite side.

Aspects of the present disclosure relate to features of a main support structure of a telecommunications closure that can enhance the support structure's versatility in handling different types of cables and cable fixations.

Aspects of the present disclosure relate to cable fixation assemblies and components with improved features that enhance versatility and help to maximize available space within a telecommunications closure, thereby allowing the overall external profile of a given closure to be reduced in size.

The contents of International PCT Publication No. WO2020/154418 filed Jan. 22, 2020 and International Publication No. WO2019/160995 filed Feb. 13, 2019 are hereby incorporated by reference in their entireties.

In accordance with certain specific aspects of the present disclosure, a cable fixation assembly, comprises: a first cable fixation body mountable at a first cable entry opening defined by a main support structure of a telecommunications closure, the first cable fixation body including a first cable support wall and a first mounting member; and a second cable fixation body couplable to the mounting member, the second cable fixation body including a second cable support wall, wherein when the first cable fixation body is coupled to the main support structure and the second cable fixation body is coupled to the first mounting member of the first cable fixation body, the first and second cable support walls are positioned to support a pair of cables passing through the first cable entry opening in a vertically offset arrangement.

In accordance with further aspects of the present disclosure, cable fixation assembly, comprises: a main support structure configured to be positioned within an interior volume of a telecommunications closure, the main support structure extending from a proximal end to a distal end along a first axis, from a first side to a second side along a second axis perpendicular to the first axis, and from a top to a bottom along a vertical axis that is perpendicular to the first and the second axes, the first and second axes defining a horizontal plane, the main support structure including a wall dividing the main support structure into an upper region above an upper horizontal surface of the wall and a lower region below a lower horizontal surface of the wall, the upper horizontal surface facing upward and the lower horizontal surface facing downward, the upper horizontal surface defining a first cable fixation area of the upper region, the lower horizontal surface defining a second cable fixation area of the lower region, wherein the upper horizontal surface is configured to lockingly mount a slotted base plate subassembly, the slotted base plate subassembly configured to lockingly mount one or more first cable fixation bodies; and wherein the lower horizontal surface is configured to lockingly mount one or more second cable fixation bodies configured differently from the first cable fixation bodies.

In accordance with further aspects of the present disclosure, base plate assembly for mounting one or more cable fixation bodies, the base plate assembly extending from a proximal end to a distal end along a first axis, from a first side to a second side along a second axis perpendicular to the first axis, and from a top to a bottom along a vertical axis that is perpendicular to the first and the second axes, the first and second axes defining a horizontal plane, the base plate assembly comprising: a plate member including a plurality of through slots for receiving hooked members of a cable fixation body, the plate member further defining a cavity; a spring element coupled to the plate member that cooperates with one of the through slots to lock the hooked members to the plate member; a proximally positioned foot member and a distally positioned foot member a bar spanning a dimension of the cavity; and a clip having a pair of clip arms, the clip configured to snappingly engage the bar such that at least one of the clip arms extends below the bar and below a bottom surface of the plate member.

According to further aspects of the present disclosure, a cable fixation body extending from a proximal end to a distal end along a first axis, from a first side to a second side along a second axis perpendicular to the first axis, and from a top to a bottom along a vertical axis that is perpendicular to the first and the second axes, the first and second axes defining a horizontal plane, the cable fixation body comprises: a main body defining a cable support surface and including a cable jacket fixation portion and a strength member fixation portion, the cable jacket fixation portion being configured to couple to a cable jacket clamp; a first foot member positioned at a proximal-most end of the main body; and a second foot member positioned distally from the first foot member, wherein the main body defines a fin slot open at the top of the main body and extending downwardly from the top of the main body.

According to further aspects of the present disclosure, an assembly comprises: a cable fixation body extending from a proximal end to a distal end along a first axis, from a first side to a second side along a second axis perpendicular to the first axis, and from a top to a bottom along a vertical axis that is perpendicular to the first and the second axes, the first and second axes defining a horizontal plane, including: a main body defining a cable support surface and including a cable jacket fixation portion and a strength member fixation portion, the cable jacket fixation portion being configured to couple to a cable jacket clamp, the main body defining a pair of tracks on either side of a recess, the tracks and the recess being elongate parallel to the second axis; and a strength member fixation subassembly including: a first strength member clamp body configured to couple to and slide along the tracks to adjust a position of the strength member fixation subassembly relative to the second axis; a second strength member clamp body including a press pin; and a press plate, the first and second strength member clamp bodies and the press plate configured to cooperate to press a strength member of a fiber optic cable between the first strength member clamp body and the press plate with the press pin pressing the press plate toward the first strength member clamp body.

According to further aspects of the present disclosure, an assembly comprises: a cable fixation body extending from a proximal end to a distal end along a first axis, from a first side to a second side along a second axis perpendicular to the first axis, and from a top to a bottom along a vertical axis that is perpendicular to the first and the second axes, the first and second axes defining a horizontal plane, including: a main body defining a cable support surface and including a cable jacket fixation portion and a strength member fixation portion, the cable jacket fixation portion being configured to couple to a cable jacket clamp; and a strength member fixation subassembly including: a first strength member clamp body including a ramp inclined downward as the ramp extends distally, and a first clamp surface positioned below the ramp; and a second strength member clamp body including a second clamp surface, the second strength member clamp body being configured to couple to and slide distally down the ramp to press a strength member of a fiber optic cable between the first and second clamp surfaces.

According to further aspects of the present disclosure, an assembly comprises: a cable fixation body extending from a proximal end to a distal end along a first axis, from a first side to a second side along a second axis perpendicular to the first axis, and from a top to a bottom along a vertical axis that is perpendicular to the first and the second axes, the first and second axes defining a horizontal plane, including: a main body defining a cable support surface and including a cable jacket fixation portion and a strength member fixation portion, the cable jacket fixation portion being configured to couple to a cable jacket clamp; and a strength member fixation subassembly including: a strength member clamp body configured to adjustably couple to the main body.

According to further aspects of the present disclosure, a base plate assembly for mounting one or more cable fixation bodies, comprises: a plate member defining a plurality of through slots configured to receive hooked members of a cable fixation body; a spring element positioned in one of the through slots configured to cooperate with the one of the through slots to lock the hooked members to the plate member; and a stop wall positioned in the one of the through slots to inhibit flexion of the spring element.

According to further aspects of the present disclosure, a cable fixation assembly, comprises: a cable fixation body, including: a jacket clamp portion; and an arrangement of at least three posts for winding strength yarn of a cable, each of the posts projecting from a fixed end of the post to a free end of the post, the at least three posts projecting to their free ends in mutually different projection directions one from another relative to a reference plane that is parallel to the projection directions.

According to further aspects of the present disclosure, A cable fixation assembly comprises: a cable fixation body, including a jacket clamp portion; and a jacket clamp support pivotally coupled with a hinge to the cable fixation body at the jacket clamp portion.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
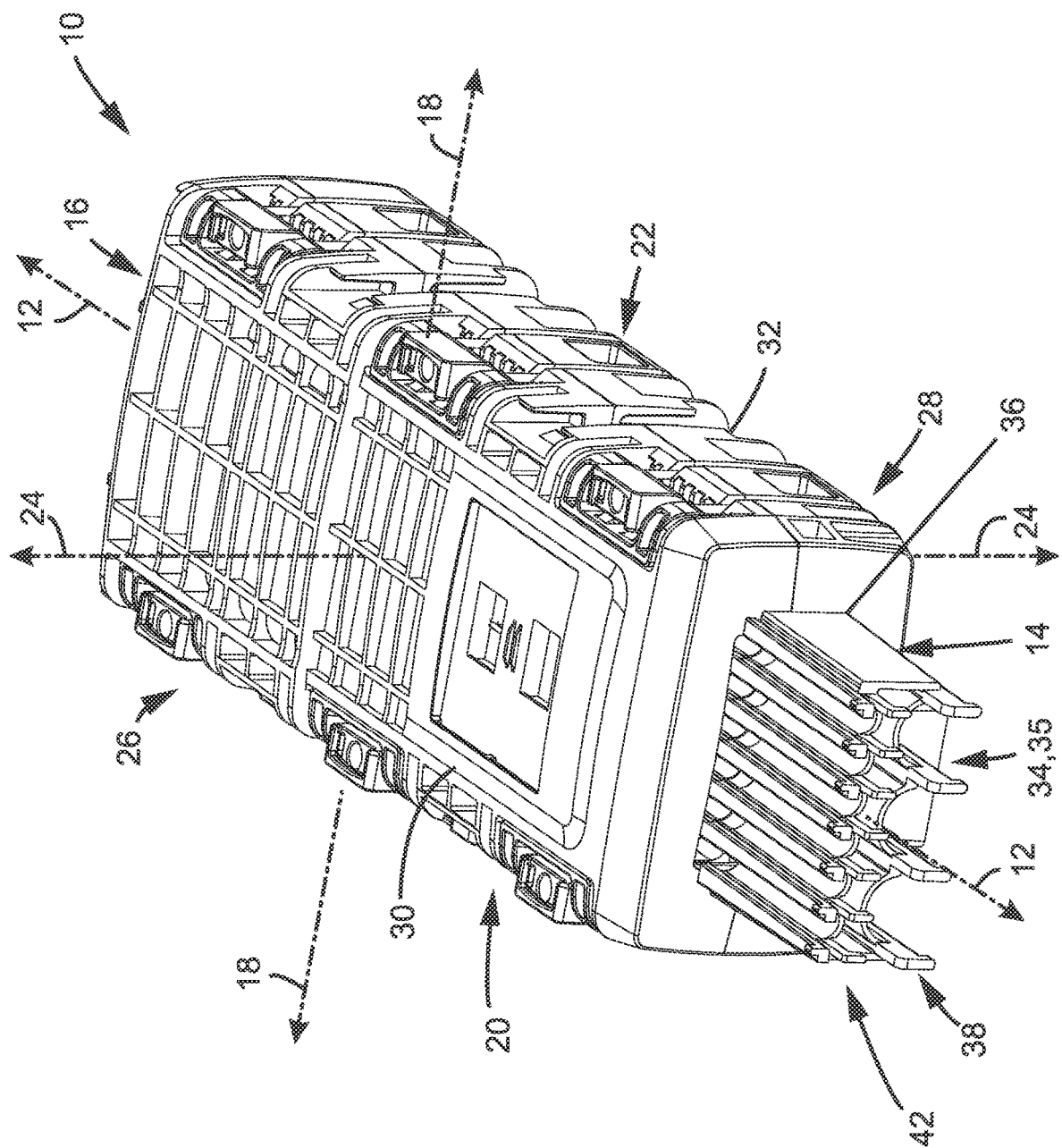
FIG. 1 is a perspective view of a telecommunications closure in accordance with the present disclosure, the closure being in a closed configuration.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
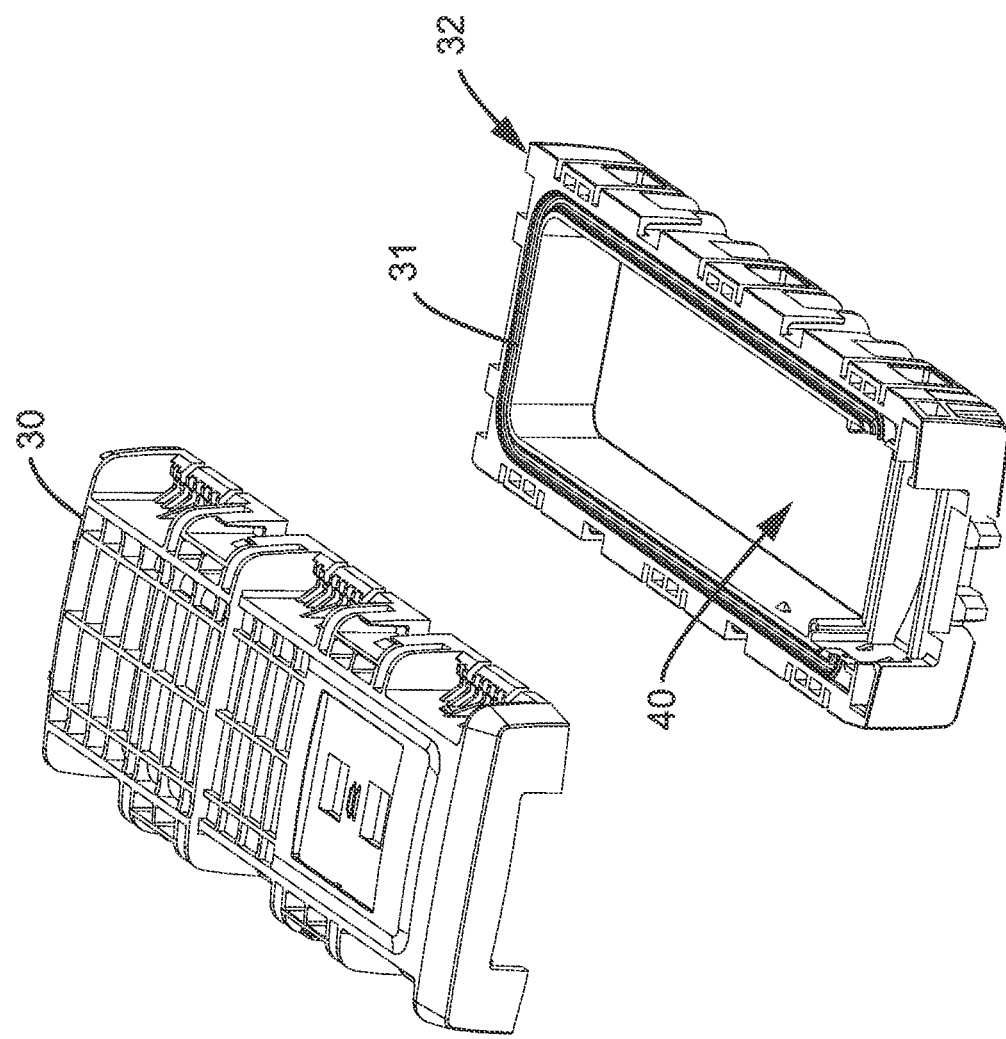
FIG. 2 is a perspective view of the housing pieces of the closure of FIG. 1.
Figure 3:
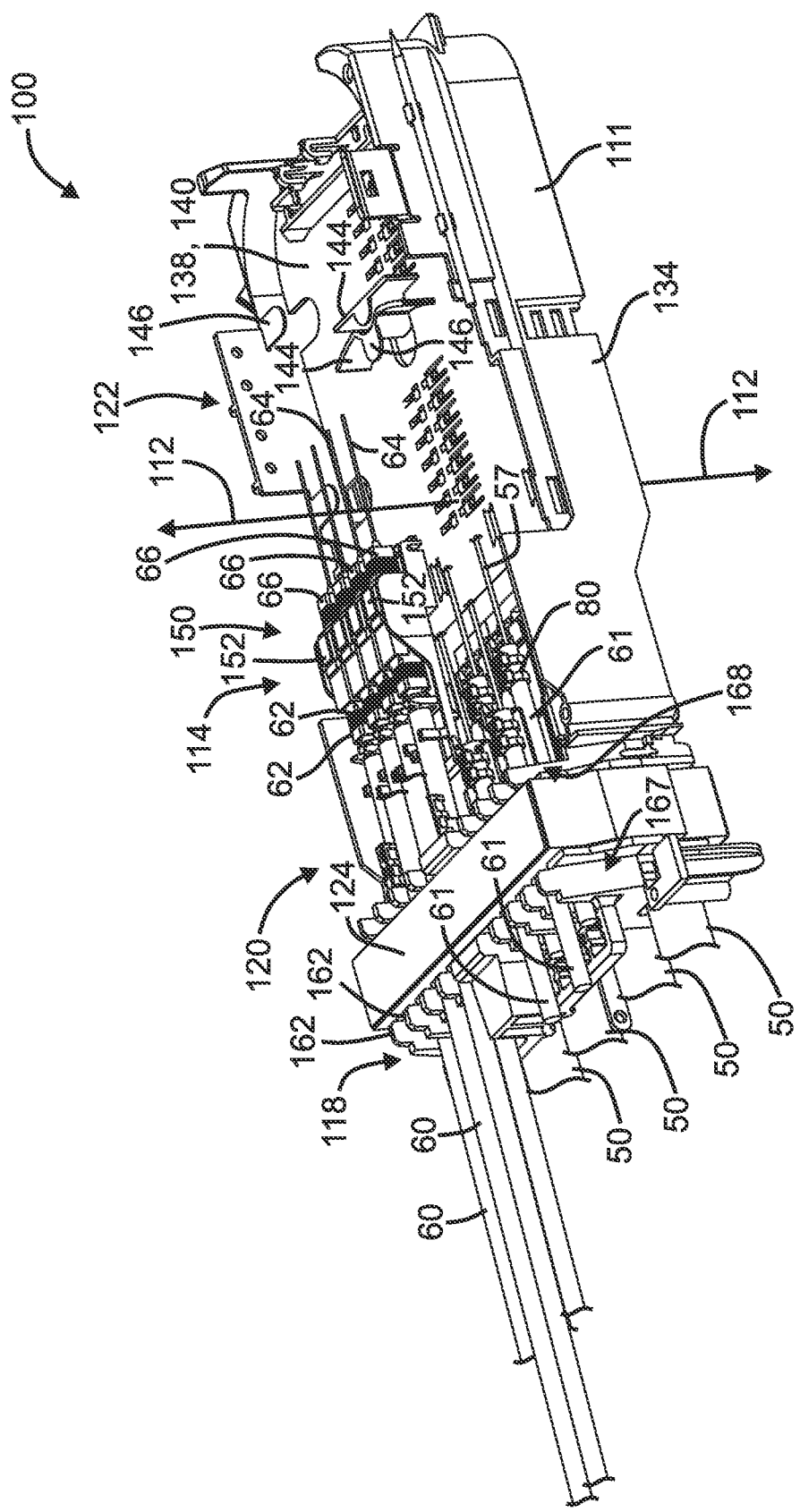
FIG. 3 is a top perspective view of a cable organizer in accordance with the present disclosure, including a first configuration of cables.

Referring to FIGS. 1-2 a telecommunications closure 10 extends along a longitudinal axis 12 between a proximal end 14 and a distal end 16. The closure 10 extends along a transverse axis 18 between a first side 20 and a second side 22. The closure 10 extends along a vertical axis 24 between a top 26 and a bottom 28. The axes 12, 18 and 24 are mutually perpendicular, with the axes 12 and 18 defining a horizontal plane.

As used herein, terms such as proximal, distal, top, bottom, upper, lower, vertical, horizontal and so forth will be used with reference to the axes 12, 18, and 24 of FIG. 1 and in relating the positions of one component to another with respect to the full closure assembly of FIG. 1. These relative terms are for ease of description only, and do not limit how the closure 10 or any individual component or combination of components, may be oriented in practice.

The closure 10 includes a first upper housing piece 30 and a second lower housing piece 32 that cooperate (e.g., with hinges, clamps, etc.) to form a sealable and re-enterable closure volume 40. A perimeter seal element 31 forms a seal about three sides of the closure volume 40 when the closure 10 is in a sealed and closed configuration.

The closure volume 40 is configured to house a cable organizer 34. An internal portion (not shown in FIGS. 1-2) of the cable organizer 34 is positioned within the closure volume 40. An external portion 35 of the cable organizer 34 is positioned exterior to the closure volume 40, with the cable organizer 34 extending through a proximally positioned opening 36 defined between the proximal ends of the first and second housing pieces 30 and 32. Cables enter the closure volume 40 via the opening 36 and sealed cable ports defined by the internal portion of the cable organizer 34.

The cable organizer 34 is configured to accommodate relatively thick cables (such as feeder cables) entering the closure 10 via a lower portion 38 of the cable organizer 34, and relatively thin cables (such as drop cables) entering the closure via an upper portion 42 of the cable organizer 34.

Referring now to FIGS. 3-6, a cable organizer (or organizer) 100 in accordance with the present disclosure will be described. The cable organizer 100 can cooperate with housing pieces of a closure such as described above. For example, the cable organizer 100 can cooperate with the housing pieces 30, 32 as described above with respect to FIGS. 1 and 2, an internal portion of the organizer being positioned in the closure volume 40. Other than at the proximal side, the housing pieces 30-32 do not form another opening to the outside of the closure.

The organizer 100 extends along a longitudinal axis 102 from a proximal end 103 to a distal end 104, along a transverse axis 106 from a first side 108 to a second side 110, and along a vertical axis 112 from a top 114 to a bottom 116. The axes 102, 106 and 112 are mutually perpendicular, with the axes 102 and 106 defining a horizontal plane. The organizer includes an external portion 118 configured to be positioned outside of a closure volume and an internal portion 120 positioned distally from the external portion 118 and configured to be positioned within a closure volume. In some examples the external portion 118 and the internal portion 120 of the organizer are of unitary construction. Alternatively, the external portion is constructed separately and attached to the internal portion.

The organizer 100 is generally divided by one or more panels, walls, or other structures between an upper portion 122 and a lower portion 124. Some of these panels, walls and other structures form an integrated unit that serves as a main support structure 111 of the organizer 100. In some examples, the internal portion 120 of the organizer 100 corresponds to the main support structure 111, and the external portion 118 is coupled to the main support structure 111. The organizer 100 defines one or more channels and other guiding structures for guiding optical fibers between the upper and lower portions, such that an optical fiber from a cable (e.g., a feeder cable) fixed in the lower portion can be optically coupled to an optical fiber of a cable (e.g., a drop cable) fixed in the upper portion.

The internal portion 120 includes in the upper portion 122 a cable fixation region 126 and a fiber management region 128 positioned distally from the cable fixation region 126. The internal portion 120 also includes in the lower portion 124 a cable fixation region 130 and a fiber management region 132 positioned distally from the cable fixation region 130. The cable fixation regions 126 and 130 are generally vertically aligned. The fiber management regions 128 and 132 are generally vertically aligned.

The lower fiber management region 132 is partially defined by a side wall 134 and a horizontal downward facing surface 136 of a panel 138, together forming a basket. The basket of the lower fiber management region 132 can serve as a storage area for looped fiber from the feeder cables 50. The looped fiber can be in the form of loose fibers, loose fibers protected in groups by a common sheath, fiber ribbons, etc. Fibers can be guided from the lower fiber management region 132 to the upper fiber management region where they can be further managed, e.g., with splices, connectors and adapters, splitters, wave division multiplexors, etc.

The upper fiber management region 128 includes an upward facing horizontal surface 140 of the panel 138. The surface 140 defines mounting structures 142 for mounting optical fiber management components, such as splitter holders and/or splice holders. Fiber guides 144 and retainers 146 are also provided in the upper fiber management region 128 and retain fibers 64 within the upper fiber management region 128 while enabling compliance with bend radius limitations of the optical fibers 64.

The upper fiber management region 128 can also include one or more banks 150 of fiber optic adapters 152. The adapters 152 can be used to optically connect connectorized drop cables 60 having connectors 62 with connectorized fibers 64 having connectors 66 terminating the fibers 64. In this example, one bank 150 of adapters 152 is provided. In other examples, zero or two banks of adapters can be provided aligned with one another parallel to the transverse axis 106. Where adapters are not longitudinally aligned with entering cables, non-connectorized drop cables 61 can be fixed in the upper cable fixation region 126 and their fibers 57 managed in the upper fiber management region 128. Thus, the upper region of the organizer 100 can accommodate connectorized drop cables, non-connectorized drop cables, or a combination of connectorized and non-connectorized drop cables. Other cable types and configurations can also be accommodated and managed at the cable fixation region 126. In alternative examples, the adapters, or non-functional receptacles that behave like one-sided adapters, can serve as parking or storage for the connectors 62 or the connectors 66 until an active fiber optic connection is needed.

Figure 32:
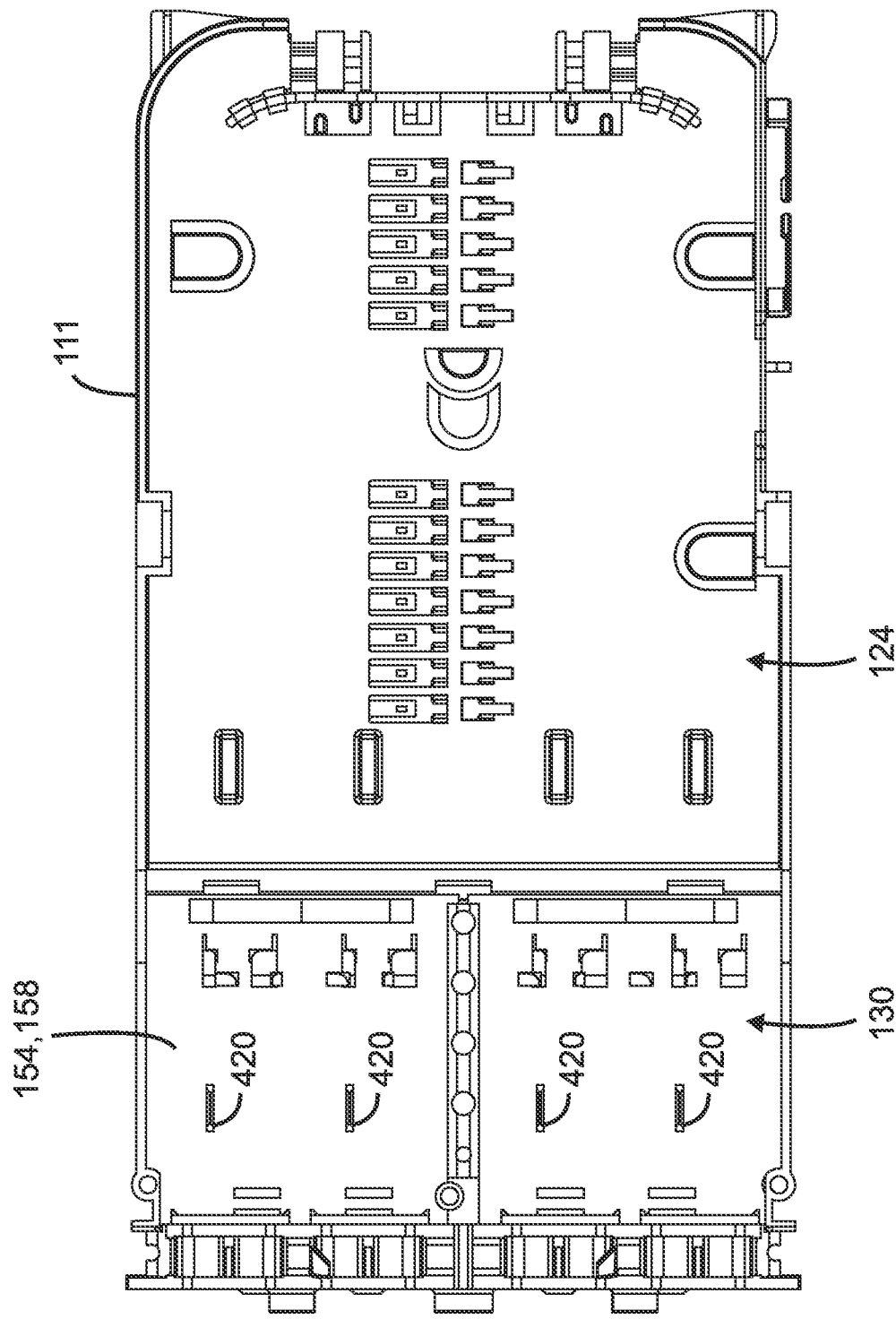
FIG. 32 is a bottom view of the main support structure of the cable organizer of FIG. 3.

The upper cable fixation region 126 and the lower cable fixation region 130 are separated by a wall 154. The wall includes an upward facing horizontal surface 156 and a downward facing horizontal surface 158 (FIG. 32). The surfaces 156 and 158 can support cable fixation assemblies as will be described in greater detail below.

Figure 33:
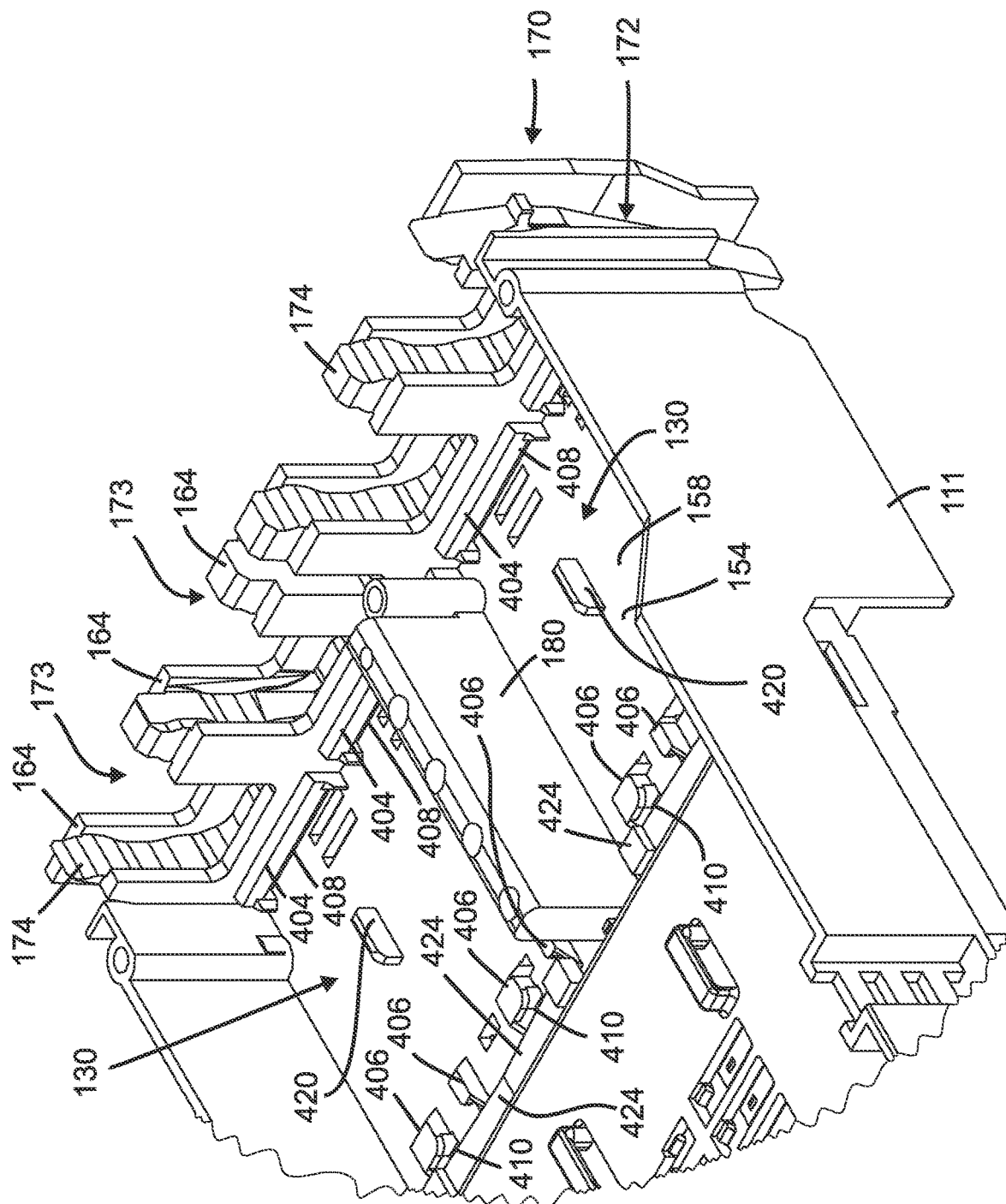
FIG. 33 is an enlarged perspective view of a portion of the main support structure of the cable organizer of FIG. 3.
Figure 34:
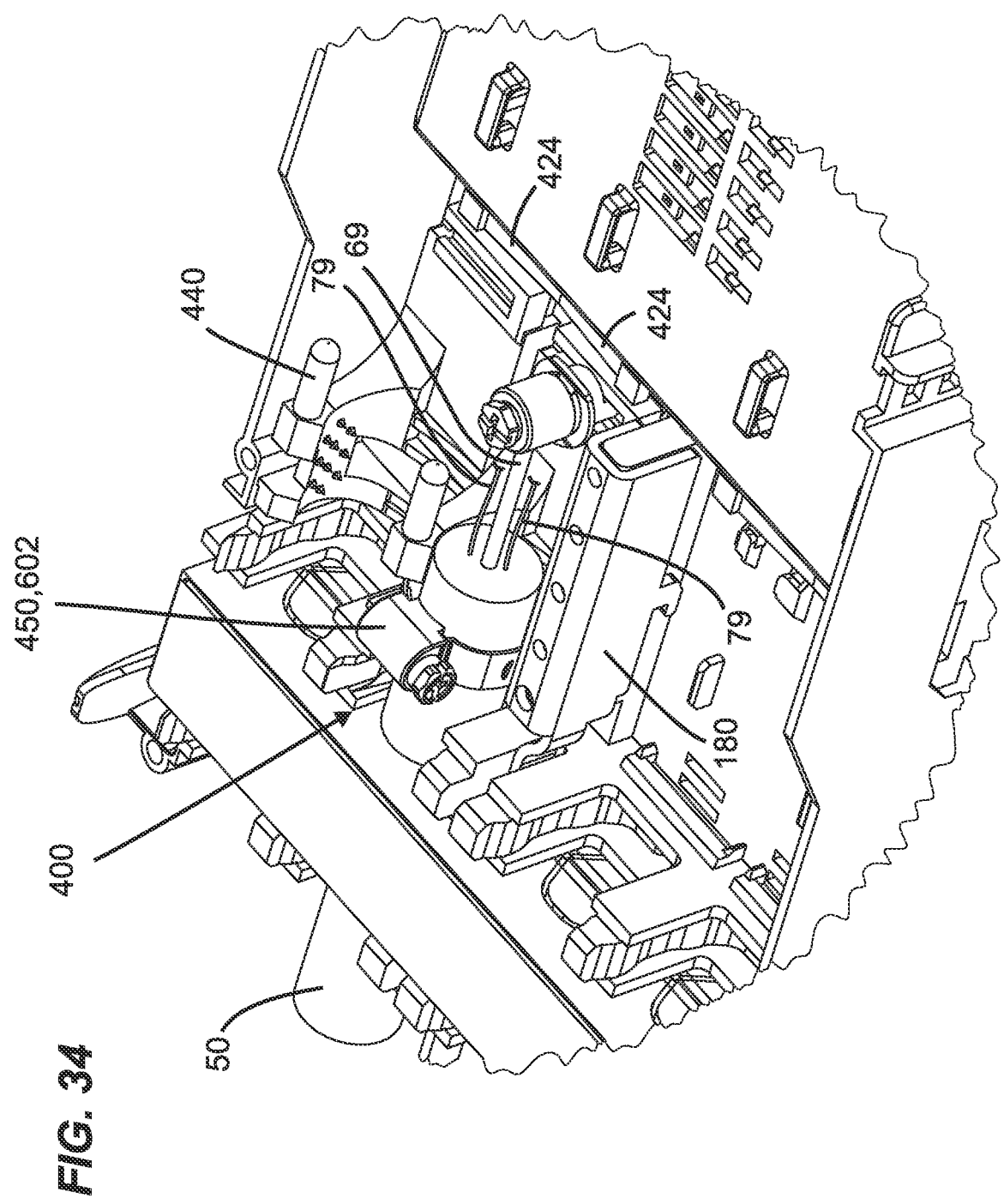
FIG. 34 is an enlarged perspective view of a portion of the organizer of FIG. 3 including a further cable fixation assembly and a cable.
Figure 35:
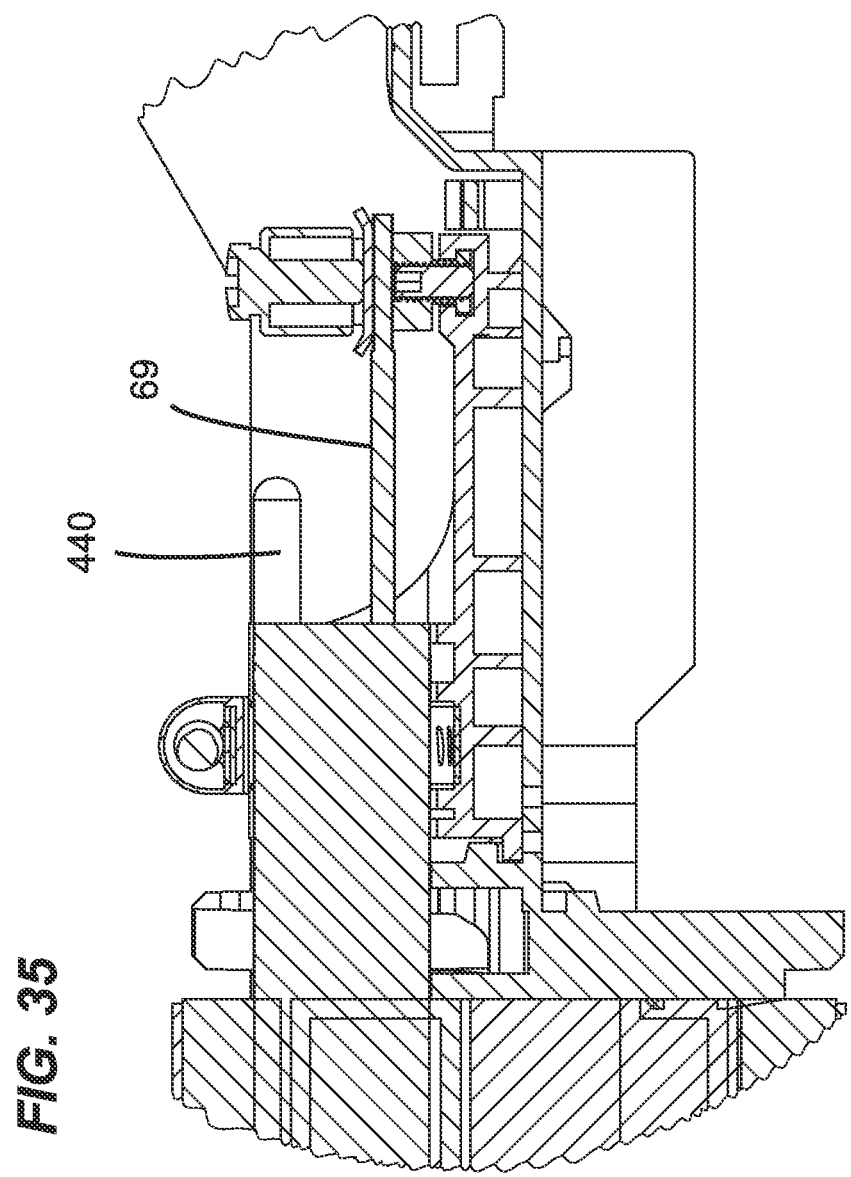
FIG. 35 is a cross-sectional perspective view taken along the line B-B in FIG. 47 of a portion of the organizer, the cable fixation assembly and the cable of FIG. 34.
Figure 36:
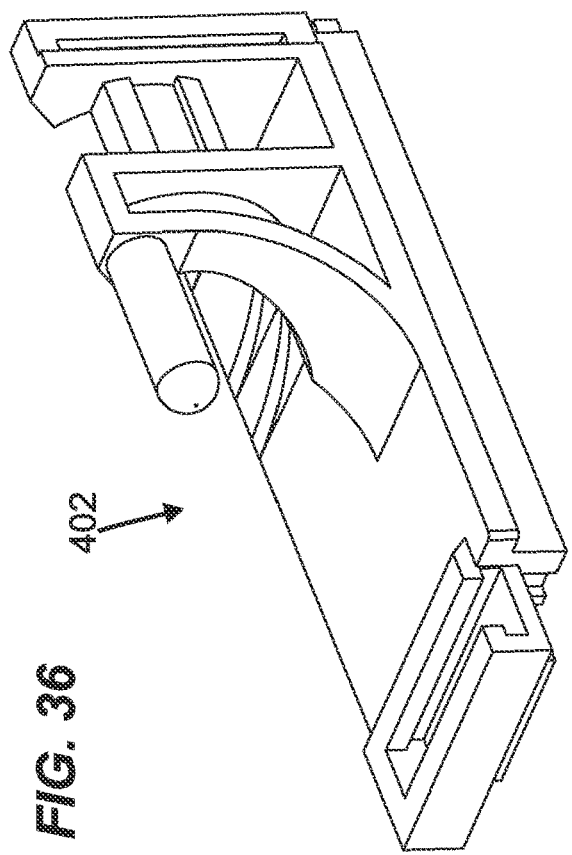
FIG. 36 is a perspective view of a cable fixation body of the cable fixation assembly of FIG. 34.
Figure 37:
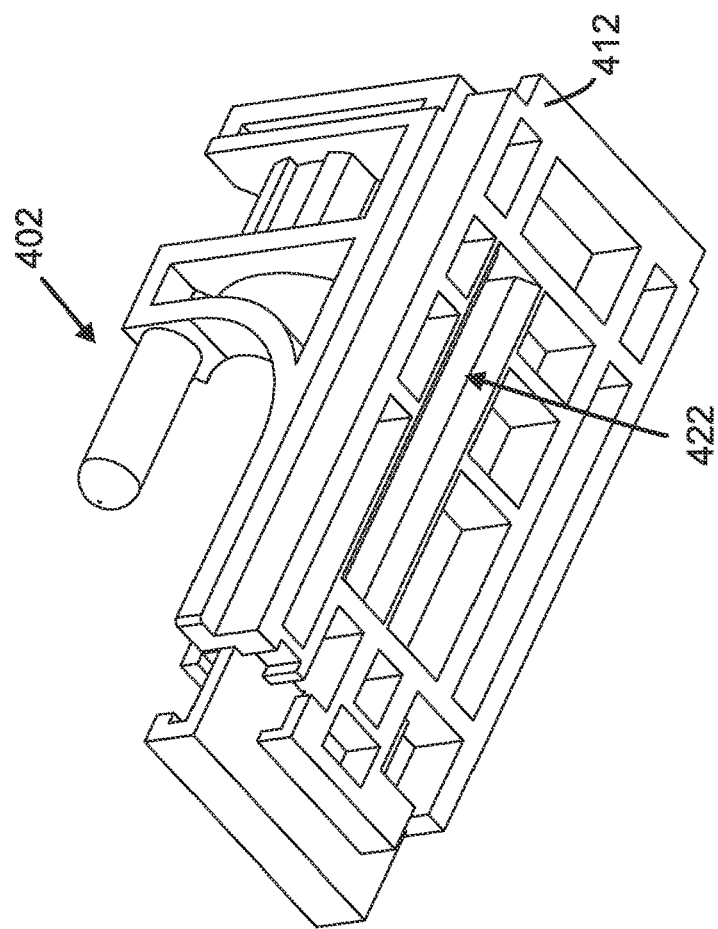
FIG. 37 is a further perspective view of the cable fixation body of FIG. 36.
Figure 38:
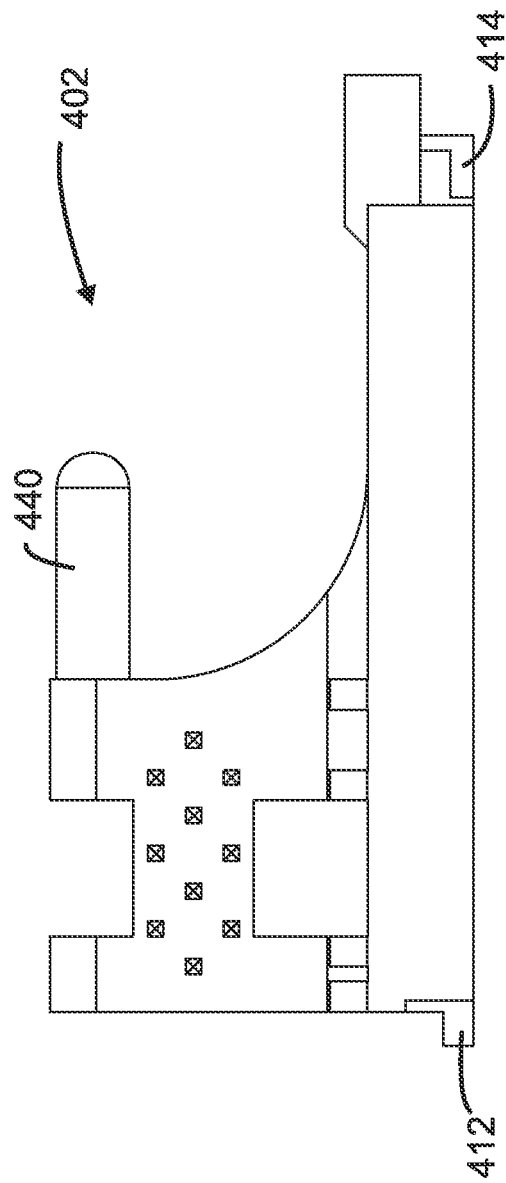
FIG. 38 is a side view of the cable fixation body of FIG. 36.
Figure 39:
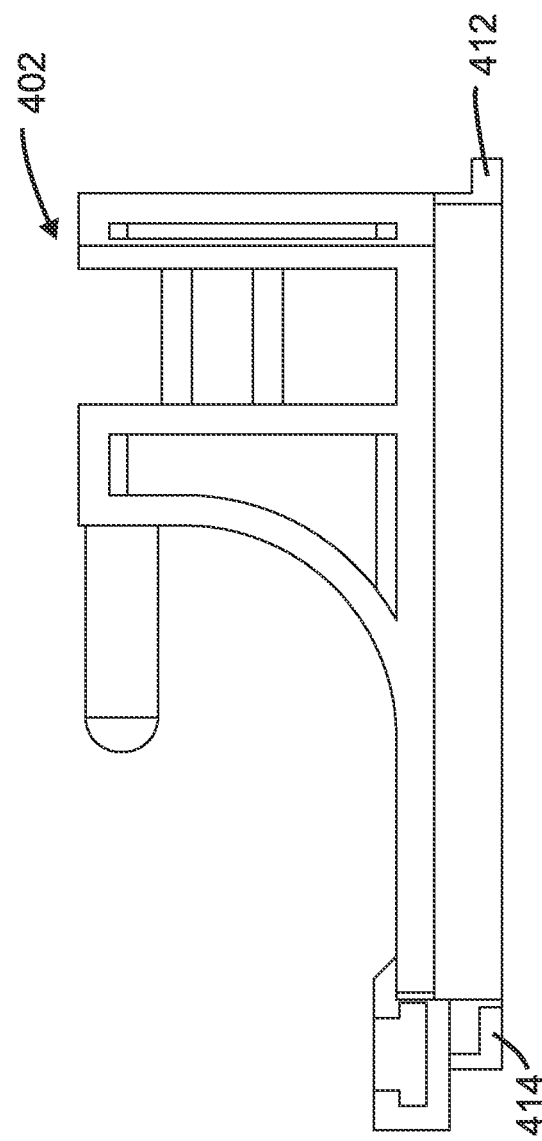
FIG. 39 is a further side view of the cable fixation body of FIG. 36.
Figure 40:
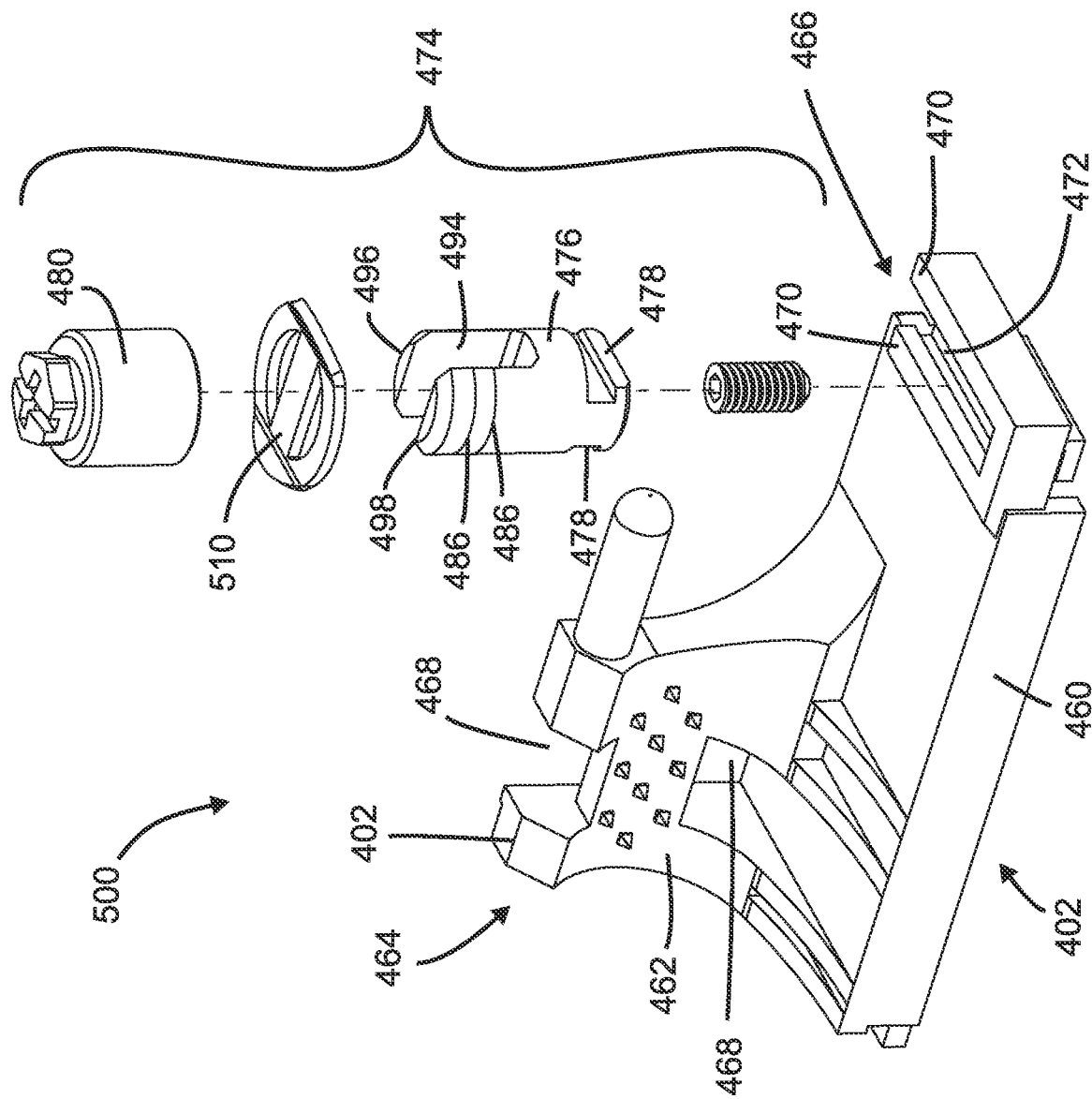
FIG. 40 is an exploded view of the cable fixation assembly of FIG. 34.
Figure 41:
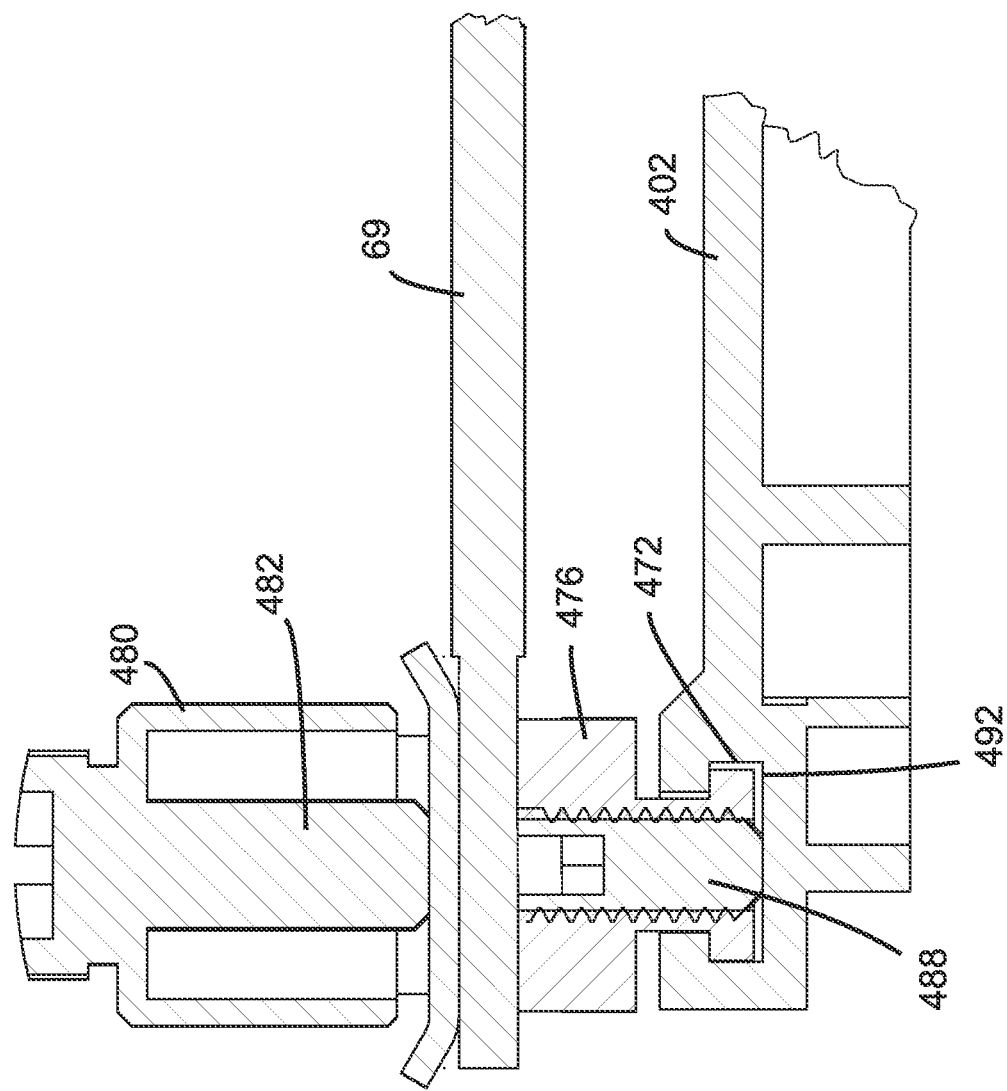
FIG. 41 is a cross-sectional view of a portion of the cable fixation assembly of FIG. 34, including a cable strength member.
Figure 43:
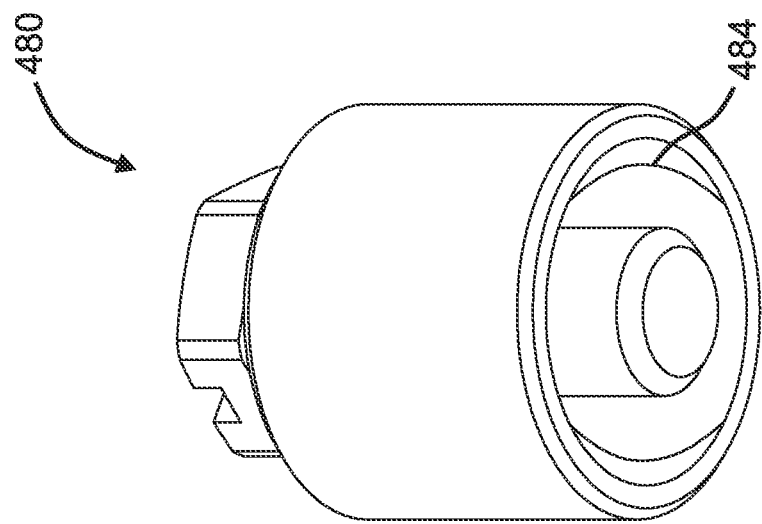
FIG. 43 is a further perspective view of the upper clamp body of FIG. 42.
Figure 42:
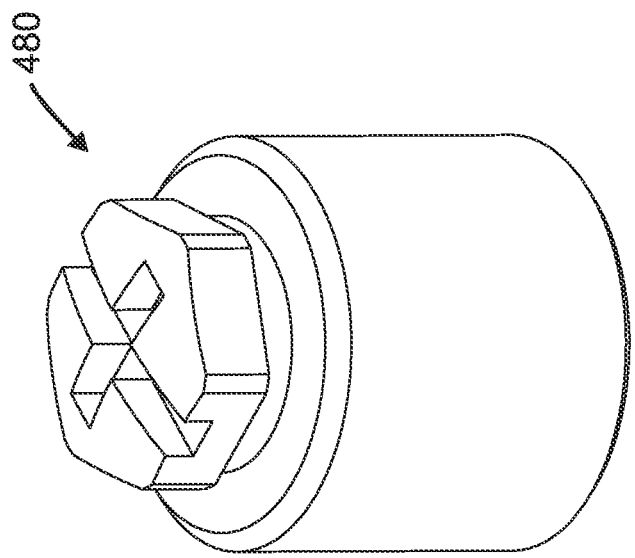
FIG. 42 is a perspective view of the upper clamp body of the strength member fixation portion of the cable fixation assembly of FIG. 34.
Figure 45:
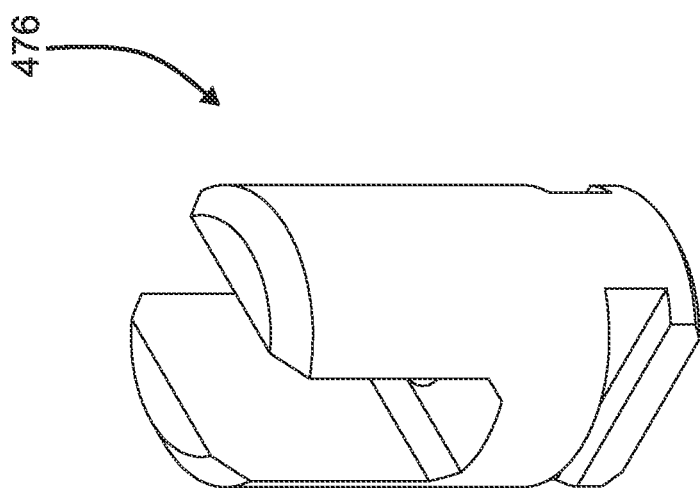
FIG. 45 is a further perspective view of the lower clamp body of FIG. 44.
Figure 44:
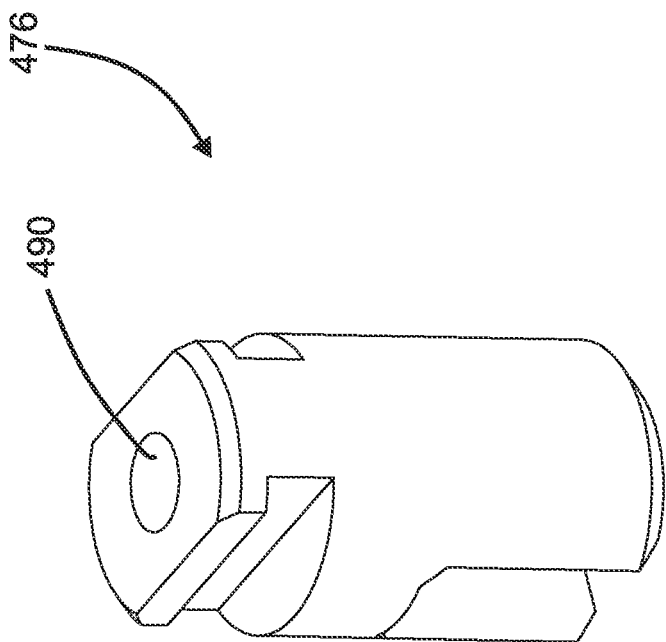
FIG. 44 is a perspective view of the lower clamp body of the strength member fixation portion of the cable fixation assembly of FIG. 34.
Figure 46:
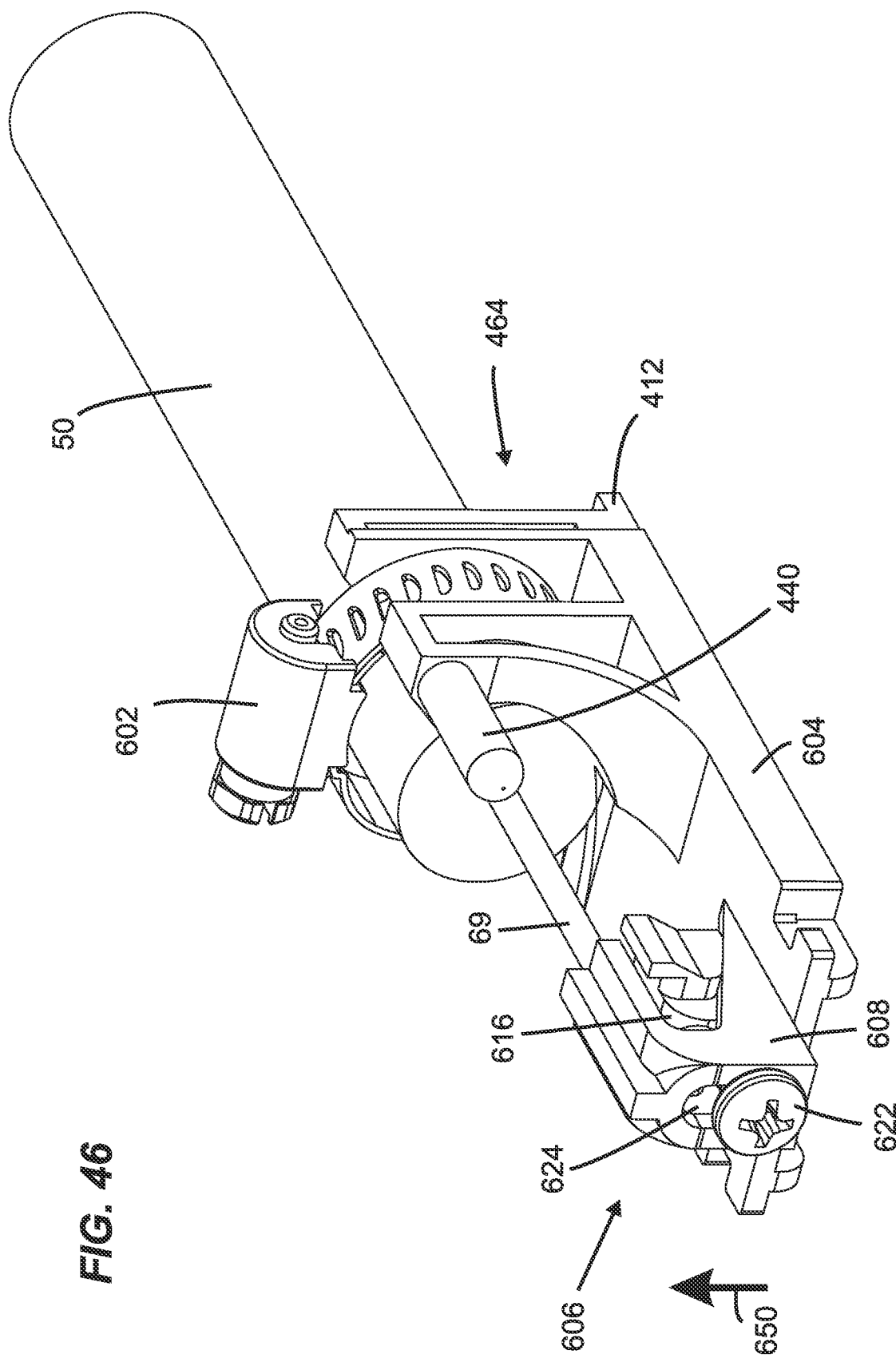
FIG. 46 is a perspective view of a further cable fixation assembly according to the present disclosure, including a cable.
Figure 47:
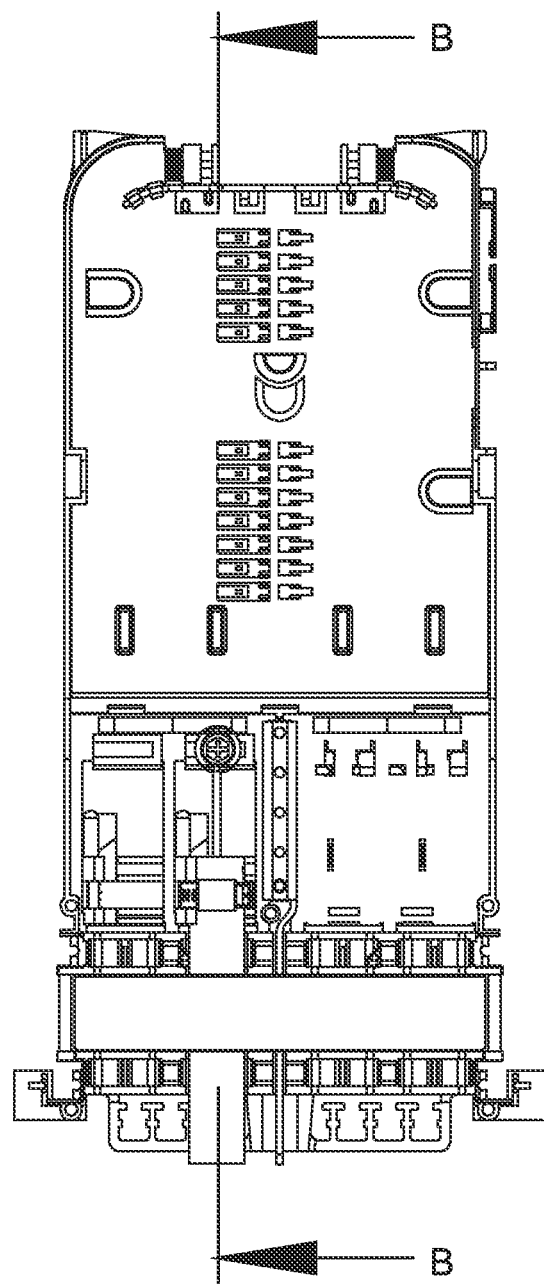
FIG. 47 is a bottom planar view of the cable fixation assembly and the cable of FIG. 34.
Figure 48:
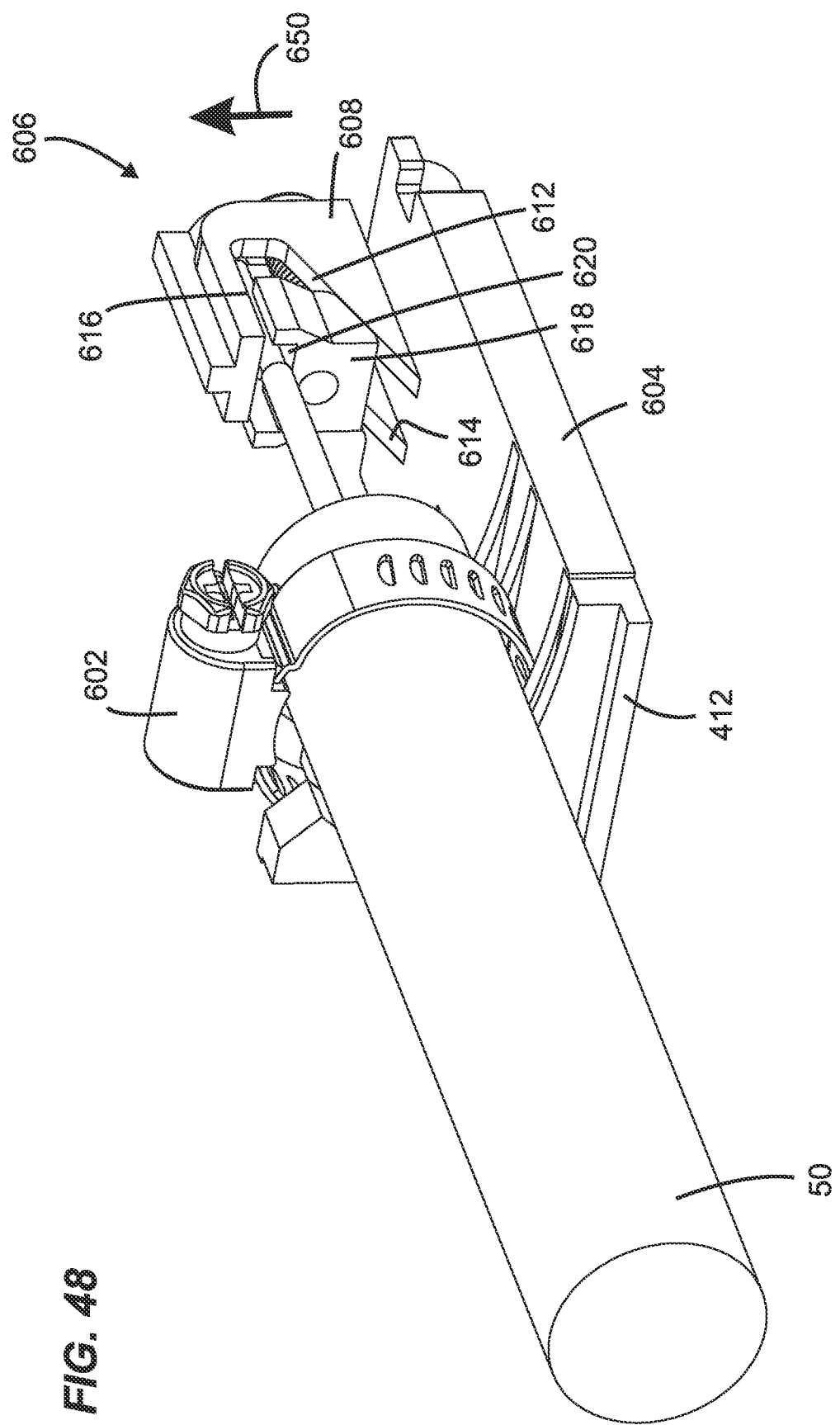
FIG. 48 is a further perspective view of the cable fixation assembly of FIG. 46.
Figure 50:
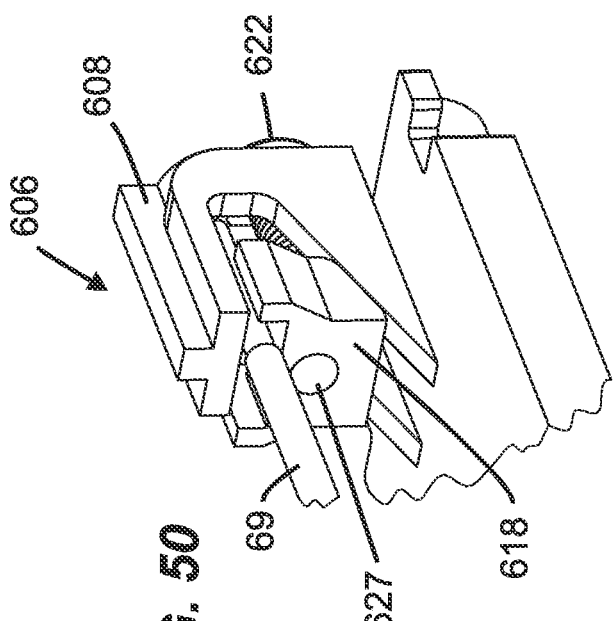
FIG. 50 is a further perspective view of the strength member subassembly portion of FIG. 46 in the pre-clamped configuration of FIG. 49.
Figure 51:
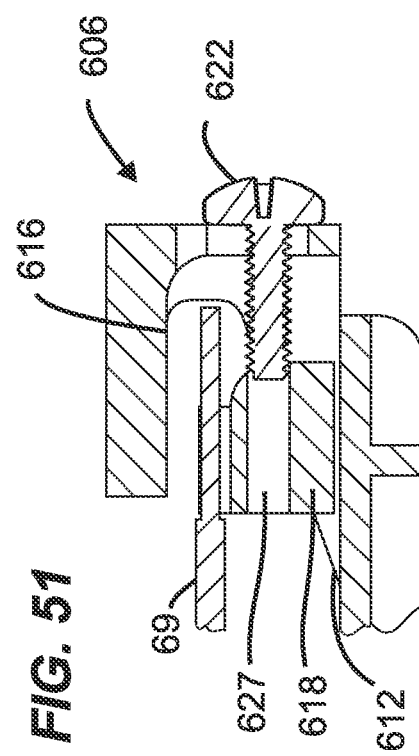
FIG. 51 is a cross-sectional view of the strength member subassembly portion of FIG. 46 in the pre-clamped configuration of FIG. 49.
Figure 49:
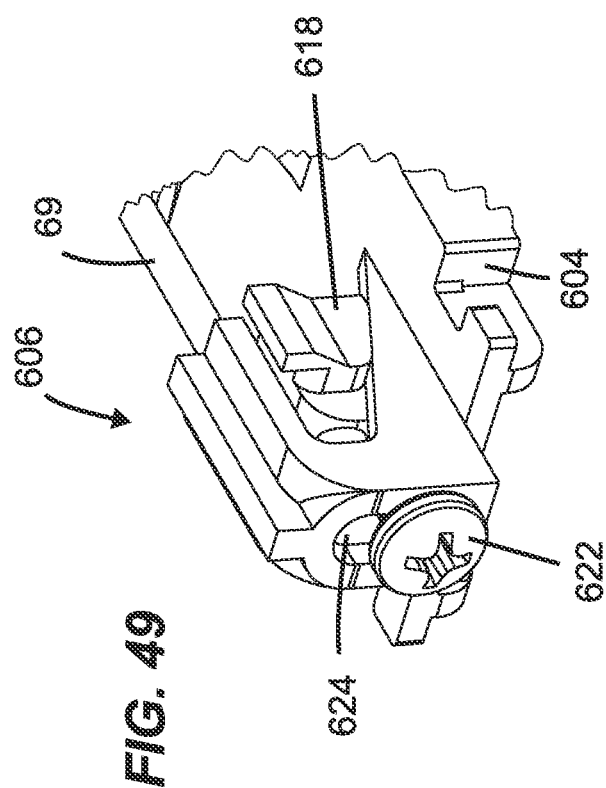
FIG. 49 a perspective view of the strength member subassembly portion of the cable fixation assembly of FIG. 46 in a pre-clamped configuration.
Figure 53:
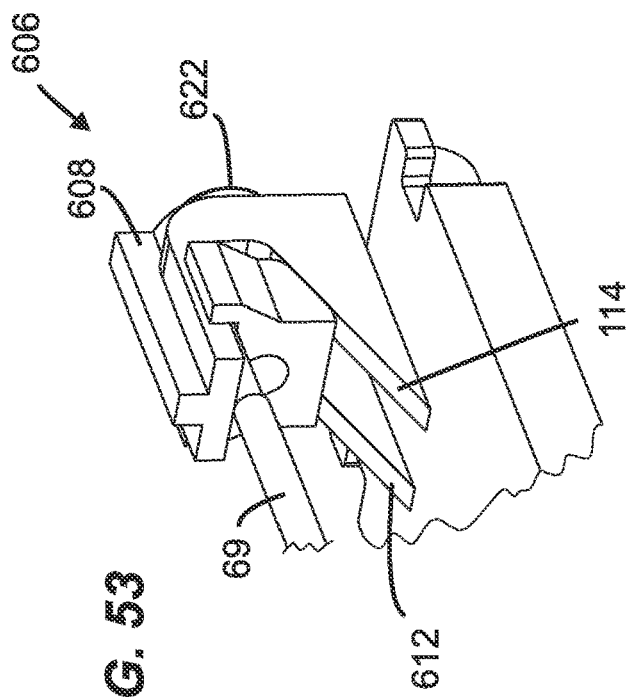
FIG. 53 is a further perspective view of the strength member subassembly portion of FIG. 46 in the clamped configuration of FIG. 52.
Figure 54:
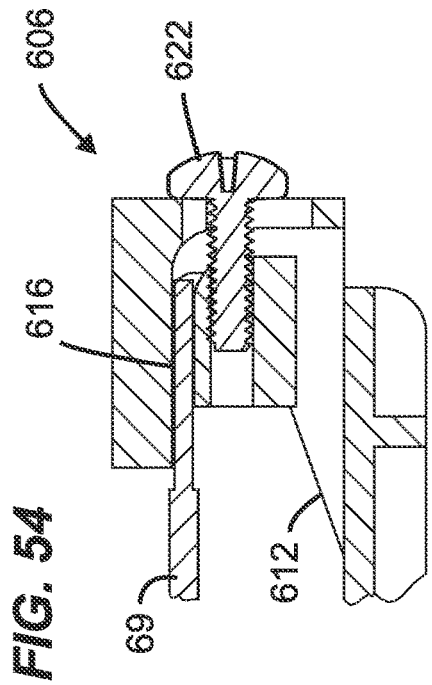
FIG. 54 is a cross-sectional view of the strength member subassembly portion of FIG. 46 in the clamped configuration of FIG. 52.
Figure 52:
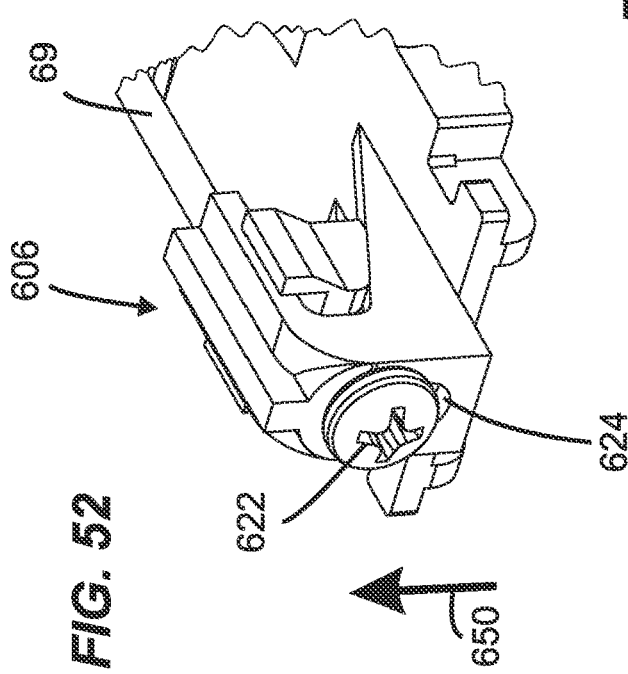
FIG. 52 is a perspective view of the strength member subassembly portion of the cable fixation assembly of FIG. 46 in a clamped configuration.
Figure 55:
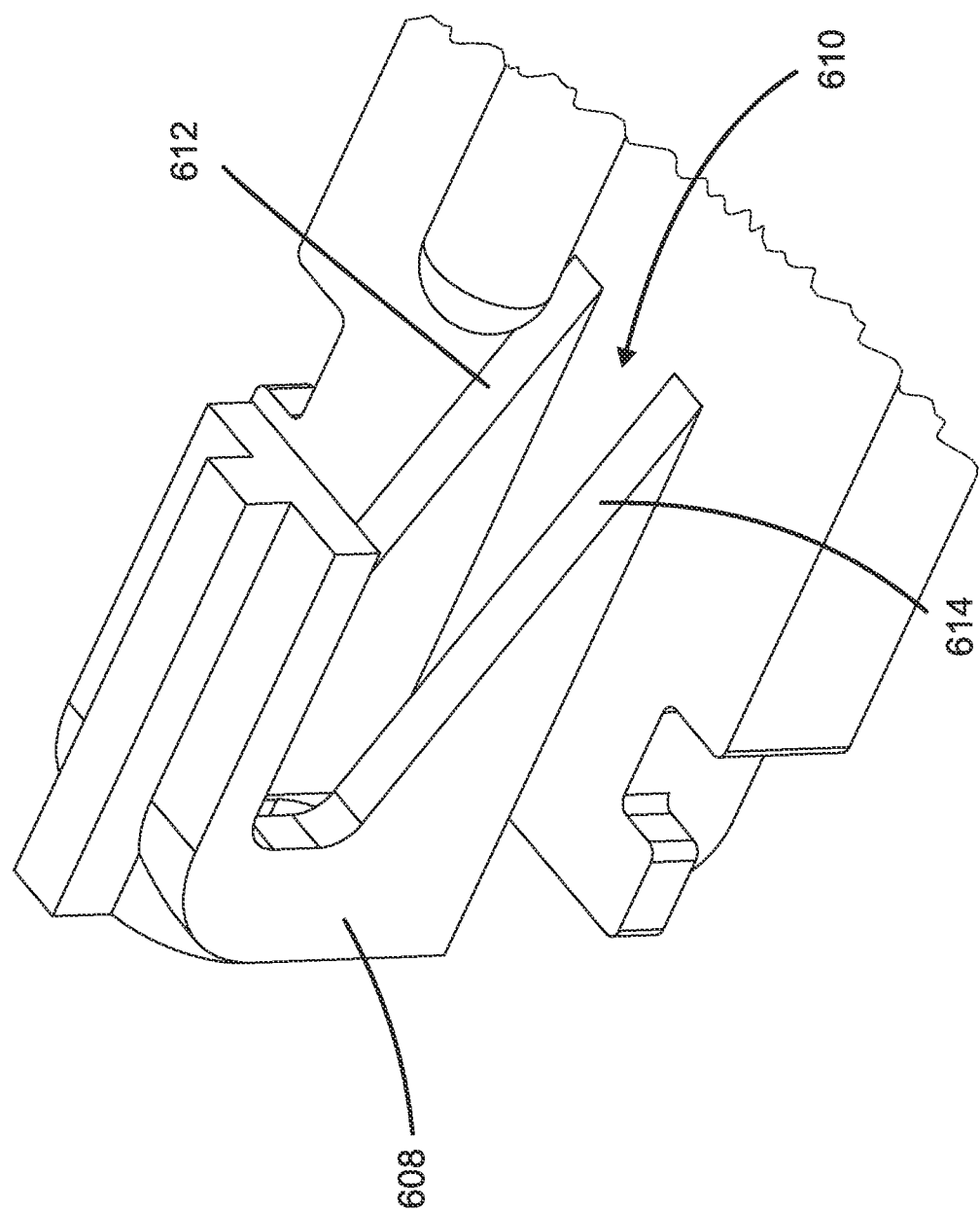
FIG. 55 is an enlarged view of a portion of the strength member clamp subassembly portion of the cable fixation assembly of FIG. 46.
Figure 57:
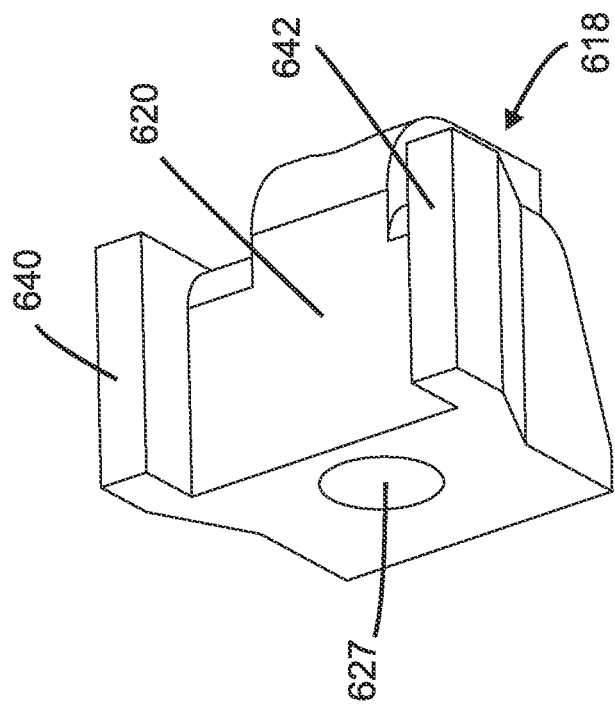
FIG. 57 is a further perspective view of the clamp body of FIG. 56.
Figure 56:
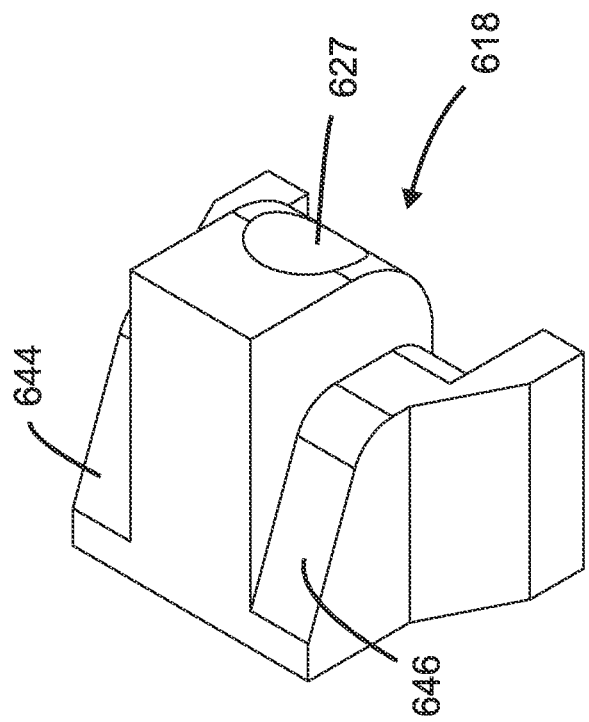
FIG. 56 is a perspective view of a clamp body of the strength member clamp subassembly of the cable fixation assembly of FIG. 46.

Positioned proximally of the cable fixation regions 126 and 130 is a seal region 160 of the organizer 100. The seal region 160 includes a plurality of dividers 162 and 164 in the upper portion 122 and the lower portion 124, respectively, of the organizer 100. The dividers 162 define openings 166 (FIG. 7) through which connectorized drop cables 60 and non-connectorized drop cables 61 enter the closure. The dividers 164 define openings 173 (FIG. 33) through which feeder cables 50 or the like enter the closure. The dividers 162 and 164 are provided in two rows 167 and 168 in the upper portion 122 spaced apart longitudinally from each other and two rows 170 and 172 in the lower portion 124 spaced apart longitudinally from each other. In the space between rows of dividers there are placed seal blocks 174. The seal blocks 174 form seals around the cables 50, 60, and 61 entering the closure. The seal blocks 174 also serve to seal off the proximal opening of the closure defined between the housing pieces of the closure.

Figure 7:
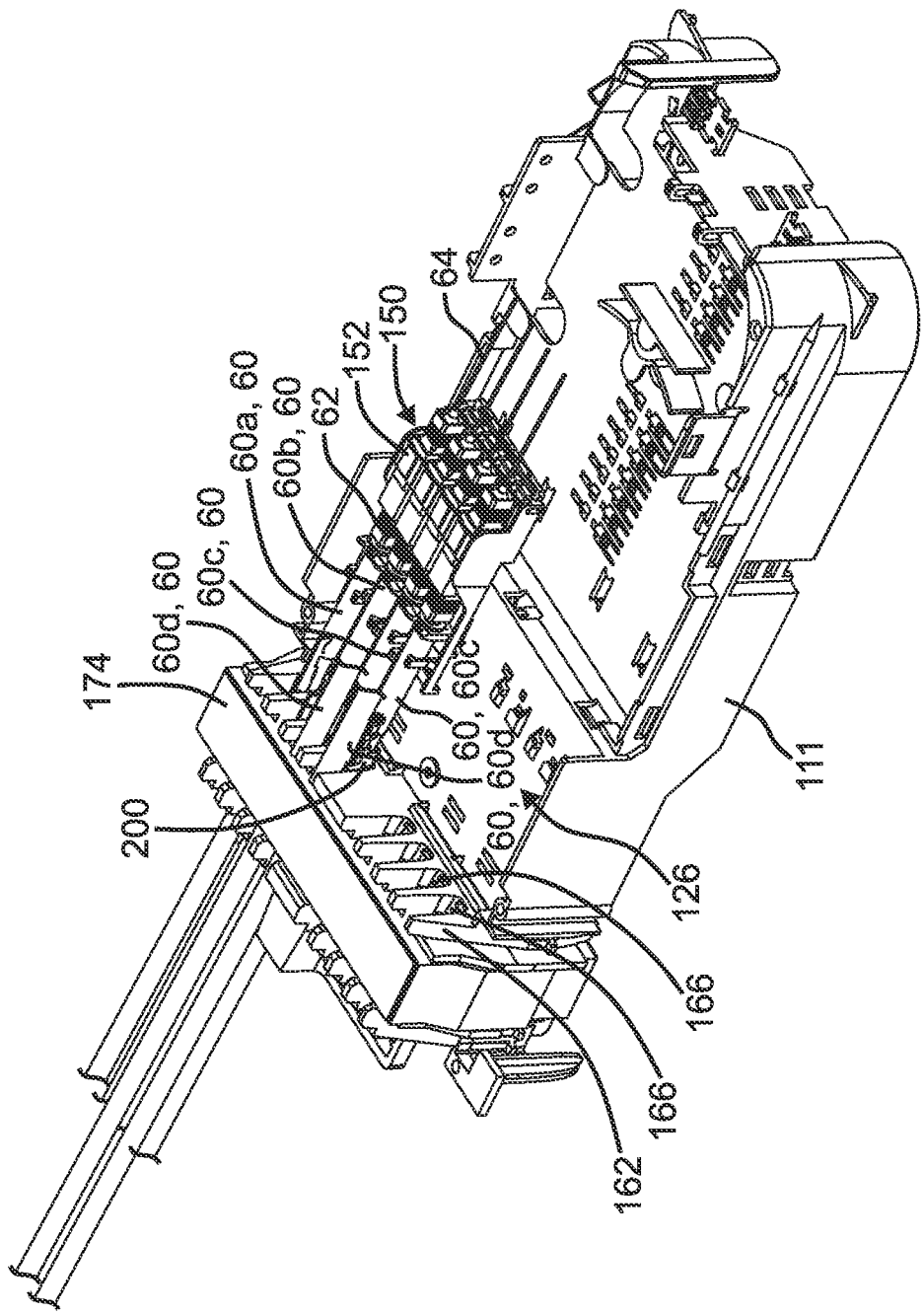
FIG. 7 is a top, perspective view of the cable organizer of FIG. 3, with an example configuration of connectorized drop cables.
Figure 8:
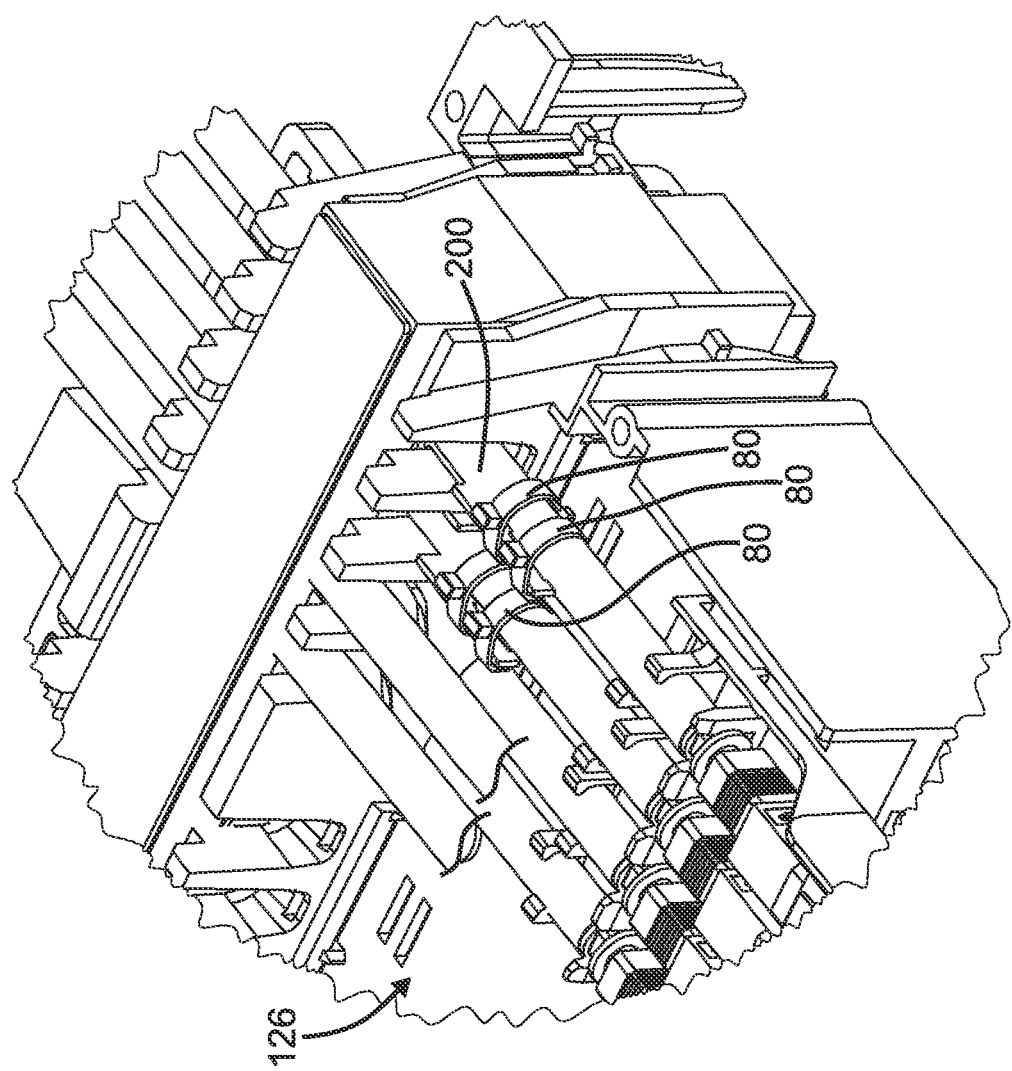
FIG. 8 is an enlarged, perspective view of a portion of the cable organizer and drop cables of FIG. 7.
Figure 9:
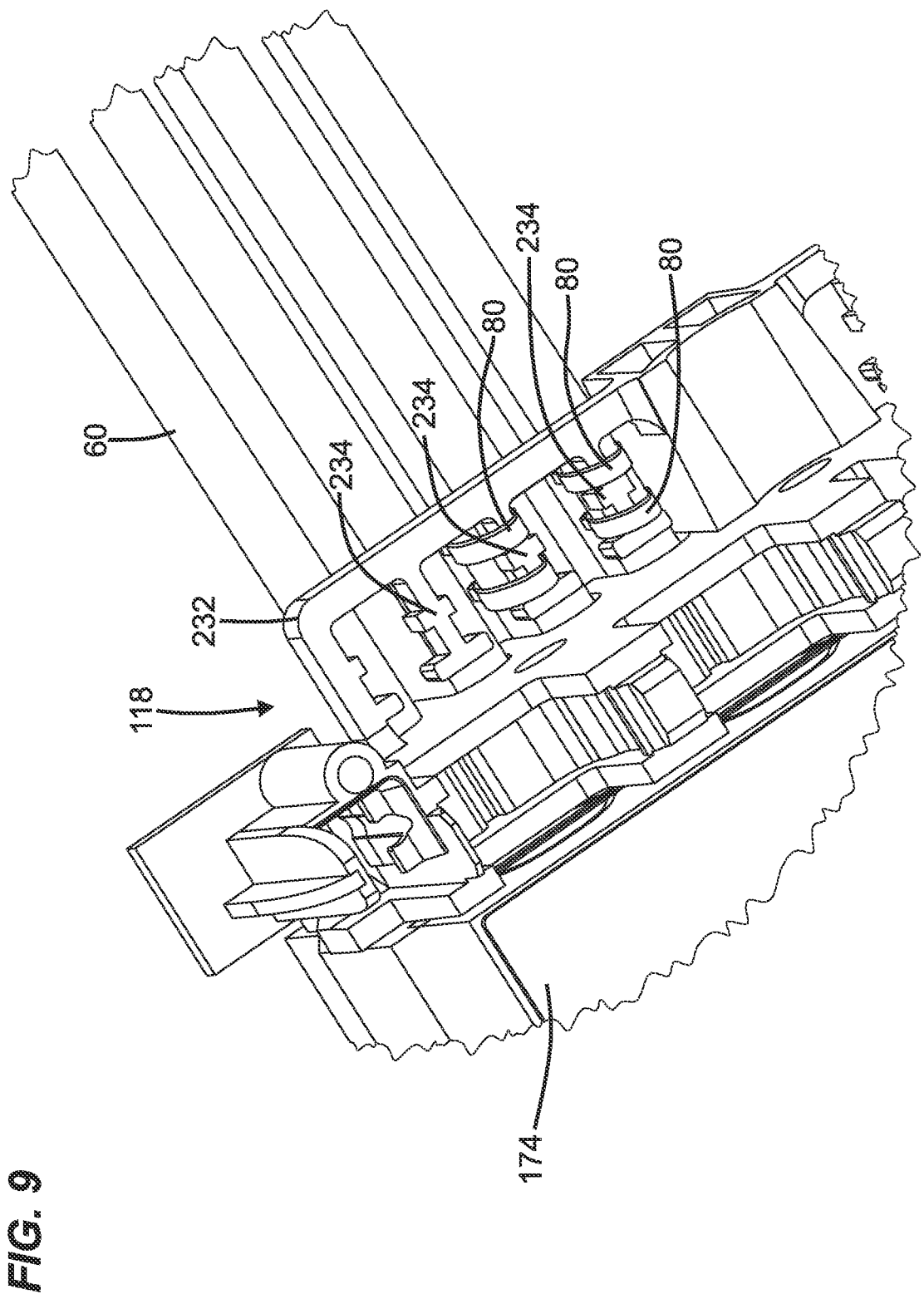
FIG. 9 is an enlarged perspective view of a further portion of the cable organizer and drop cables of FIG. 7.
Figure 11:
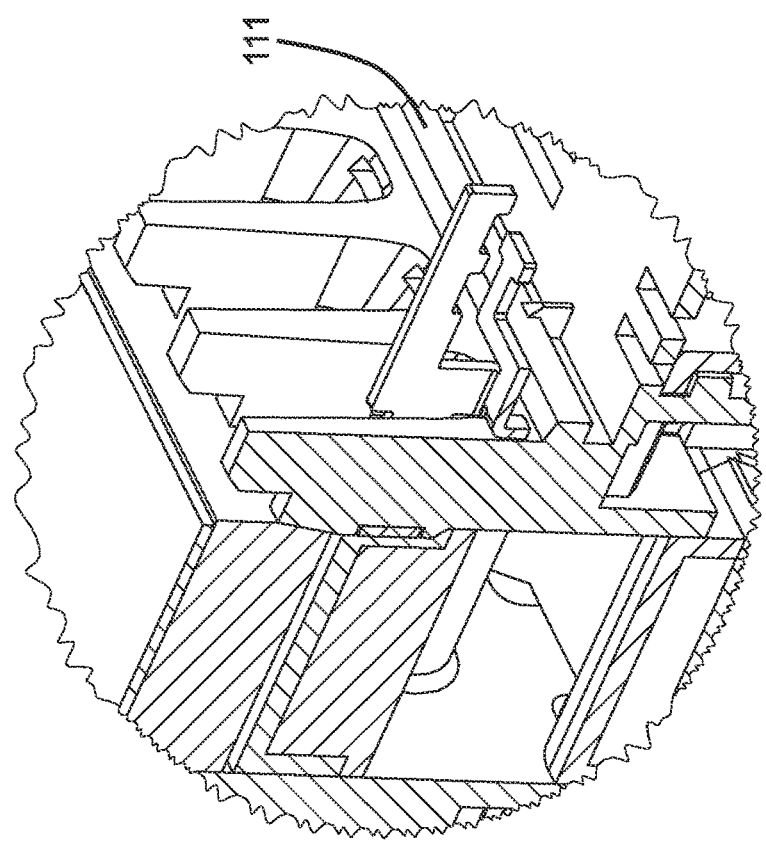
FIG. 11 is further cross-sectional view of a portion of the cable organizer of FIGS. 3 and 7 and a portion of a cable fixation assembly of FIG. 10.
Figure 10:
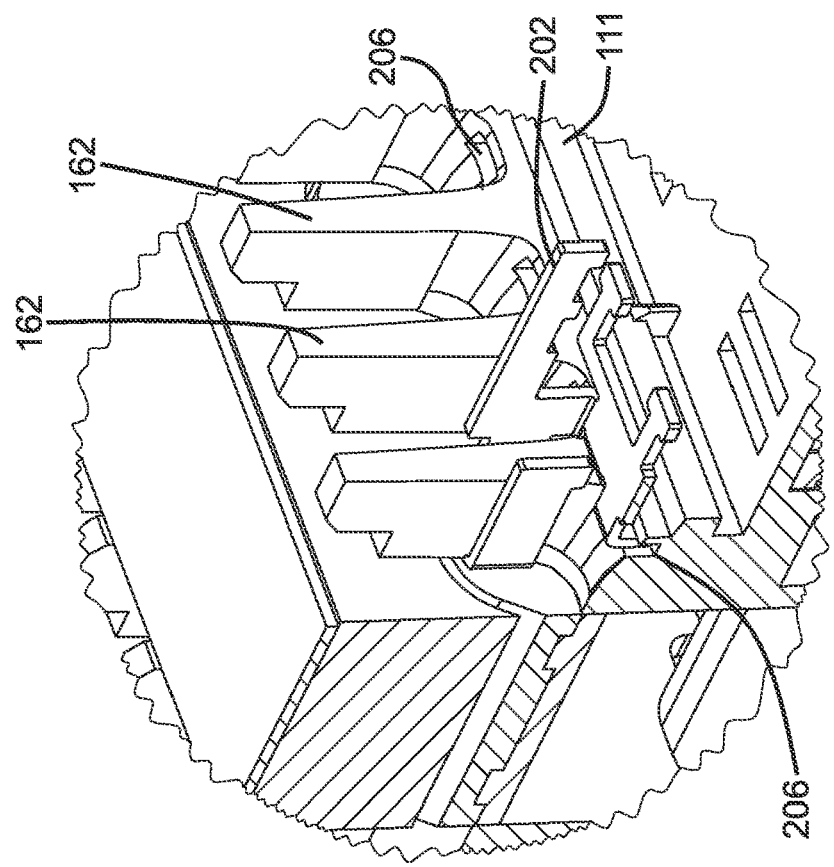
FIG. 10 is a cross-sectional view of a portion of the cable organizer of FIGS. 3 and 7 including a portion of a cable fixation assembly in accordance with the present disclosure.

Referring to FIGS. 7-9, the cable fixation region 126 fixes cables entering the closure through four cable ports defined by the seal blocks 174. The fixed cables shown include a total of six connectorized drop cables 60. The connectors 62 of two of the cables are not shown to aid illustration. Two of the cable ports receive just one connectorized drop cable 60a, 60b. Each of the other two ports receives a pair of vertically offset drop cables 60c and 60d. The outer jackets of the cables 60 extend longitudinally to the connectors 62. An upper set (not shown) of adapters 152 can be provided above the bank 150 to receive connectors of the upper connectorized drop cables 60d.

The number of drop cables extending through the four ports can depend on the particular fiber management needs of the closure. For example, each port can accommodate a single drop cable or two drop cables. In addition, one or more of the ports can be plugged and not receive any drop cable. Whatever the configuration of drop cables entering the four ports at the cable fixation region 126, those cables must be affixed, and are preferably affixed near the seal blocks to minimize compromising of the seal due to lateral load on the cables. In addition, due to the lack of cable slack between the adapters 152 and the seal blocks 174, the cables are appropriately affixed only after their connectors are installed on the adapters which have been pre-mounted to the main support structure. In addition, it is desirable that the cable fixation components be readily modified or adjusted to accommodate modifications to the types and number of cables. Thus, for example, it is desirable that the cable fixation components be readily configured to accommodate a single cable or an arrangement of two vertically offset cables, or to be uninstalled to enable fixation of a different type of cable, such as a non-connectorized drop cable.

Figure 20:
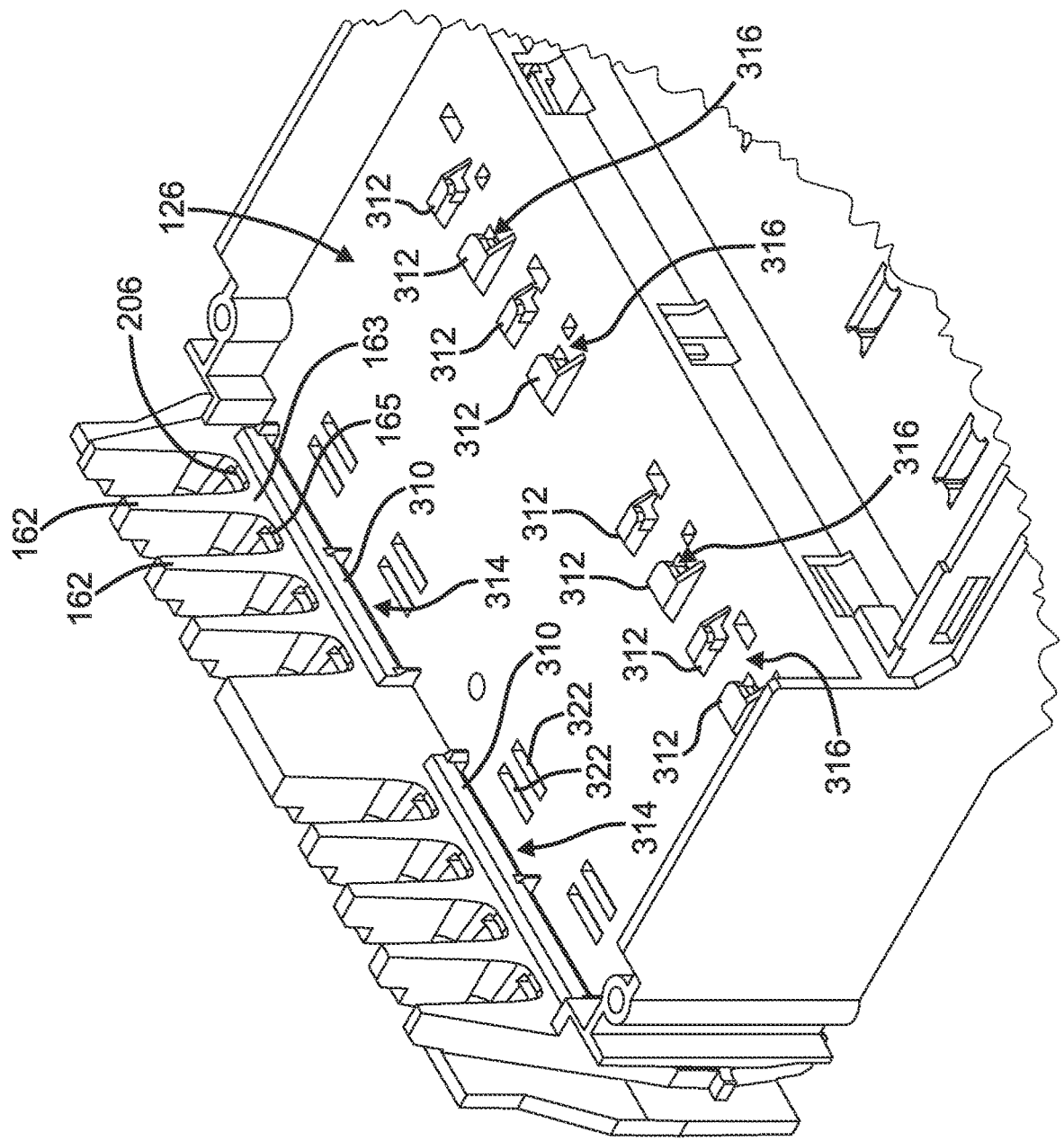
FIG. 20 is an enlarged view of a portion of the main support structure of FIG. 19.
Figure 21:
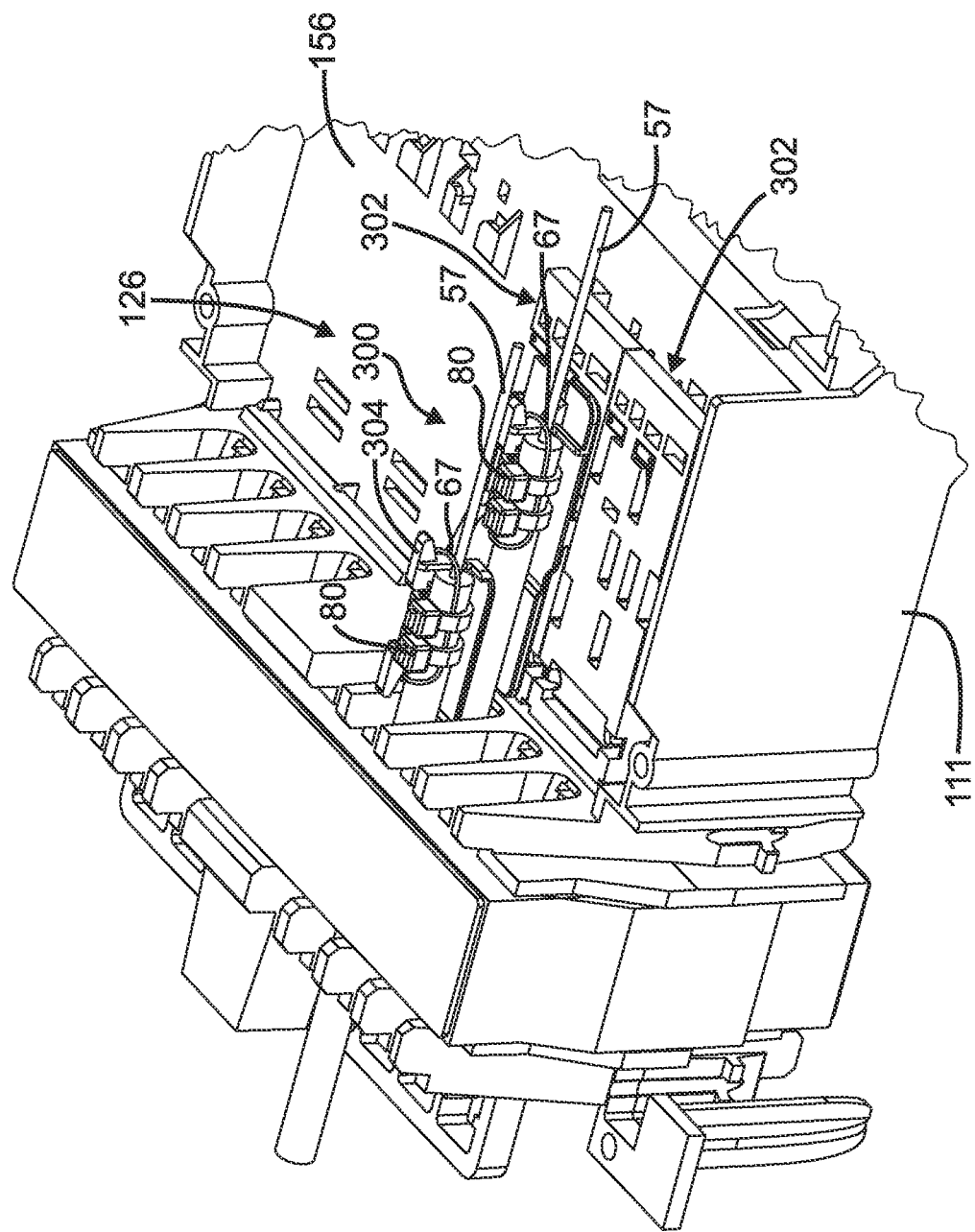
FIG. 21 is an enlarged view of a portion of the cable organizer of FIG. 3, including a cable fixation assembly and a pair of cables fixed to the cable fixation assembly.
Figure 22:
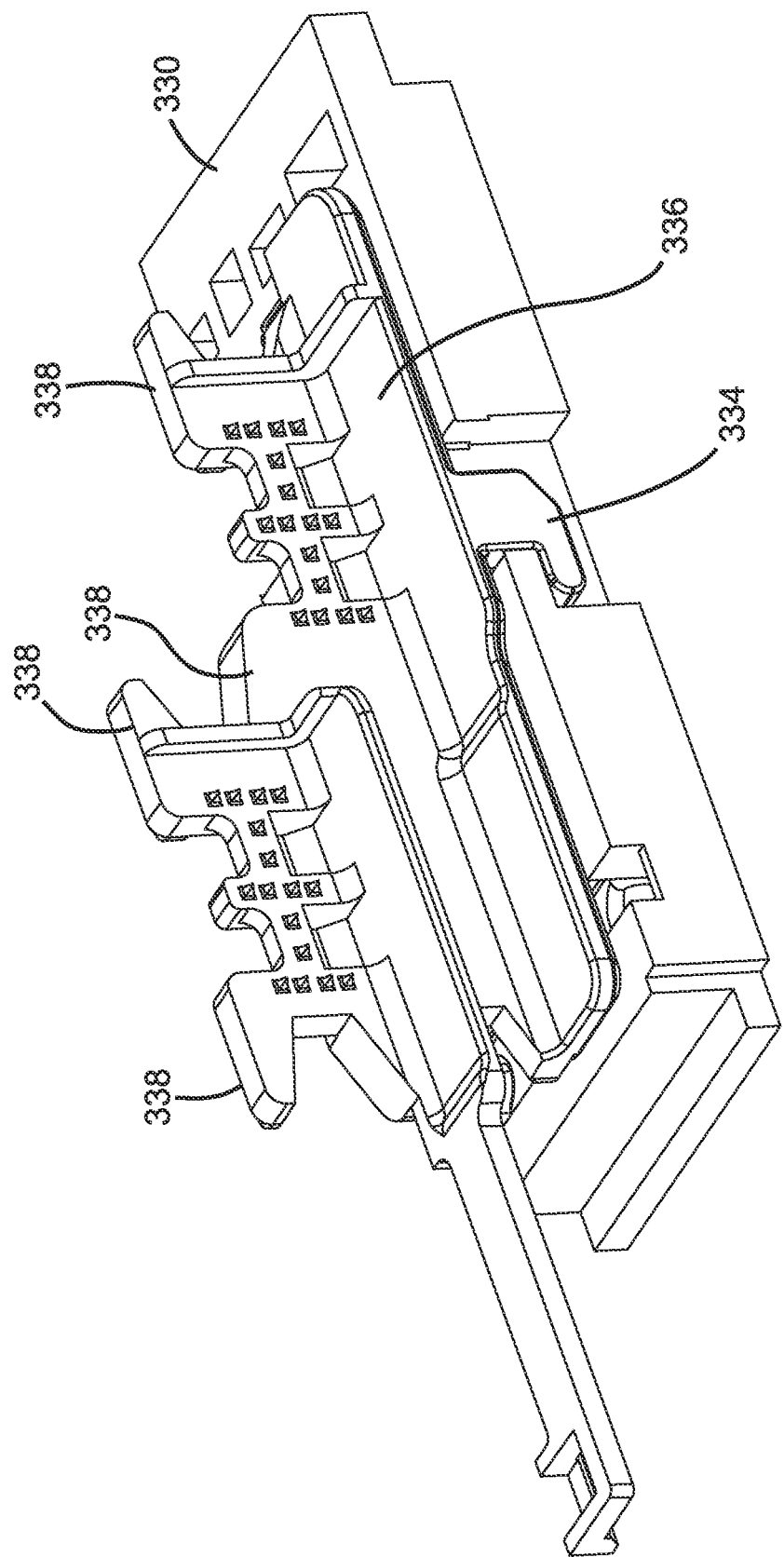
FIG. 22 is a perspective view of a subassembly of the cable fixation body of the cable fixation assembly of FIG. 21 mounted to an example base plate assembly according to the present disclosure.
Figure 23:
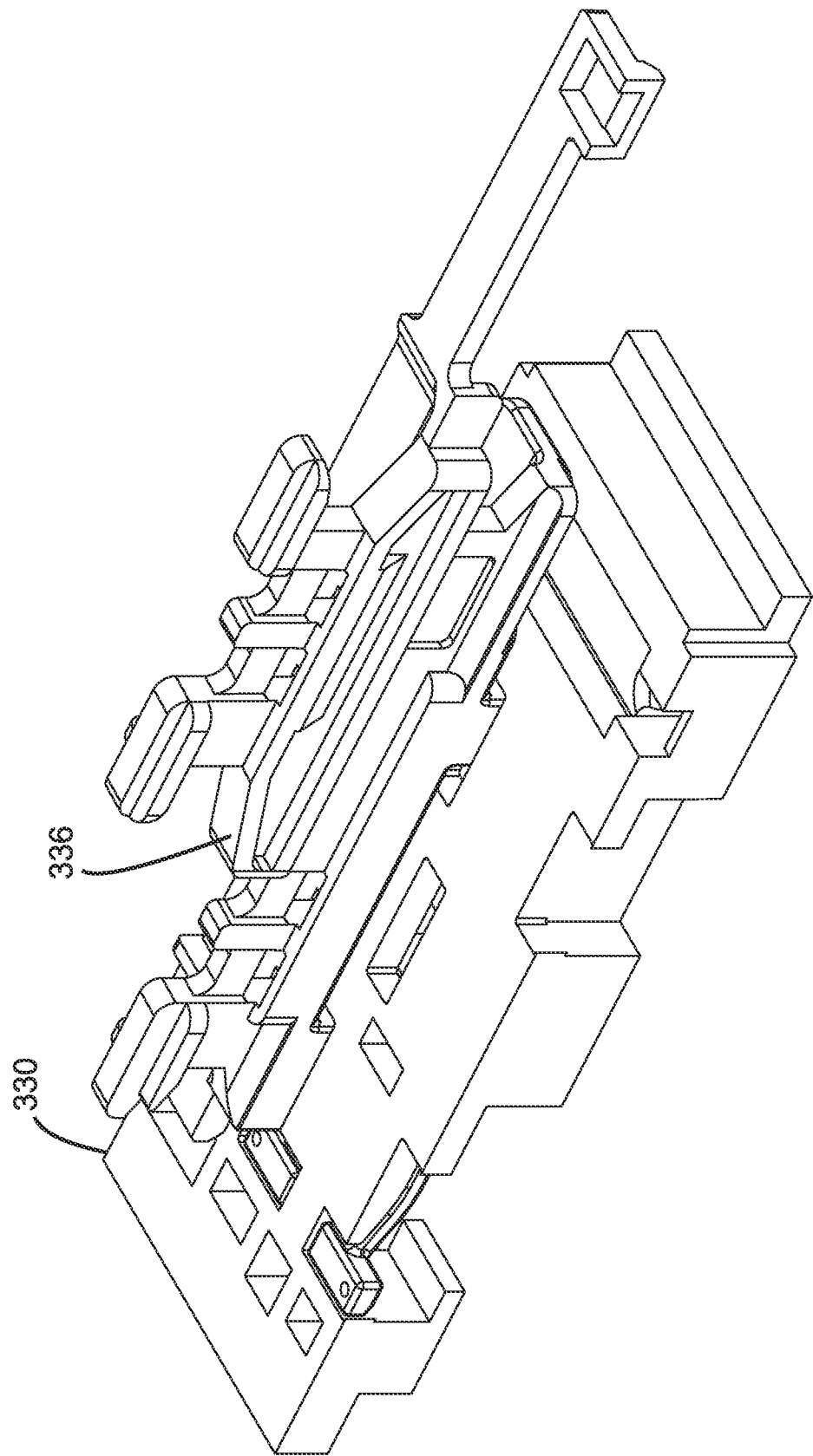
FIG. 23 is a further perspective view of the subassembly of FIG. 22.
Figure 24:
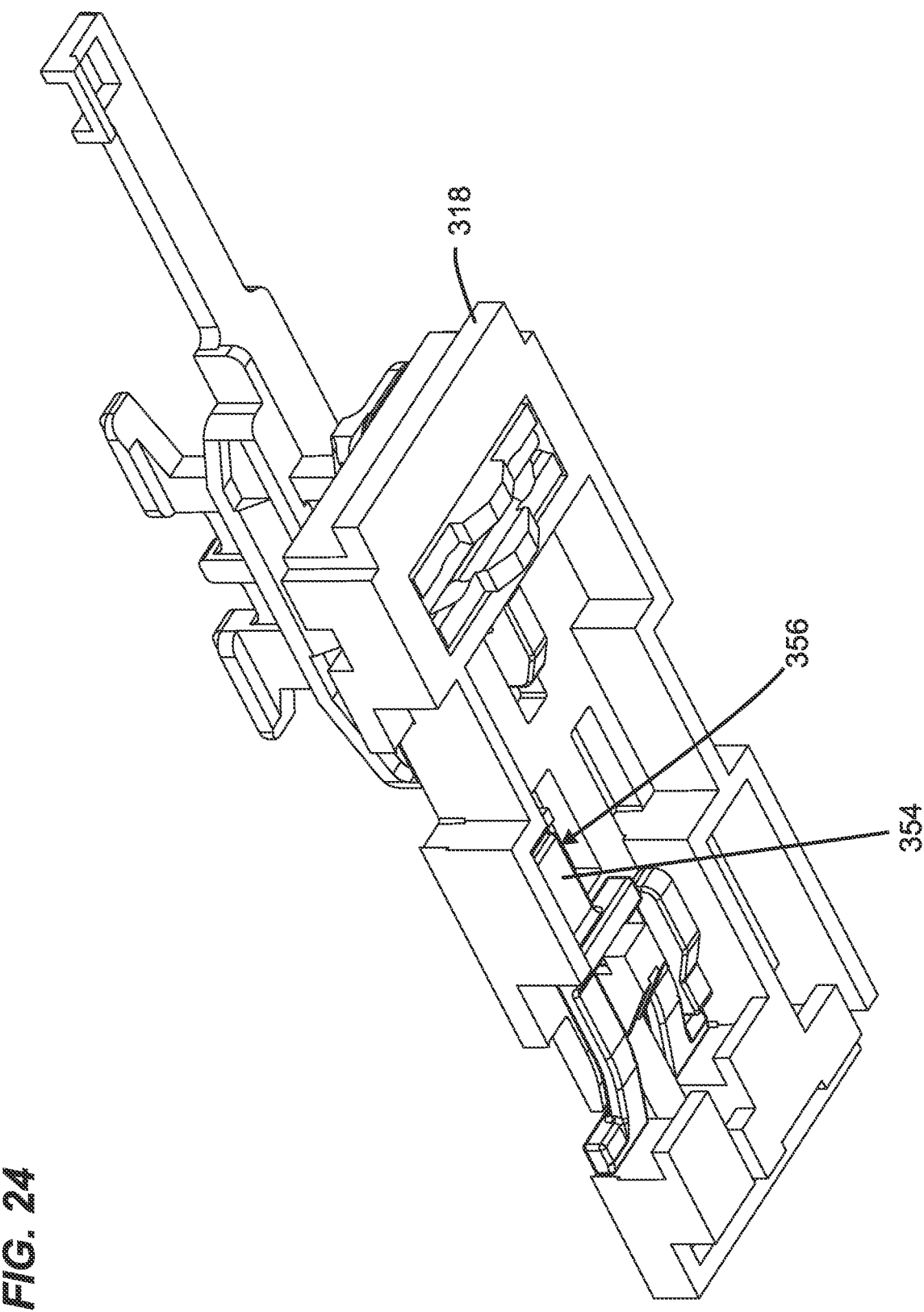
FIG. 24 is a further perspective of the subassembly of FIG. 22.

Referring to FIGS. 7-18, the cable fixation assembly 200 can provide one or more of these desirable features. The cable fixation assembly 200 includes a first cable fixation body 202 that is configured to span two adjacent cable ports and to support a cable extending through each of the adjacent ports. In some examples, the cable fixation body 202 is made from pressed metal. In some examples, the cable fixation body 202 is made from a polymeric material. The first cable fixation body 202 includes a pair of mounting tabs 204 that are downwardly insertable into mounting slots 206 located between the dividers 162 of the main support structure 111. To provide stability, tabs 204 are longitudinally offset such that one of the tabs 204 can be inserted in a slot 206, and the other 240 abuts a distally facing surface 163 of a divider 162 or a wall that forms a divider 162 (FIG. 20), such that the two tabs 204 essentially straddle a longitudinal wall thickness 165 adjacent a divider 162 (FIG. 20). The sizing and materials of the mounting tabs 204 and the slots 206 can be selected to provide for a frictional fit therebetween. The cable fixation body 202 also includes a U-shaped retaining bracket 209 configured to engage a divider 162 and prevent distal movement of an installed cable fixation body 202. With the tabs 204 installed about the wall thickness 165 and the retaining bracket 209 engaging a divider 162, the cable fixation body 202 is mounted to the main support structure 111.

Prior to mounting the cable fixation body 202 to the main support structure 111, one or two of the connectorized drop cables 60, which have already been connected to adapters, are clamped to the cable fixation body 202. Optionally, and depending on the diameter of the cable 60, the portion of the outerjacket of the cable 60 that is to be clamped to the main cable fixation body 202 is first wrapped in a substrate, such as a foam or tape to increase the diameter at the clamping location and thereby facilitate clamping. The cable 60 is placed on the first cable support wall 208 of the cable fixation body 202. The body 202 also includes a second cable support wall 212 transversely offset from the cable support wall 208, the support walls 208 and 212 being connected by base portion 214 from which also extend the mounting tabs 204, 206. When installed, the base portion 214 straddles one of the dividers 162. The cable 60 is then clamped to the cable support wall 208 with one or more clamps, such as zip ties 80. The zip tie or zip ties 80 are looped around the cable 60 and around the corresponding T-shaped tab 210 that is an integral part of the cable fixation body 202 and extends distally from the base 214. Optionally, a second drop cable 60 that passes through an adjacent port of the closure can be clamped in a similar fashion to the second cable support wall 212. Alternatively the lower level drop cable or drop cables can instead, or in addition, be clamped to the external portion 118 that is attached to the main structural support 111 and, particularly, to T-shaped tabs 234 of an external frame 232 of the external portion 118 that is configured to be positioned proximally from the seal blocks 174 and external to the closure volume.

Figure 12:
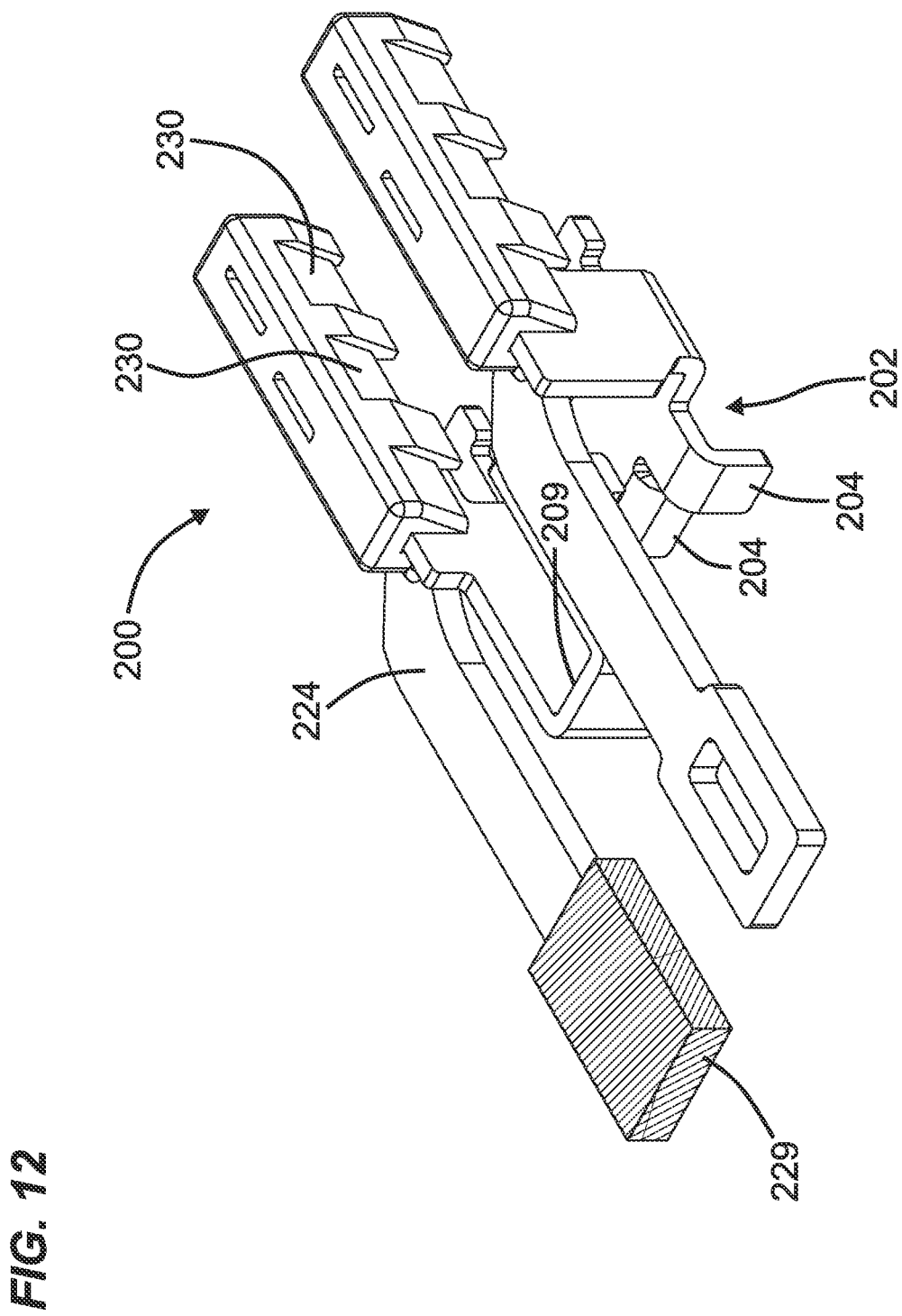
FIG. 12 is a perspective view of a cable fixation assembly according to the present disclosure.
Figure 13:
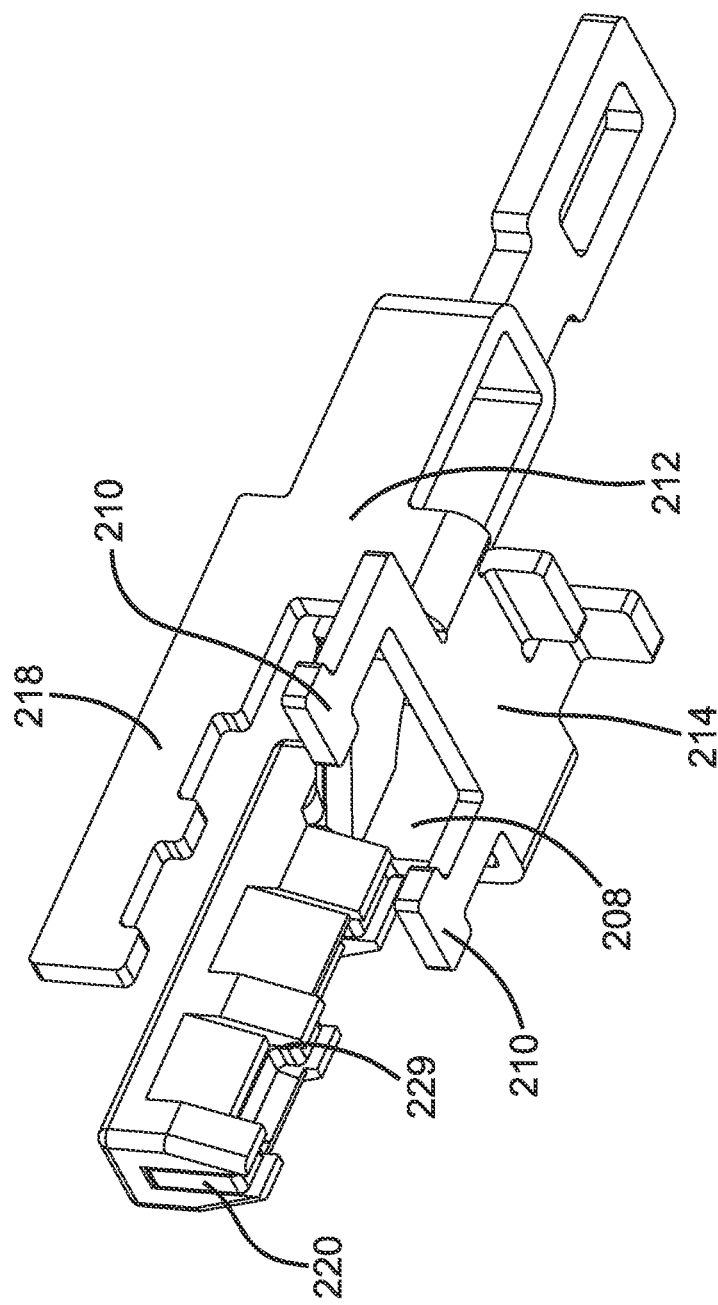
FIG. 13 is a perspective view of a further cable fixation assembly according to the present disclosure.
Figure 14:
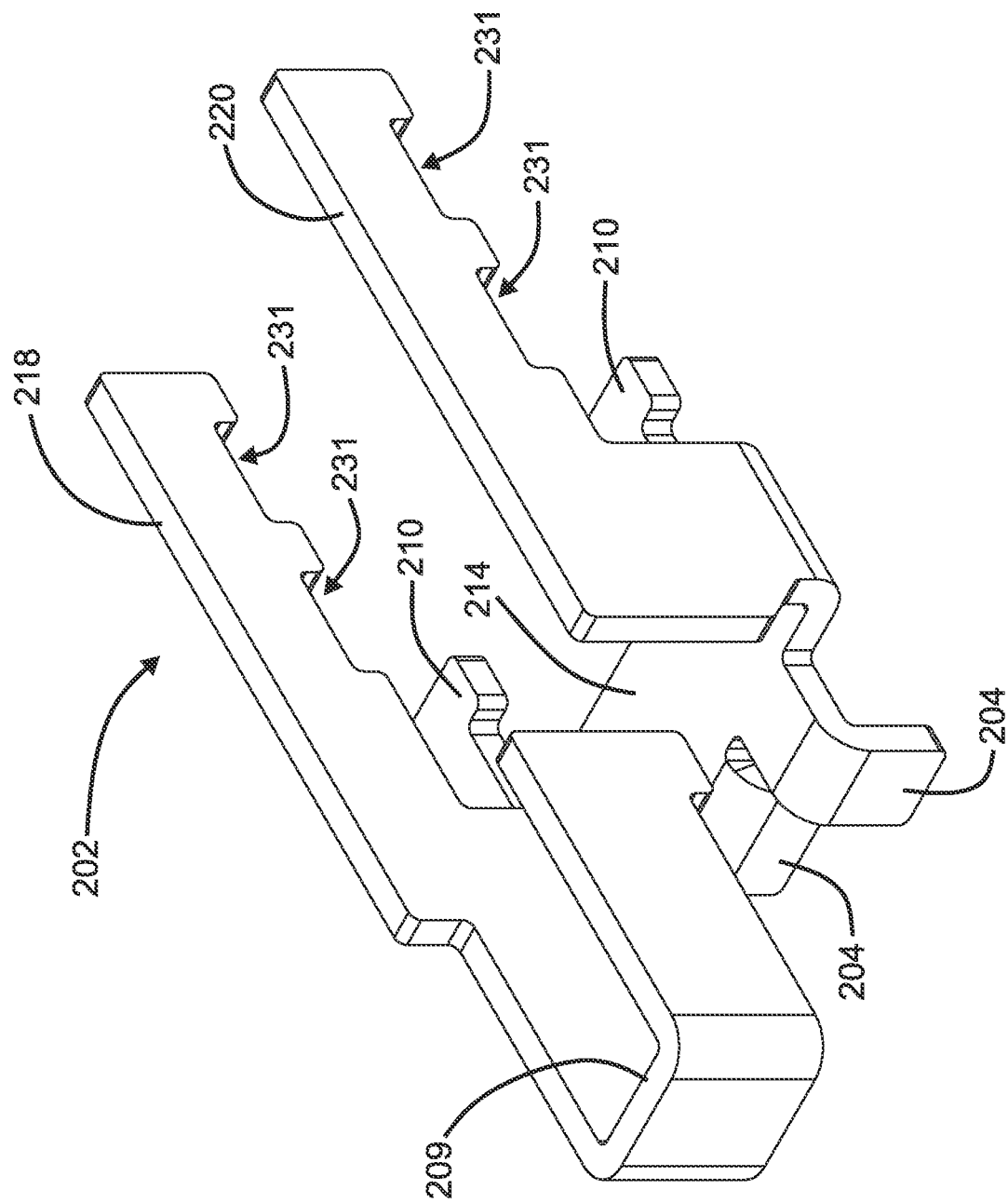
FIG. 14 is a perspective view of a portion of the cable fixation assemblies of FIGS. 12 and 13.
Figure 15:
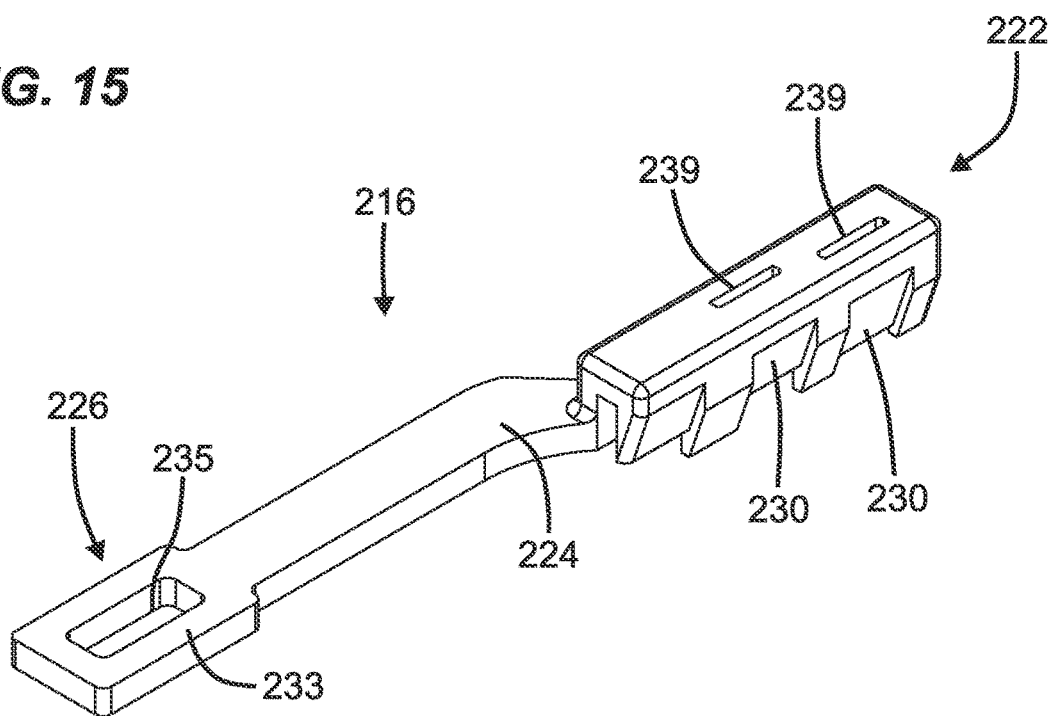
FIG. 15 is a perspective view of a further portion of the cable fixation assemblies of FIGS. 12 and 13.
Figure 16:
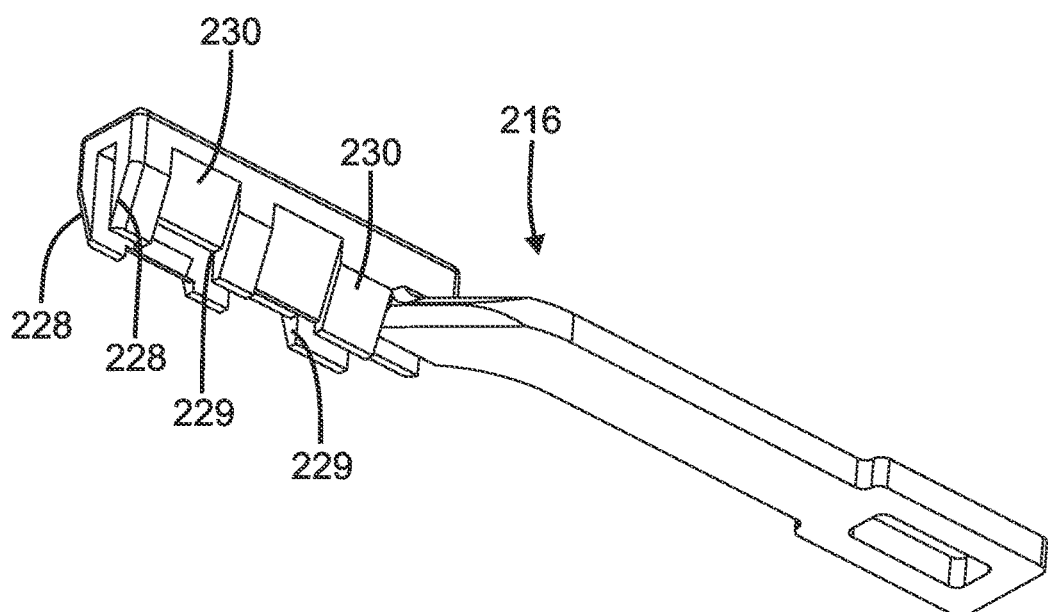
FIG. 16 is a further perspective view of the further portion of FIG. 15.
Figure 17:
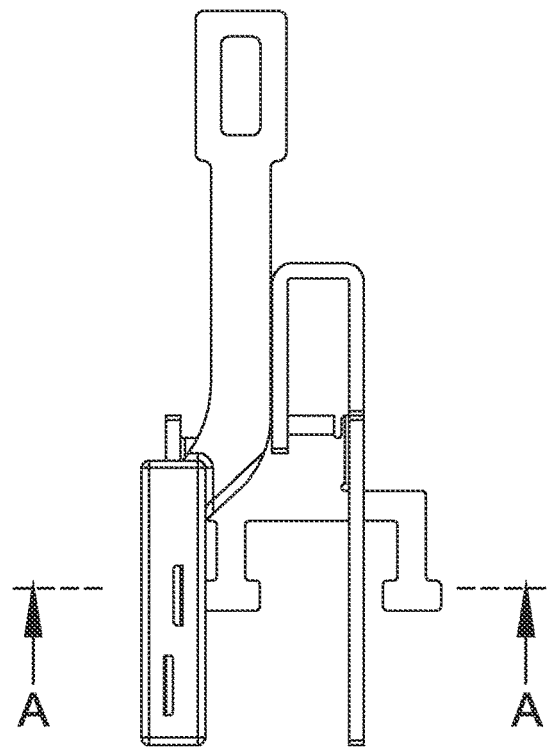
FIG. 17 is a top view of the cable fixation assembly of FIG. 12.
Figure 18:
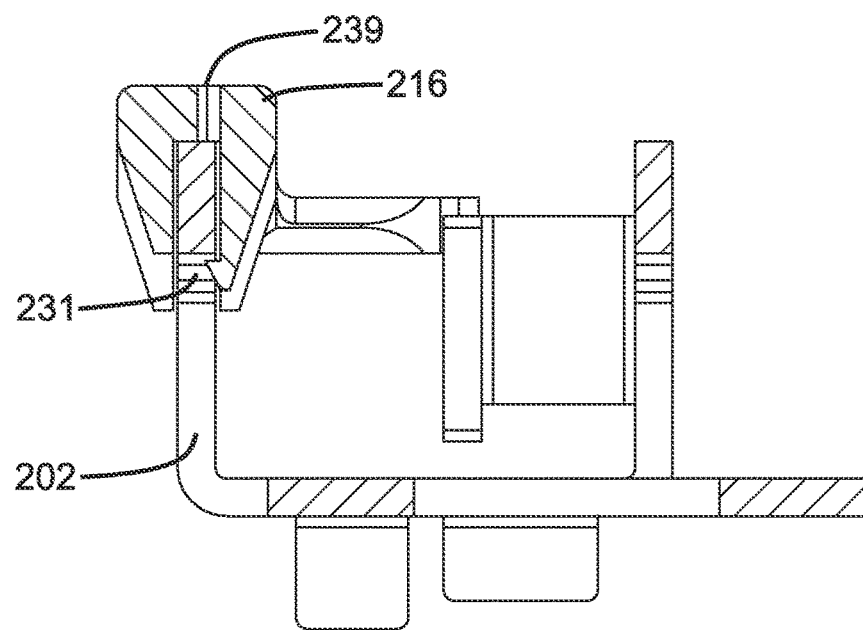
FIG. 18 is a cross-sectional view of the cable fixation assembly of FIG. 12 along the line A-A in FIG. 17.
Figure 19:
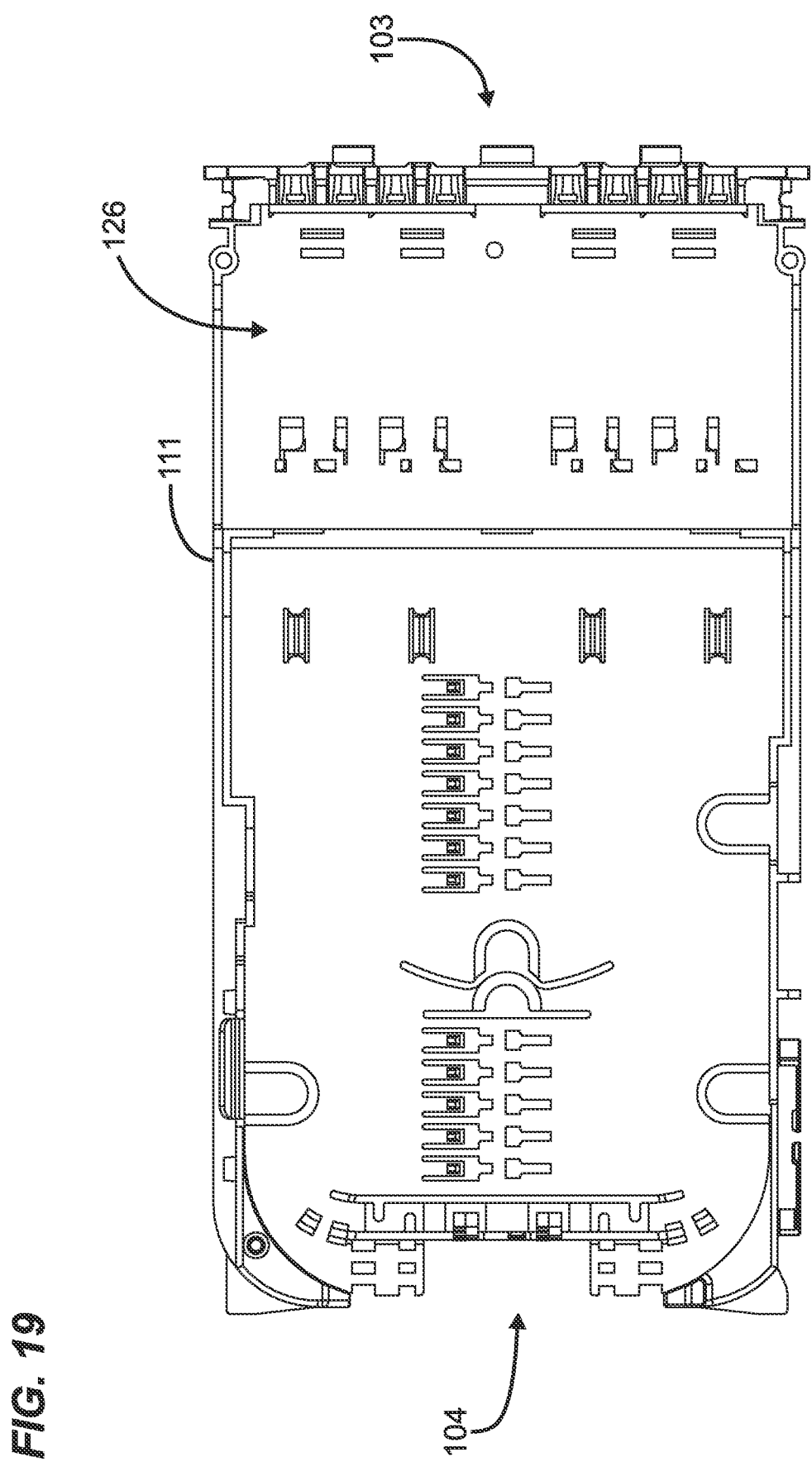
FIG. 19 is a top view of the main support structure of the cable organizer of FIG. 3.

If either or both of the closure ports served by the cable fixation body 202 is/are to receive a second cable vertically offset above the first cable, one or two upper cable fixation bodies 216 are clipped onto the first cable fixation body 202. In FIG. 12, two upper cable fixation bodies 216 are clipped onto support arms 218, 220 of the cable fixation body 202. In FIG. 13, just one upper cable fixation body 216 has been clipped onto the cable fixation body 202 at the support arm 220.

In some examples, the cable fixation body 216 is a plastic part that clips to the cable fixation body 202, which is a metal part.

The cable fixation body 216 includes a coupling portion 222, a cable support wall 224 and a seal anchor 226. The coupling portion 222 includes resilient clip arms 228 with latches 229 that lockingly clip to the corresponding support arm 218, 220 of the cable fixation body 202. By flexing the clip arms 228 outward, the cable fixation body 216 can be easily detached from the cable fixation body 202 to convert to a single cable fixation arrangement. The cable support wall 224 supports a cable vertically offset above a cable supported by the corresponding cable support wall 208, 212 below. The seal anchor 226 includes a frame 233 defining an opening 235 to which can be anchored a sealing component such as a gel piece or a gel pad 229 (schematically represented in FIG. 12). The seal anchor 226 projects proximally from the support wall 224 and is configured to be positioned within the seal blocks of the organizer to enhance the seal between the two vertically offset cables e.g., by filling a gap between the two vertically offset cables.

To clamp a cable to the cable fixation body 216, in some examples one or more clamps (e.g., zip ties 80) are tightened around the upper cable and the cable fixation body 216 with the strap portion of the zip tie being guided through the guide notches 230 defined by the cable fixation body 216 and the recesses 231. Slits 239 are provided in the cable support wall 224. The slits 239 are vertically aligned with the recesses 231 and the guide notches 230. Zip ties can be inserted through the slits 239, and through the recesses 231 and guide notches 230 to clamp a cable to the cable support wall 224. The slits 239 are transversely offset from each other, which can promote different zip tie insertion directions for the two ties that enter the slits, which can provide for a tighter clamping force on the upper cable. Such a clamping arrangement is housed within the closure volume together with the clamping arrangement of the lower cables. Alternatively (or in addition), the upper cables can be clamped outside the closure volume to the external portion 118 of the main structural support 111 and, particularly, to T-shaped tabs 234 of an external frame 232 of the external portion 118 that is configured to be positioned proximally from the seal blocks 174 and external to the closure volume. By positioning the clamping arrangement of the lower cables inside the closure volume and the clamping arrangement of the upper cables outside the closure volume, space inside the closure volume can be more effectively allocated.

In some examples, to affix a pair of connectorized cables in a vertically offset arrangement through a single port of the closure, the connectors are installed in adapters 152, following which one of the cables is clamped to the cable fixation body 202 or to the cable support structure external to the closure volume, following which the cable fixation body 216 is coupled to the cable fixation body 202, following which the cable fixation body 202 is mounted to the main support structure 111, following which the second cable is clamped to the cable fixation body 216 or to the cable support structure external to the closure volume. In alternative examples, both cables can be clamped before the cable fixation body 202 is mounted to the main support structure 111. In alternative examples, the second connector is installed in the corresponding adapter after the first cable is clamped to the cable fixation body 202.

Referring now to FIGS. 19-31, a further cable fixation assembly 300 that can be mounted at the cable fixation region 126 of the upper portion 122 of the main support structure 111 of the organizer 100 will be described. The cable fixation assembly 300 is configured to clamp (e.g., with zip ties 80) non-connectorized drop cables 61 whose outer jackets have had their distal portions stripped, exposing the optical fiber(s) 57 and strength yarn 67. It should be appreciated that a portion of the cable fixation region 126 can support connectorized cable fixation while another portion of the cable fixation region 126 supports non-connectorized cable fixation, and the cable fixation assemblies employed can be adjusted over time as dictated by fiber routing needs. That is, the main support structure 111 is configured to support multiple different configurations of cables and cable fixation assemblies.

The upper horizontal surface (or top horizontal surface) 156 is configured to lockingly mount a slotted base plate subassembly 302. The slotted base plate subassembly 302 is configured to lockingly mount one or more cable fixation bodies 304, as well as other cable fixation bodies with similar mounting portions that can engage the slots of the base plate subassembly as described below. The lower horizontal surface 158 is configured to lockingly mount one or more cable fixation bodies with mounting portion configurations that are different from those of the first cable fixation bodies, as will described in greater detail below. A base plate subassembly is not required for the cable fixation body fixation to the lower surface 158. The cables fixed at the lower surface 158 are generally of relatively large diameter, such as feeder cables. At the upper surface 156, the cables to be fixed are generally of relatively small diameter, such as drop cables, and the base plate subassembly 302 serves as a vertical spacer to vertically align the corresponding fixed cables with the appropriate cable port.

At or defined by the upper surface 156 are interfacing structures. The interfacing structures are configured to lockingly mount the base plate subassemblies 302. The interfacing structures include proximal and distal first mechanical stops 310 and 312 that define transversely elongate slots 314 and 316 above the upper surface 156. The proximal and distal mechanical stops 310 and 312 are aligned parallel to the longitudinal axis 12. The slots 314 and 316 are adapted to horizontally receive proximally sliding foot members 318 and 320 of the base plate subassembly 302. Additional slots 322 are defined by the wall 154 and extend downward from the upper horizontal surface 156. The slots 322 are configured to vertically receive downwardly inserting arm portions of a clip 324 of the base plate subassembly 302.

The base plate subassembly 302 includes a plate member (or plate) 330 including a plurality of vertically extending through slots 332. The through slots 332 are sized and positioned on the plate 330 to receive hooked members 334 of the cable fixation body 336. The cable fixation body 336 is configured to affix a pair of jacketed portions of non-connectorized drop cables 61. The cable fixation body 336 further includes strength member anchors 338 about which strength yarn 67 from the drop cables 61 can be looped and tied off for enhanced overall fixation of the cables.

The plate member 330 defines a cavity 340 the extends through an entire vertical thickness of the plate member 330 and is open at the top surface 342 and the bottom surface 344 of the plate member 330. Within the vertical thickness of the plate member 330, a bar 346 spans a transverse dimension of the cavity 340.

The subassembly 302 includes the clip 324. The clip 324 is configured to snappingly engage the bar 346 such that the flexibly resilient clip arms 348 grasp the bar 346 and lower portions of the clip arms 348 extend below the bar and below the bottom surface 344 of the plate member and into the slot 322, thereby restricting horizontal movement of the plate member 330 relative to the upper surface 156, while engagement of the foot members 318 and 320 with the slots 314 and 316 restricts upward movement of the plate member 330 relative to the upper surface 156, such that the plate member 330 is locked to the main support structure 111.

Figure 25:
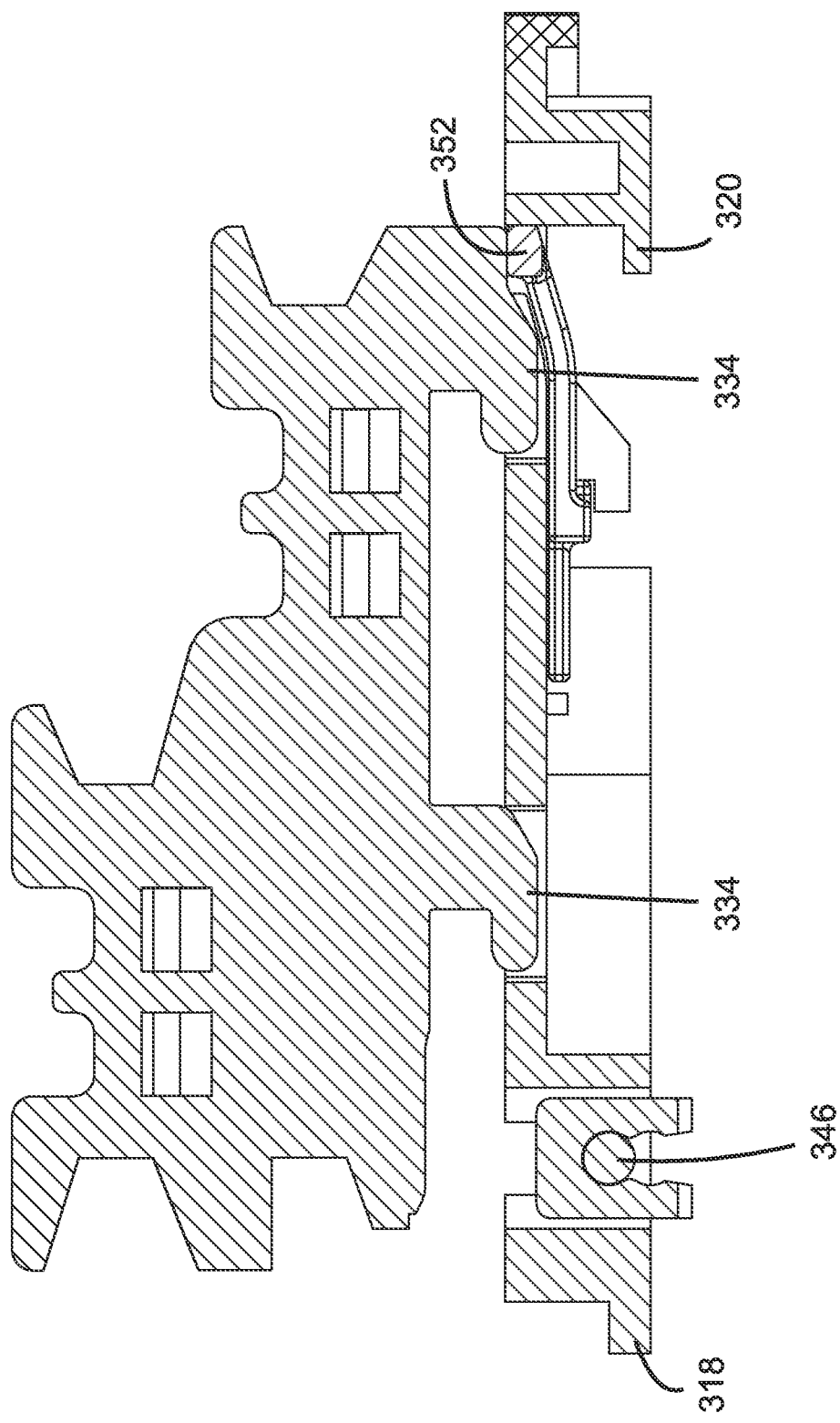
FIG. 25 is a cross-sectional view of the subassembly of FIG. 22 in a pre-assembled configuration.
Figure 26:
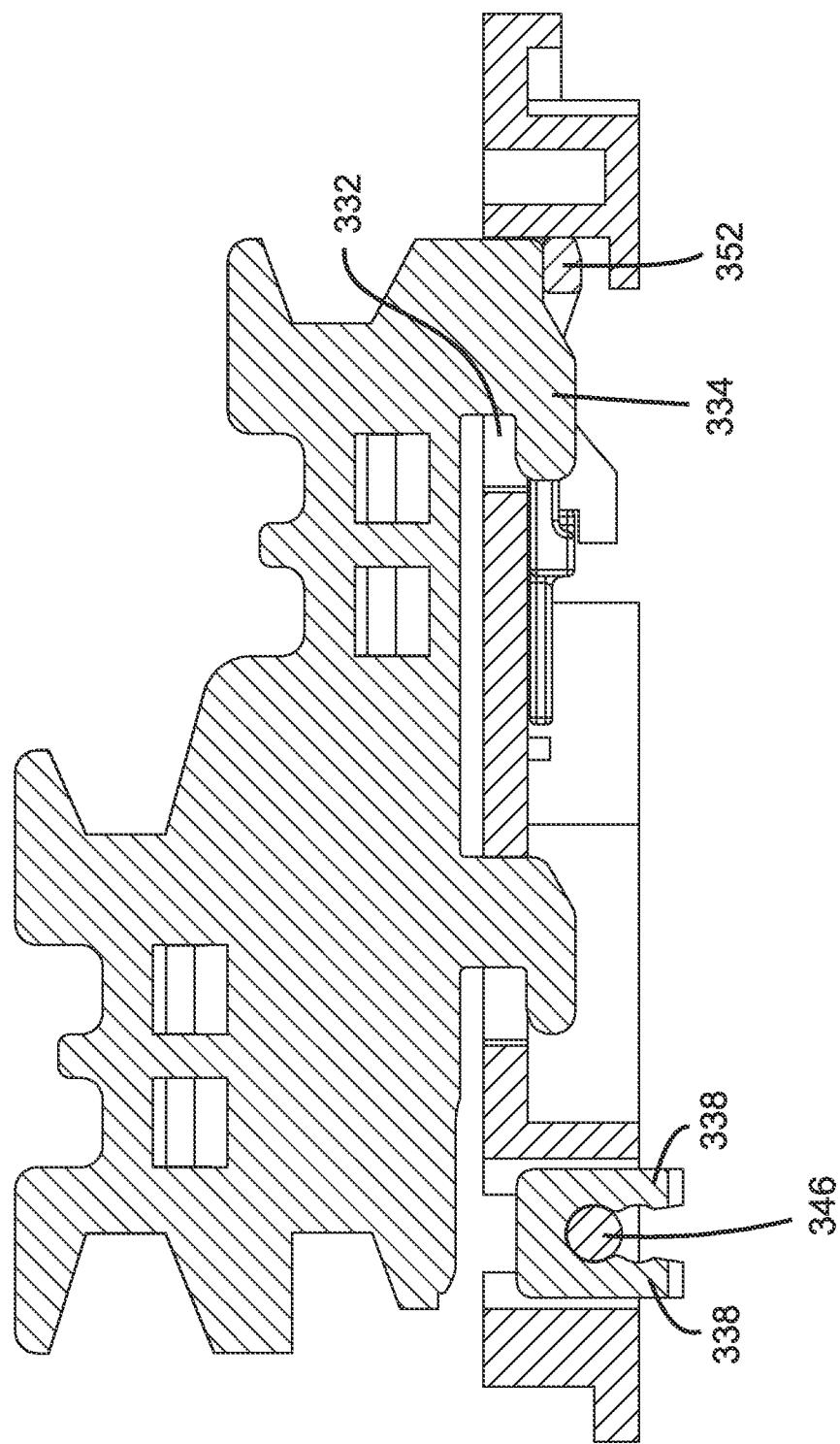
FIG. 26 is a cross-sectional view of the subassembly of FIG. 22 in a partially assembled configuration.
Figure 27:
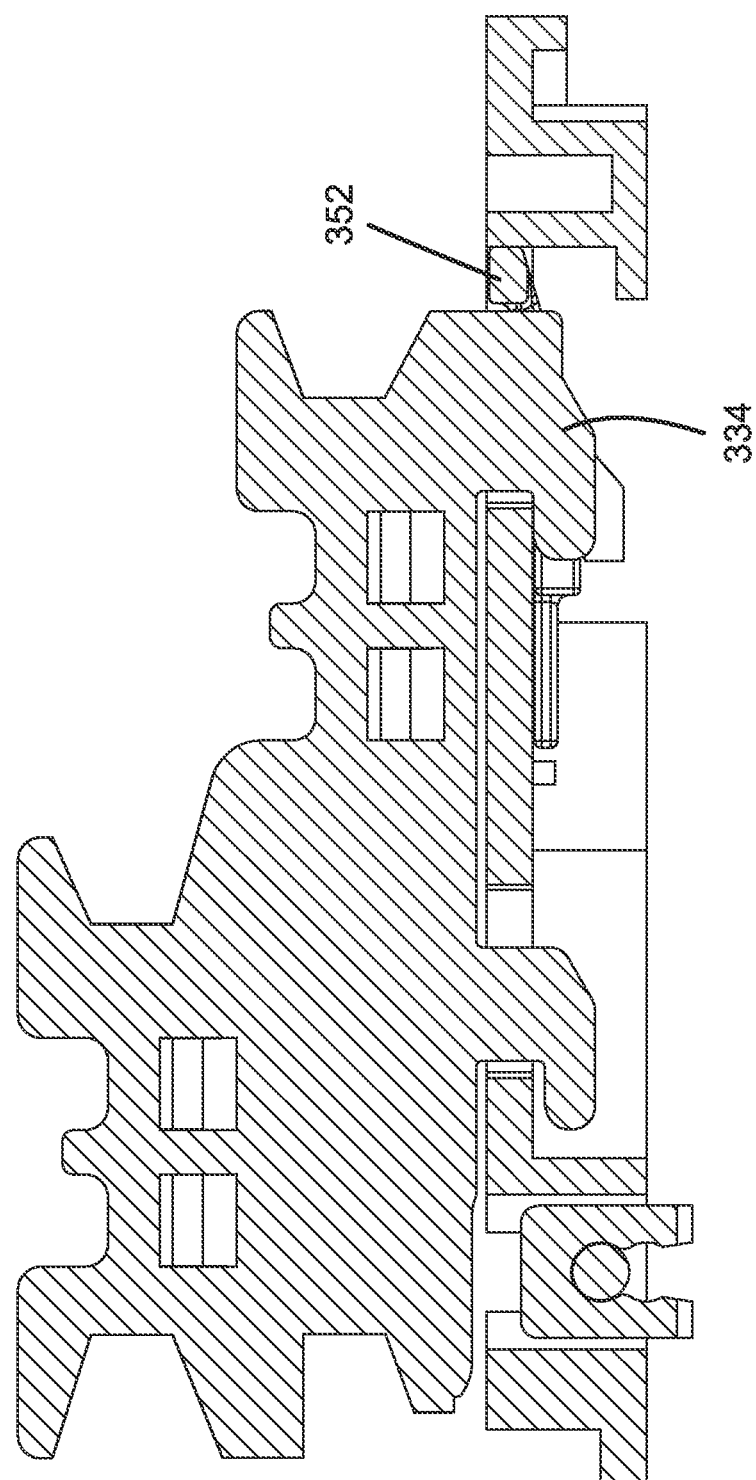
FIG. 27 is a cross-sectional view of the subassembly of FIG. 22 in an assembled configuration.
Figure 28:
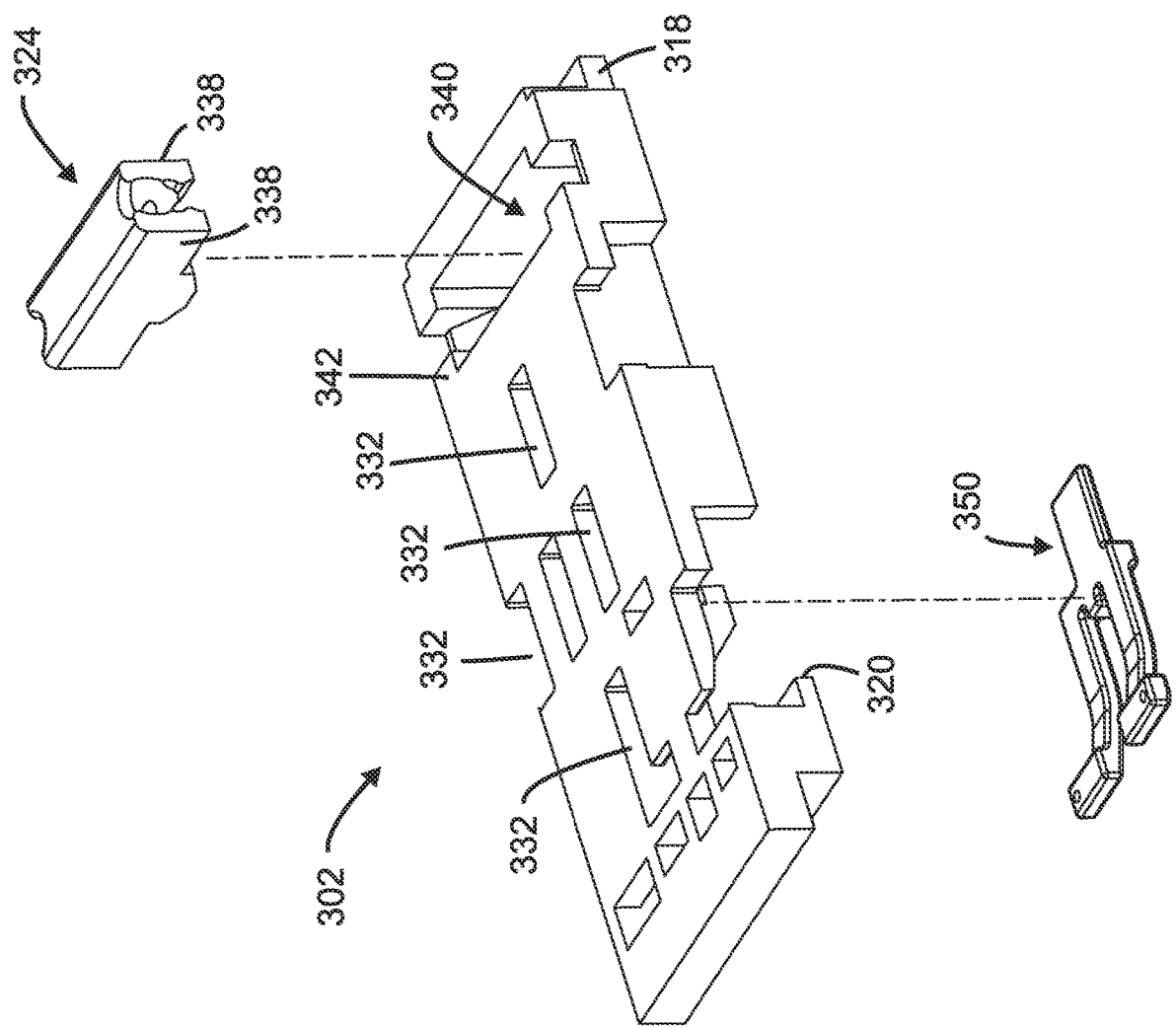
FIG. 28 is an exploded view of the base plate assembly of FIG. 22.
Figure 29:
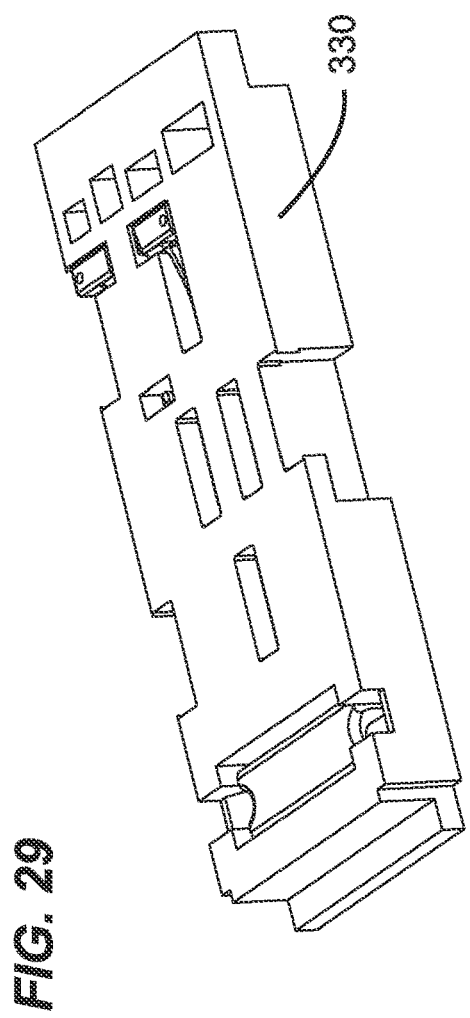
FIG. 29 is a perspective view of the base plate assembly of FIG. 22.
Figure 30:
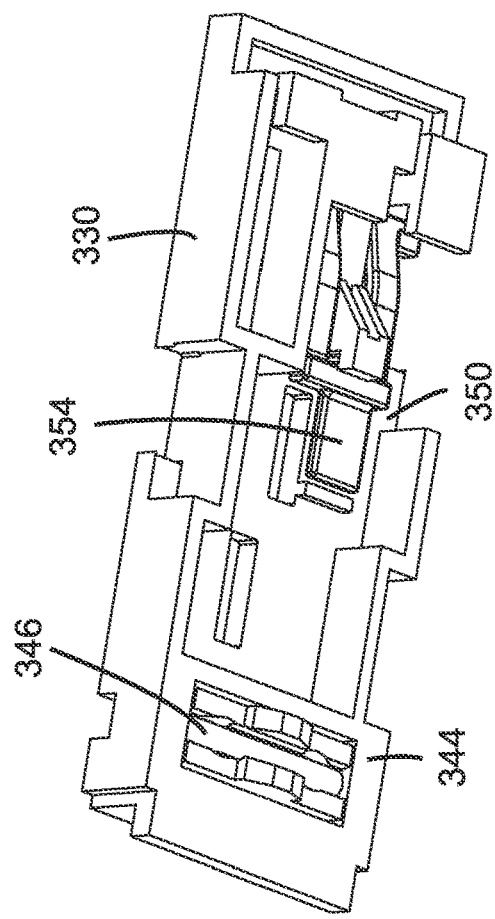
FIG. 30 is a further perspective view of the base plate assembly of FIG. 22.
Figure 31:
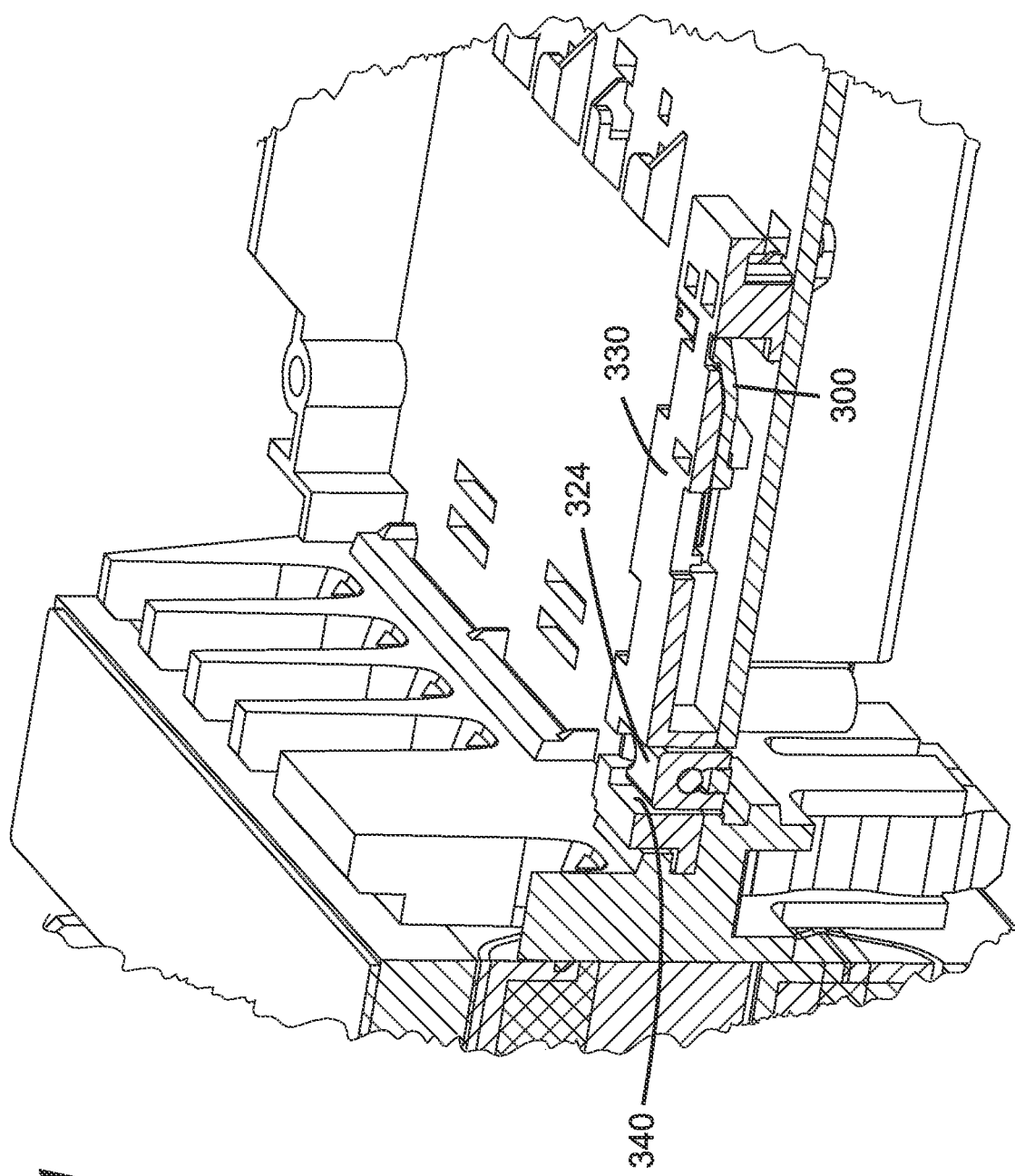
FIG. 31 is a cross-sectional perspective view of the base plate assembly of FIG. 22 mounted to the cable organizer of FIG. 3.

The subassembly also includes a spring element 350 coupled to the plate member 330. As shown in the installation progression of the cable fixation body 336 to the plate member 330 in FIGS. 25, 26 and 27, the spring element 350 cooperates with one of the through slots 332 to lock the hooked members 334 of the cable fixation body 336 to the plate member 330. As shown in FIGS. 25 and 26, one of the hooked member 334 presses down the free end 352 of the spring element 350 until the hooked member 334 vertically clears the vertical thickness of the plate member 330, at which point the cable fixation body 336 is slid proximally, causing the free end 352 of the spring element 350 to be released and return to its relaxed positioned within the through slot in which it restricts distal movement of the hook member 334, thereby locking the cable fixation body 336 to the plate member 330. To remove the cable fixation body 336 from the plate member 330, the spring element 350 can be flexed downward allowing the hooked member 334 to slide distally and be lifted out of the through slot. A fixed end 354 of the spring element 350 is captured by a pocket 356 defined by the plate member 330 at the bottom of the plate member 330.

The foot member 318 (and, optionally also the foot member 320) spans an entire transverse width of the plate member 330, thereby providing enhanced coupling of the plate member 330 to the main support structure 111. In addition, the foot member 318 is the proximal-most end of the plate member 330.

It can be appreciated that the foregoing features of the subassembly 302 and main support structure 111 allow for an easily installable and de-installable plate assembly with respect to the main support structure 111, as well as a secure coupling of the subassembly 302 to the main support structure 111.

Referring now to FIGS. 32-39, a further cable fixation assembly 400 that can be mounted at the cable fixation region 130 of the lower portion 124 of the main support structure 111 of the organizer 100 will be described. The cable fixation assembly 400 is configured to clamp a single non-connectorized drop cable 50 (e.g., a feeder cable) whose outer jacket has had its distal portion stripped, exposing the optical fiber(s) 79 and a rigid strength rod 69.

At or defined by the lower (or bottom) surface 158 of the wall 154 are interfacing structures for lockingly mounting one or more cable fixation bodies 402. The interfacing structures include proximal and distal mechanical stops 404 and 406 positioned below the lower horizontal surface 158. The stops 404 and 406 define slots 408 and 410 vertically positioned between the stops 404, 406 and the lower horizontal surface 158. The stops 404 and 406 area aligned parallel to the longitudinal axis 12. The slots 408 and 410 are configured to horizontally (in a proximal sliding direction) receive foot members 412 and 414 of the cable fixation body 402 to restrict downward vertical separation of the cable fixation body 402 from the lower surface 158.

Fins 420 project downwardly from the lower surface 158 and are elongate parallel to the longitudinal axis 12. A fin 420 is configured to engage a chamfered and longitudinally elongate fin slot 422 of the cable fixation body 402 to resist transverse movement of the cable fixation body 402 relative to the lower surface 158. Flexible members 424 positioned distally of the distal mechanical stops 406 are positioned and configured to resist distal movement of the cable fixation body 402 relative to the lower surface 158. The flexibly resilient member 424 can be resiliently flexed downward or upward to install the cable fixation body 402 on the main support structure 111, and then released to its relaxed position shown in which it blocks distal movement of the cable fixation body 402.

The foot member 412 is positioned at a proximal-most end of the main body.

The lower surface 158 includes a set of the interfacing structures per cable port or corresponding opening between dividers 164, such that plurality of the cable fixation bodies 402 (in this example, four such cable fixation bodies 402) and cables 50 can be affixed at the lower surface 158.

It can be appreciated that the foregoing features of the subassembly 400 allow for an easily installable and de-installable cable fixation body directly to the main support structure 111, as well as a secure coupling of the cable fixation body 402 to the main support structure 111.

Figure 4:
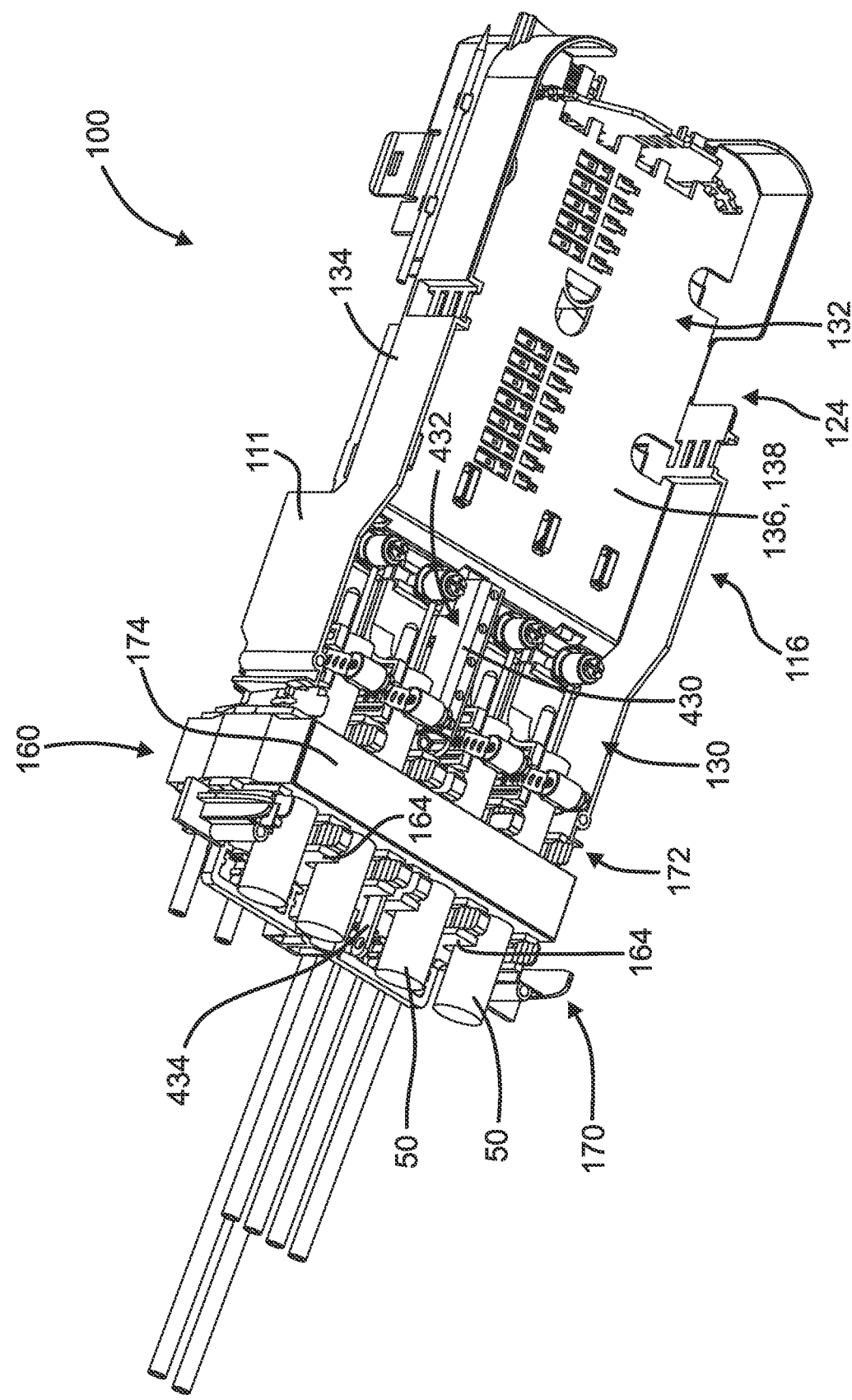
FIG. 4 is a bottom perspective view of the cable organizer and cables of FIG. 3.
Figure 5:
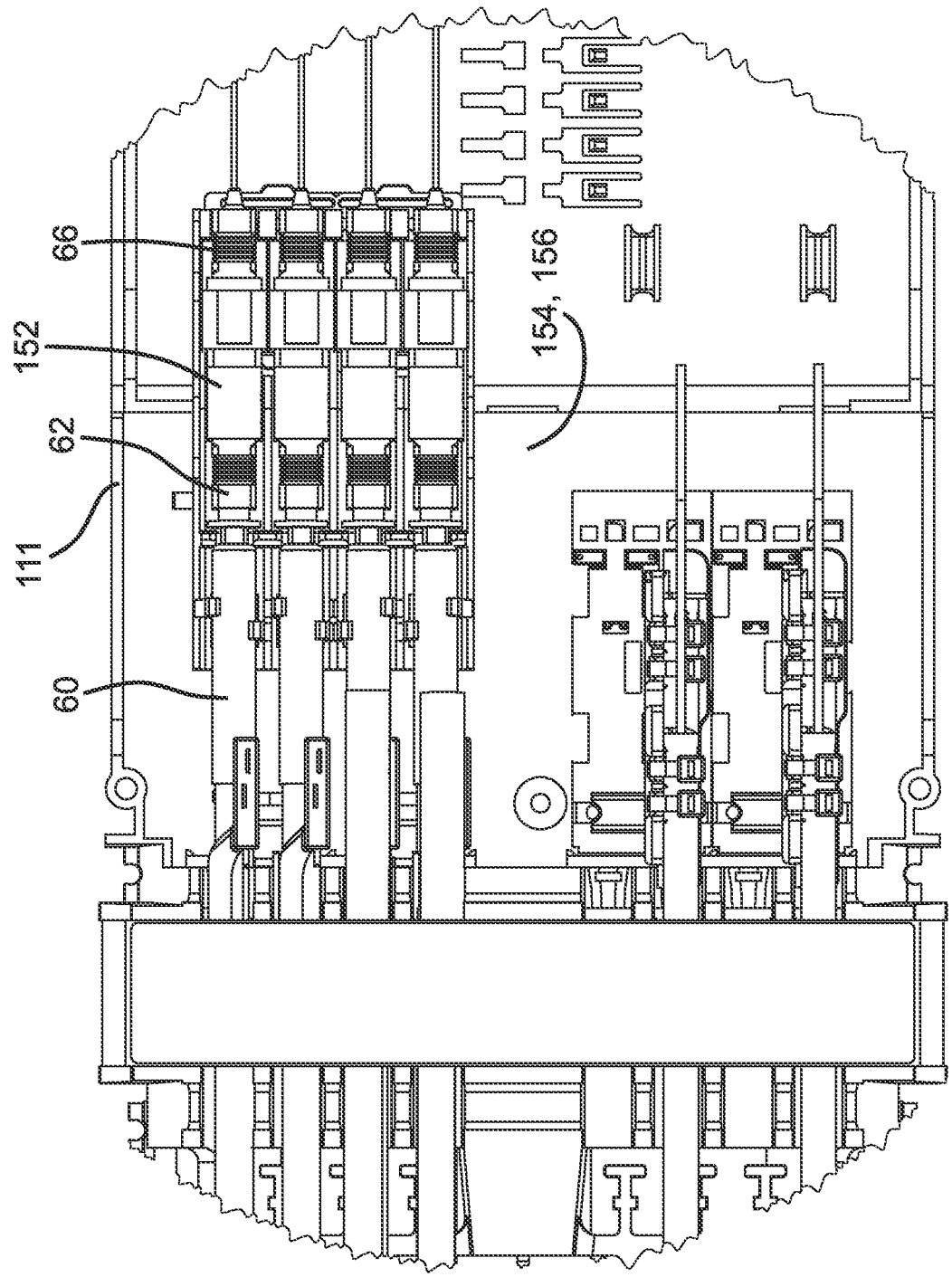
FIG. 5 is a top, planar, enlarged view of a portion of the cable organizer and cables of FIG. 3.
Figure 6:
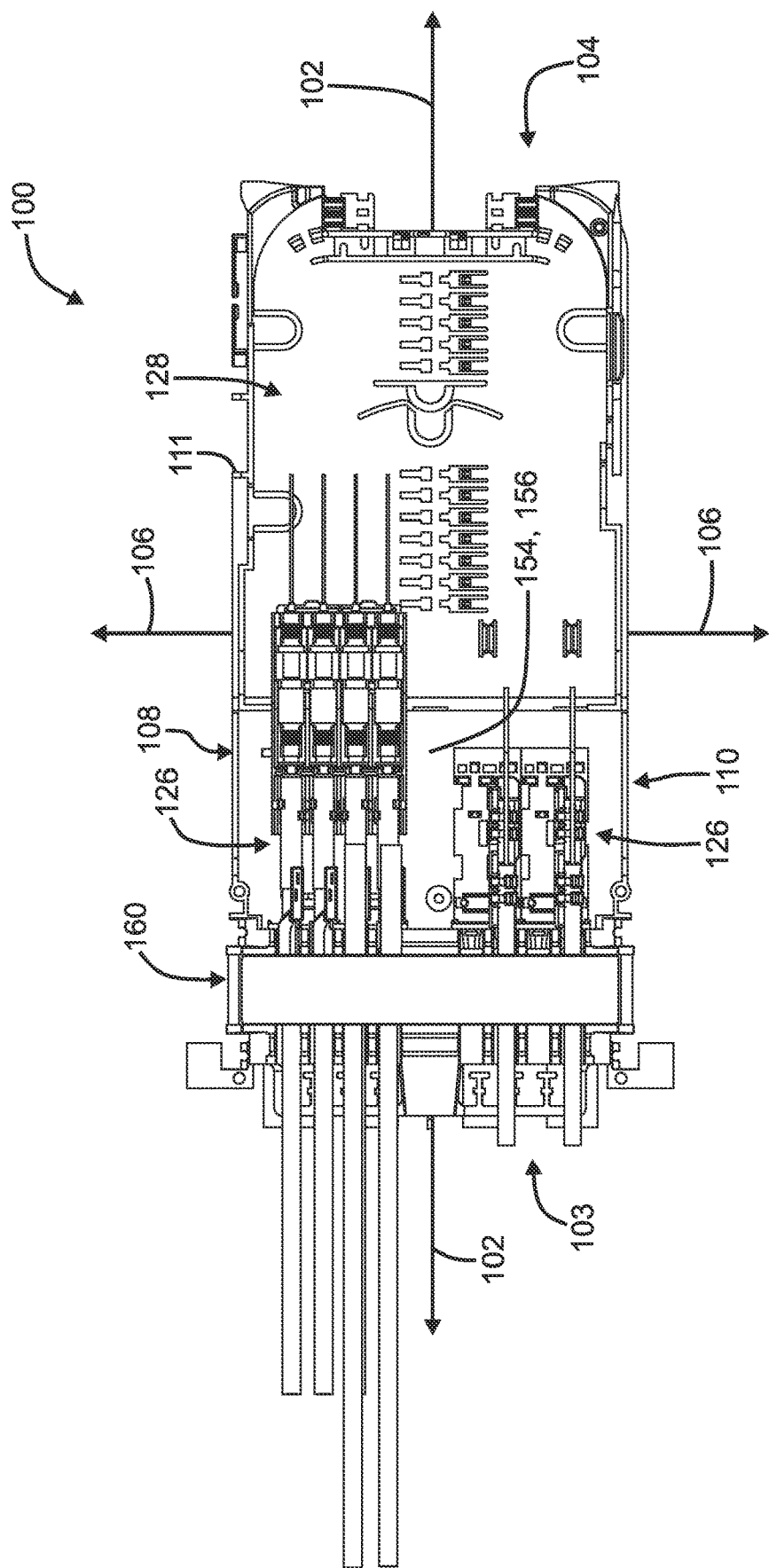
FIG. 6 is a top, planar view of the cable organizer and cables of FIG. 3.

The main support structure 111 also includes a block 180 projecting downward from the lower surface 158 of the wall 154. The block 180 can be an integrally formed (e.g., in a mold) component of the main support structure 111. The block 180 is configured to support and engage a body 430 of an electrical grounding assembly 432 (FIG. 4). The body 430 of the electrical grounding assembly 432 can be fastened to the block 180. The electrical grounding assembly 432 can include a grounding rod 434 (FIG. 4) extending proximally from the body 430 to an exterior of the closure. The cable fixation bodies 402 can be made from an electrically conductive material and conductively linked via a grounding conductor secured to the grounding post 440 (e.g., by crimp sleeve) at one end of the cable fixation body 402, and at the grounding body 430 (e.g., with a threaded fastener) at the end other end of the grounding conductor, in order to electrically ground the cable clamped to the cable fixation body 402. To this end, a conductive path can be established from one or more conductive components of the cable 50 to the grounding post 440. Such conductive cable components can include, e.g., the strength rod 69, which can metallic, or a cylindrical conductive shield that is positioned within the cable's outer jacket and around the fibers 79. The conductive path from the conductive shield can include a metallic cable clamp 450 that contacts the conductive shield. The conductive path from the strength rod can include a strength rod fixation assembly that is fastened to the cable fixation body 402.

Referring now to FIGS. 32-45, a cable fixation assembly 500 that includes the cable fixation body 402 will be described.

The cable fixation body 402 includes a main body 460 defining a cable support surface 462. The cable fixation body 402 includes a cable jacket fixation portion 464 and a strength member fixation portion 466. The cable jacket fixation portion 464 is configured to couple to a cable jacket clamp (e.g., a hose clamp having a strap portion that passes through slots 468) that is clamping a cable to the cable support surface 460.

The strength member fixation portion 466 includes a pair of tracks 470 on either side of a recess 472. The tracks 470 and the recess 472 are elongate parallel to the transverse axis.

The assembly 500 includes a strength member fixation subassembly 474 for anchoring a rigid strength rod, strength yarn (e.g., aramid yarn), or both a rod and yarn. The subassembly 474 includes an upper strength member clamp body 476 defining opposing shoulders 478 configured to couple to and slide along the tracks 470 to adjust a transverse position of the strength member fixation subassembly 474. The subassembly 474 also includes a lower strength member clamp body 480 that includes a press pin 482. Interior threads 484 of the lower strength member clamp body 480 cooperate with exterior threads 486 of the upper strength member clamp body 476 to allow rotational advancement of the lower clamp body towards the upper clamp body.

A set screw 488 is threadably received in a hole 490 of the upper clamp body 476. The set screw 488 is used to set the transverse position of the upper clamp body 476 relative to the tracks 470. That is, the set screw 488 can be rotated to dig into the upward facing surface 492 of the recess 472 at the desired transverse position.

The upper clamp body 476 includes a channel 494 defined by two walls 496, 498. The strength rod 69 of the cable 50 is received in the channel 494 above the set screw 488 and the corresponding hole 490.

The subassembly 474 also includes a press plate 510 positioned directly above the strength rod and configured to complement the cross-sectional horizontal shape of the upper clamp body 476.

The lower strength member clamp body 480 is threadably screwed onto the upper clamp body 476, causing the press pin 482 to press on the underside of the press plate 510 and thereby anchor the strength rod 69 within the channel 494.

The transverse slidable cooperation between the upper clamp body 476 and the tracks 470 can advantageously allow for improved longitudinal alignment of the strength member fixation subassembly 474 for strength rods of different sized cables.

Referring now to FIGS. 46 and 48-57, a further example cable fixation assembly 600 is shown. The assembly 600 includes a hose clamp 602 that is clamping an outer jacket of a cable 50 to a main cable fixation body 604. The cable 50 includes a strength rod 69.

The assembly 600 includes a strength member subassembly 606 that can advantageously provide a strong fixation of the rod 69 with an easily adjustable magnitude of clamping or fixation force on the rod 69.

The following description will presume on orientation of the assembly 600 based on its mounting to the lower surface 158 of the wall 154 of the main support structure 111 in the same manner as the mounting of the cable fixation body 402 thereto as described above.

The subassembly 606 includes a first clamp body 608, which can be unitarily constructed with the cable fixation body 604, or alternatively fastened thereto. The clamp body 608 includes a pair of transversely spaced guide ramps 612, 614 inclined downward as the guide ramps 612, 614 extend distally. The ramps 612, 614 define a substantially triangular shaped cavity 610 positioned therebetween that can receive a portion of the second clamp body 618, providing additional mechanical engagement between the clamp bodies 608 and 618.

The clamp body 608 includes a first clamp surface 616 positioned below the ramps 612, 614.

The second clamp body defines a second clamp surface 620 flanked by transversely spaced apart vertical walls 640, 642. The second clamp body 618 is configured to couple to and slide distally down the ramps 612, 614 to press and clamp the strength rod 69 between the clamp surfaces 616 and 620. The clamp body 618 includes transversely spaced part angled shoulders 644, 646 that engage the ramps 612, 614 for sliding the clamp body 608 up and down the ramps.

The subassembly 606 includes a screw 622 that longitudinally extends through a vertically elongated slot 624 that permits a limited vertical range of motion for the screw 622 within the elongated slot 624. The second clamp body 618 is configured to advance down the ramps 612, 614 by rotating action of the screw 622 as the screw 622 threadably engages a hole 627 in the second clamp body. As the second clamp body 618 advances down the ramps distally upon rotating action of the screw 622, the screw 622 moves downward (in the direction 650) in the slot 624 (from the configuration illustrated in FIGS. 49-51 to the configuration illustrated in FIGS. 52-54), vertically holding the second body 618 as it moves toward the first clamp surface 616 to clamp the strength rod 69 with the desired force. To release the strength rod, the screw 622 can be rotated in the opposite direction to push the clamp body 618 up the ramps, causing the clamp surfaces 616, 620 to release the strength rod 69.

Figure 58:
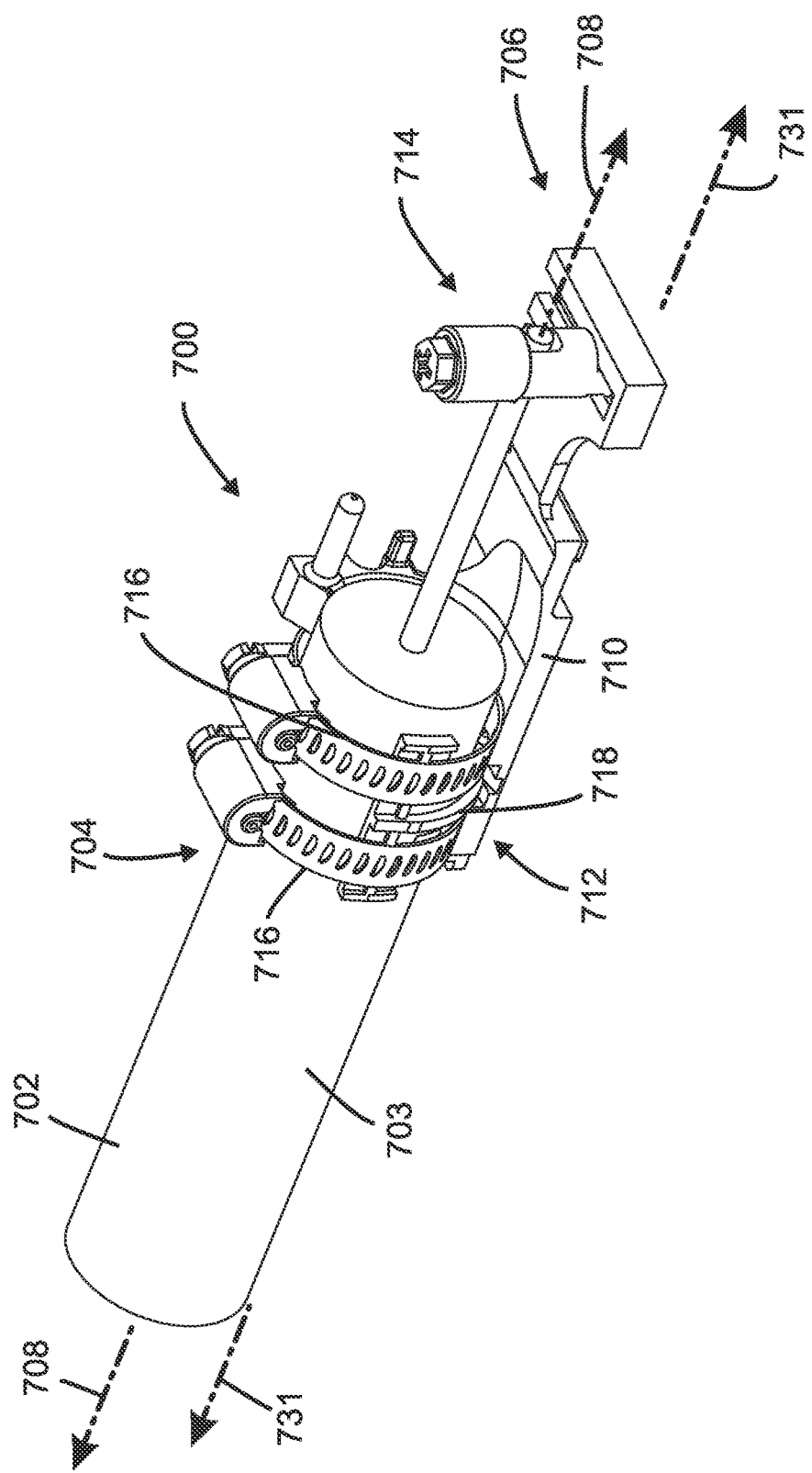
FIG. 58 is a perspective view of a further example cable fixation assembly according to the present disclosure, including a cable.
Figure 59:
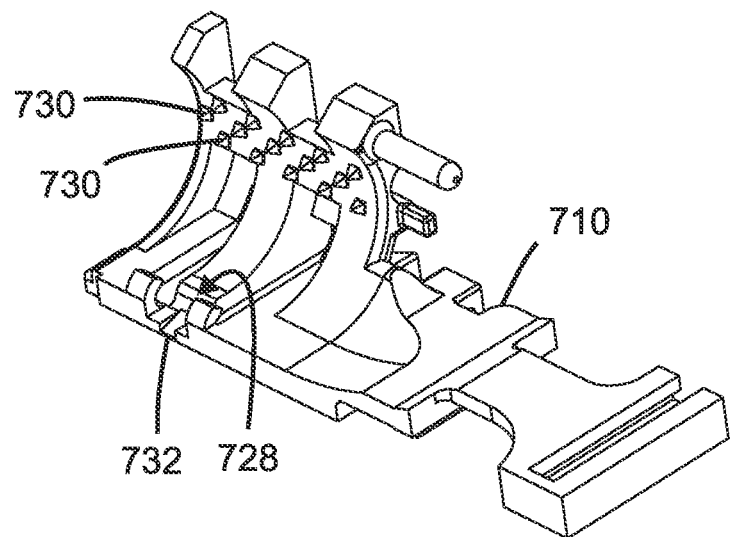
FIG. 59 is a perspective view of the cable fixation body of the assembly of FIG. 58.
Figure 60:
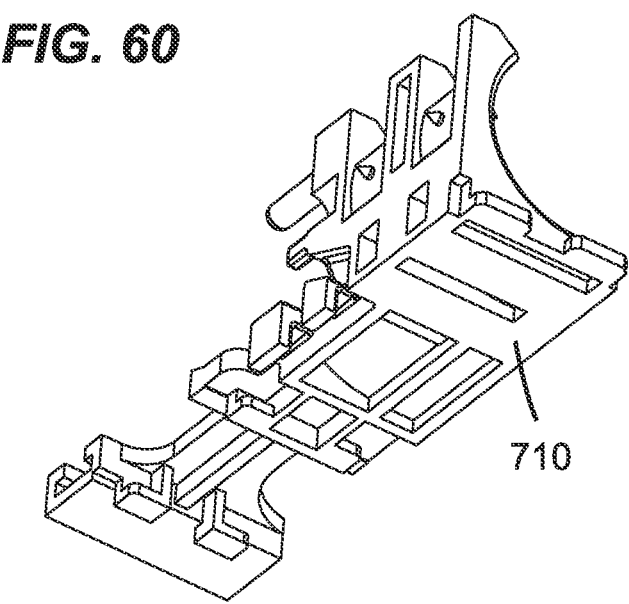
FIG. 60 is a further perspective view of the cable fixation body of FIG. 59.
Figure 61:
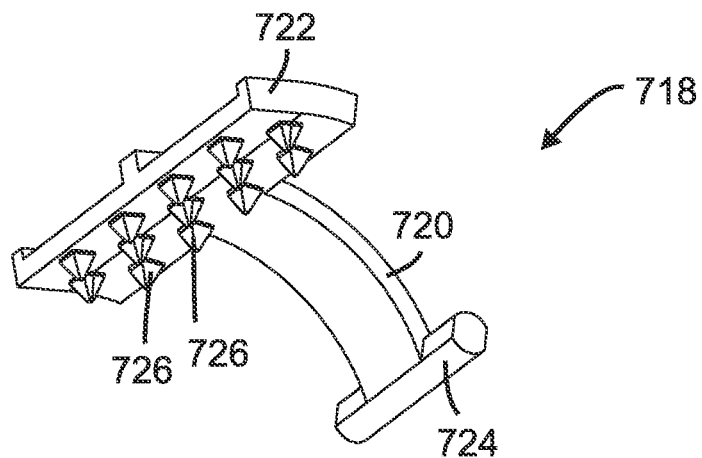
FIG. 61 is a perspective view of the jacket clamp support of the assembly of FIG. 58.
Figure 62:
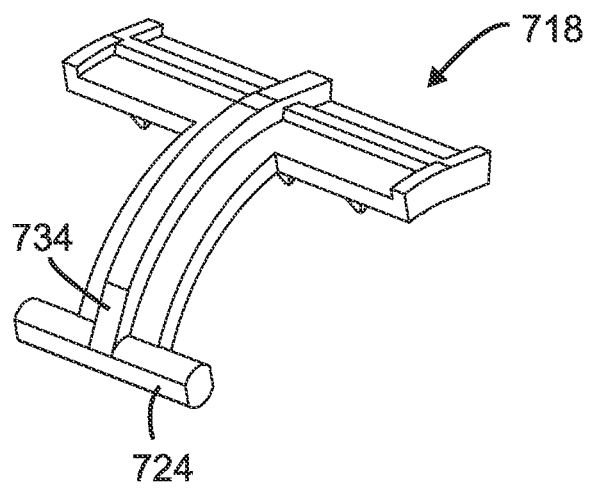
FIG. 62 is a further perspective view of the jacket clamp support of FIG. 61.

Referring now to FIGS. 58-62, a further example cable fixation assembly 700 is shown. In FIG. 58, the assembly 700 is fixing a cable 702. The assembly extends from a proximal end 704 to a distal end 706 along an axis 708. The cable fixation assembly 700 includes features similar to one or more other cable fixation assemblies described herein, and the following discussion will be limited primarily to features of the assembly 700 that do not overlap with one or more other cable fixation assemblies described herein.

The cable fixation assembly 700 includes a cable fixation body 710, a cable fixation portion 712, and a strength member fixation portion 714.

The cable fixation portion 712 includes a portion of the body 710, two cable jacket clamps 716 (e.g., hose clamps), and a jacket clamp support 718.

The body 710 is configured to mount to one or more of the plates or plate members described herein.

The cable fixation portion 712 is configured to secure a relatively thick (in dimension transverse to the axis 708) cable, such as the cable 702. Due to the heft of such thick cables, multiple hose clamps 716 are used to clamp the cable jacket 703 to the body 710. In addition, for further robustness of the clamping of the jacket 703, the jacket clamp support 718 is provided.

The jacket clamp support 718 includes a curved arm 720, a clamp portion 722, and a hinge pin 724. The clamp portion 722 includes teeth 726 configured to dig into the cable jacket 703. The teeth 726 can substantially oppose the teeth 730 of the body 710, which perform the same function as the teeth 726 on the other side of the cable 702. The body includes a socket 728 configured to pivotally receive the hinge pin 724 such that the support 718 can pivot about a pivot axis 731 that is parallel to the axis 708. A notch 732 receives a rib 734 of the curved arm 720 and acts a pivot stop for the support 718.

Pivoting about axis 731 by the support 718 allows the support 718 to be adjusted to different cable thicknesses. The configuration of the support 718 distributes the clamping force of the cable clamps 716 to more securely clamp the cable 702. In some examples, the support 718 is constructed of electrically conductive material (e.g., metal).

Figure 63:
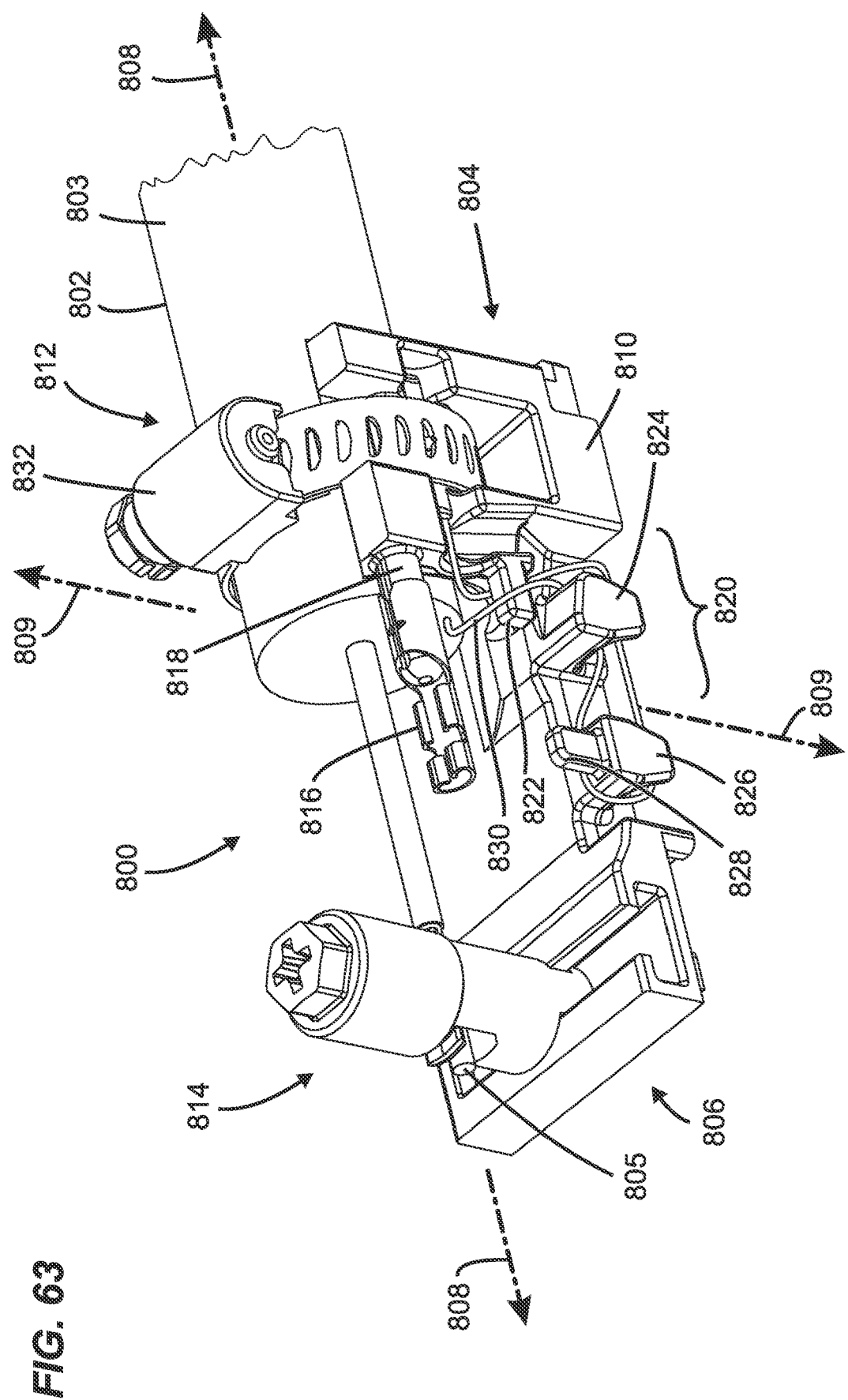
FIG. 63 is a perspective view of a further example cable fixation assembly according to the present disclosure, including a cable.
Figure 64:
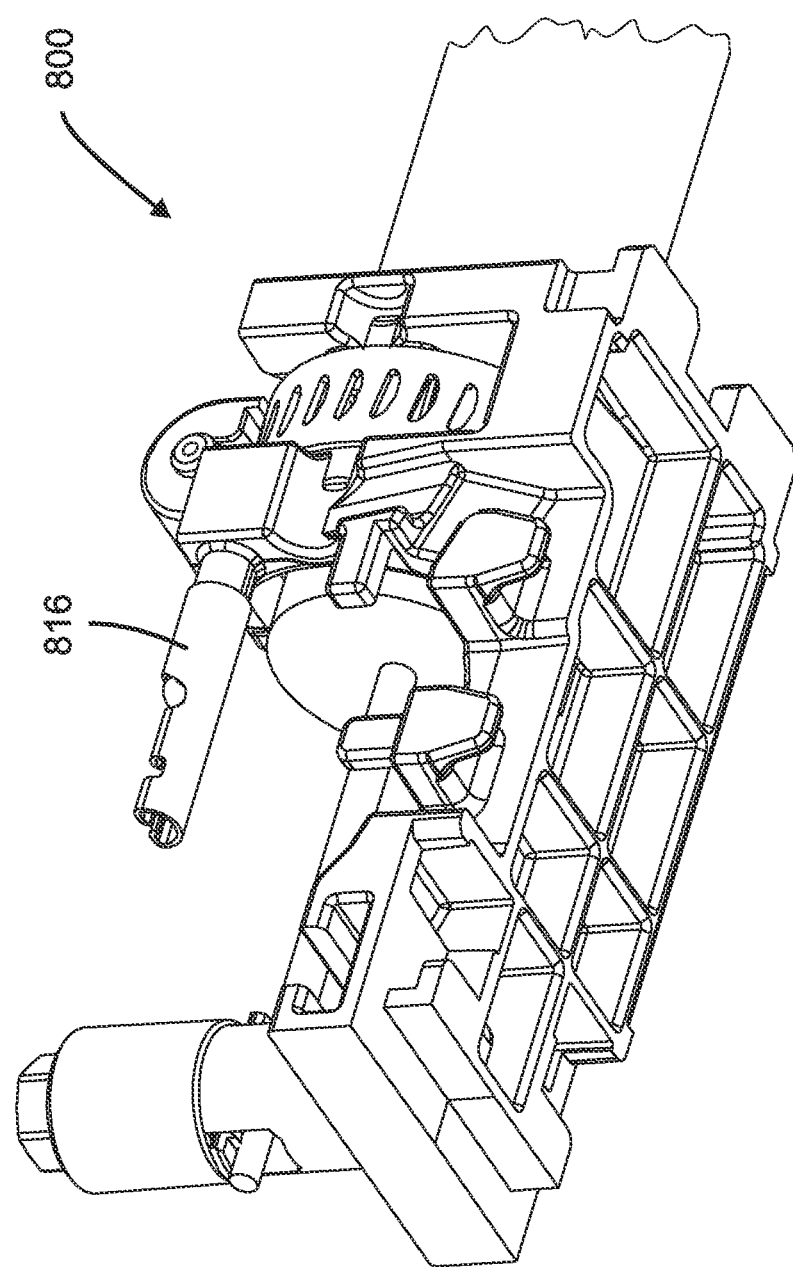
FIG. 64 is a further perspective view of the cable fixation assembly of FIG. 62.
Figure 65:
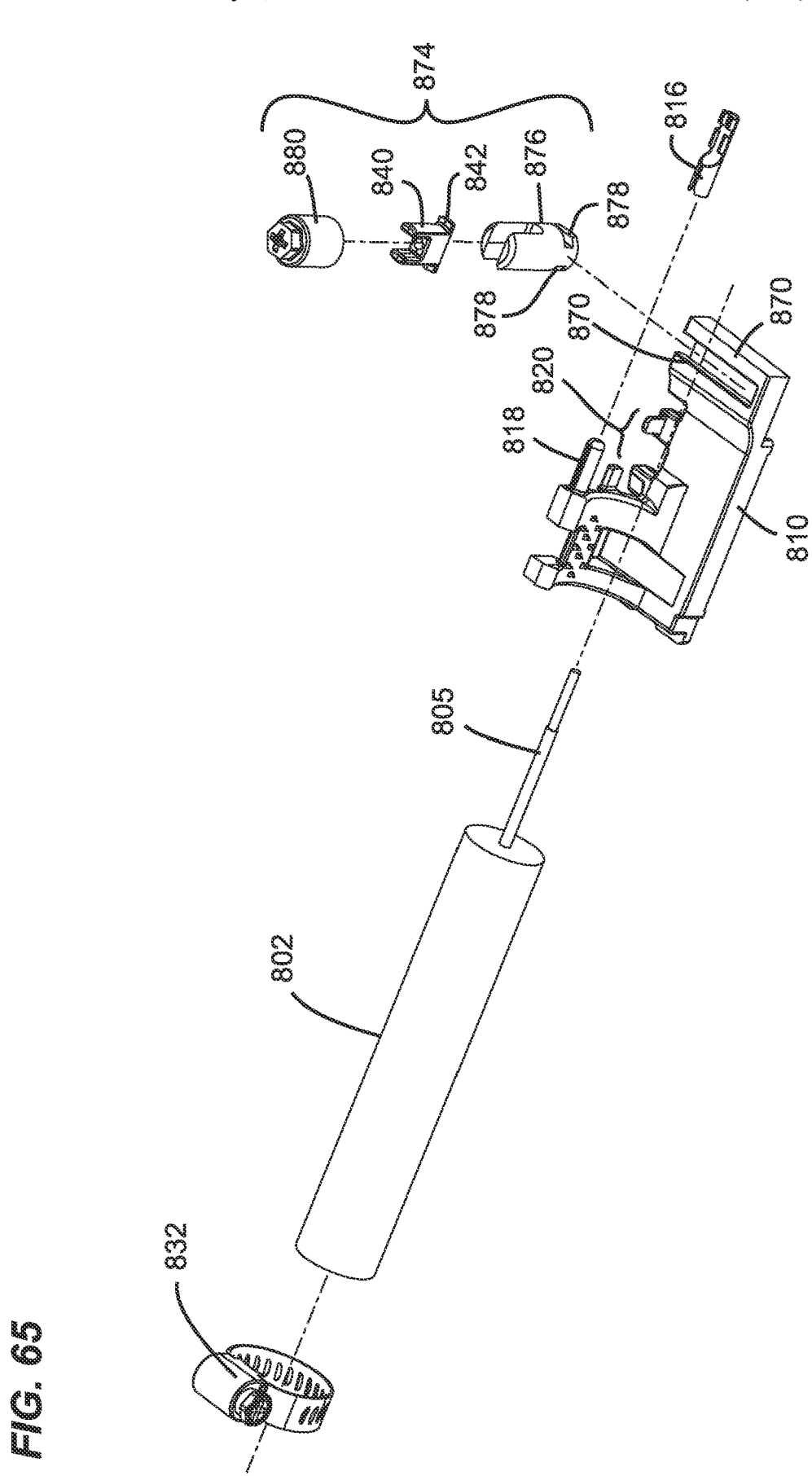
FIG. 65 is a partially exploded view of the cable fixation assembly of FIG. 63.
Figure 66:
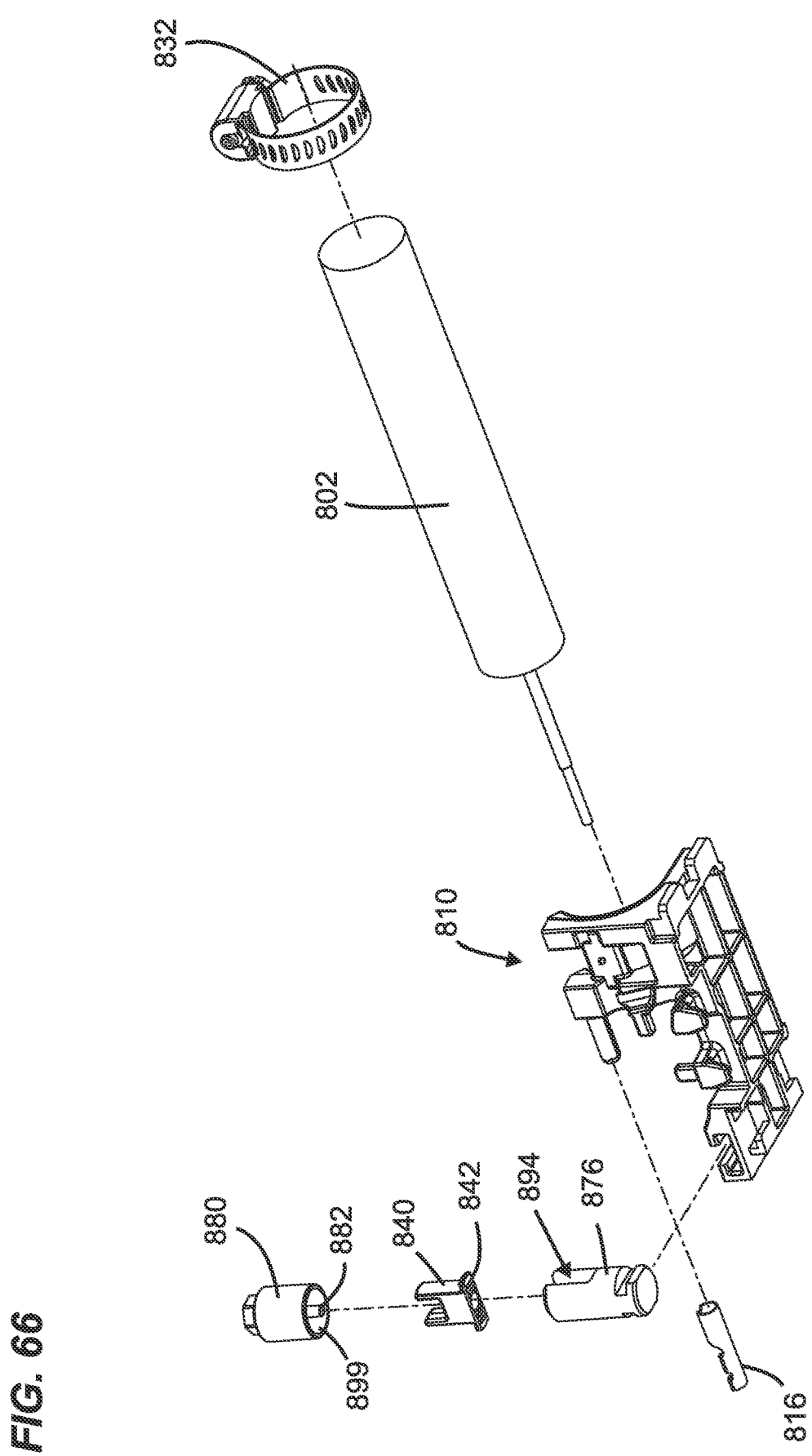
FIG. 66 is a further partially exploded view of the cable fixation assembly of FIG. 63.

Referring to FIGS. 63-66, a further example cable fixation assembly 800 is shown. In FIG. 63, the assembly 800 is fixing a cable 802. The assembly extends from a proximal end 804 to a distal end 806 along an axis 808. The assembly 800 extends vertically along an axis 809 that is perpendicular to the axis 808. The cable fixation assembly 800 includes features similar to one or more other cable fixation assemblies described herein, and the following discussion will be limited primarily to features of the assembly 800 that do not overlap with one or more other cable fixation assemblies described herein.

The cable fixation assembly 800 includes a cable fixation body 810, a cable fixation portion 812, and a strength member fixation portion 814.

An electrically conductive connector 816 is frictionally fit or crimped to the grounding post 818. A grounding conductor can be secured to the connector 816.

The body 810 includes a yarn post arrangement 820 that includes a plurality of posts. The arrangement 820 includes posts 822, 824, 826, and 828. Each post projects from a fixed end of the post to a free end of the post. The configuration of the arrangement 820 can support a plurality of different winding configurations for strength yarn 830 of the cable 802. Winding the strength yarn around the posts of the arrangement 820 can, advantageously, secure the yarn without pulling on it tightly. That is, due to the winding configuration, the yarn is fixed without having to pull it detrimentally tightly.

An example winding configuration of the yarn 830 using the arrangement 820 is shown in FIG. 63. The yarn 830 extends from the jacketed portion of the cable 802, and is then routed over the post 822, then under the post 824, then behind the post 828 while above the post 826, then behind the post 826, then behind the post 824, then behind the post 822 and then to the cable clamp 832, which can secure a free end portion of the yarn 830 to the body 810 and/or the cable jacket 803. Alternative routing configurations for the yarn 830 are possible using the arrangement 820.

The posts of the arrangement 820 project to their respective free ends in three different directions relative to a plane defined by the axes 808 and 809. The post 828 projects upward and parallel to the axis 809. The posts 826 and 824 project downward and parallel to the axis 809. The post 822 projects parallel to the axis 808. Having the posts project in different directions can accommodate yarn routing configurations having the benefits described above.

In some examples, all of the posts project to their free ends in a single plane, e.g., a plane parallel to a plane defined by the axes 808 and 809.

The assembly 800 includes a strength member fixation subassembly 874 for anchoring a rigid strength rod, strength yarn (e.g., aramid yarn), or both a rod and yarn. As with the subassembly 474 described above, the subassembly 874 can be selectively included in the overall assembly. Depending on the cable and strength member characteristics, the subassembly 874 may not be needed or appropriate and can be advantageously dispensed with entirely in some use applications, due to the manner in which it mounts to the body 810.

The subassembly 874 includes a lower strength member clamp body 876 defining opposing shoulders 878 configured to couple to and slide along the tracks 870 to adjust a transverse position of the strength member fixation subassembly 874. The subassembly 874 also includes an upper strength member clamp body 880 that includes a press pin 882. Interior threads of the upper strength member clamp body 880 cooperate with exterior threads of the lower strength member clamp body 876 to allow rotational advancement of the upper clamp body towards the lower clamp body.

The transverse position (perpendicular of the lower clamp body 876) can be set relative to the tracks 870 by clamping of a cable strength rod 805 in the subassembly 874.

The lower clamp body 876 includes a channel 894. The strength rod 805 of the cable 802 is received in the channel 894.

The subassembly 874 also includes a press block 840 having a unitarily integrated press plate 842. The press block 840 is positioned in the channel 894 such that the press plate 842 is positioned directly above the strength rod 805.

The upper strength member clamp body 880 is threadably screwed onto the lower clamp body 876, causing the press pin 882 and other portions of the upper clamp body 880 to press on the upper side of the press plate 842 and thereby anchor the strength rod 805 within the channel 894. The block 840 is a robust part that can resist deformation by the clamping action of the clamping bodies above and below it. The block 840 is shaped and configured to be positioned within a cavity 899 defined by the upper strength member clamp body 880.

The transverse slidable cooperation between the lower clamp body 876 and the tracks 870 can advantageously allow for improved longitudinal alignment of the strength member fixation subassembly 874 for strength rods of different cables.

Figure 68:
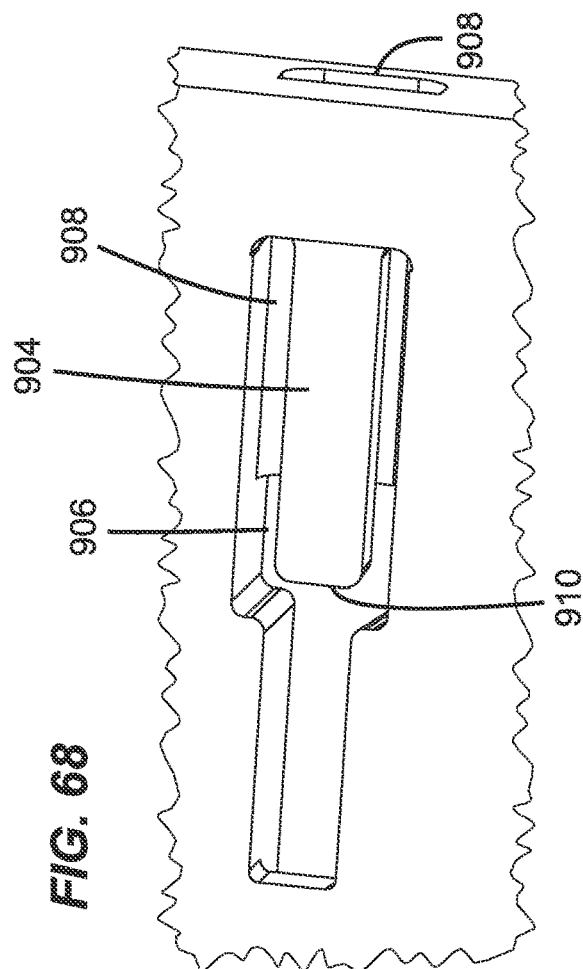
FIG. 68 is an enlarged view of the called-out region in FIG. 67.
Figure 67:
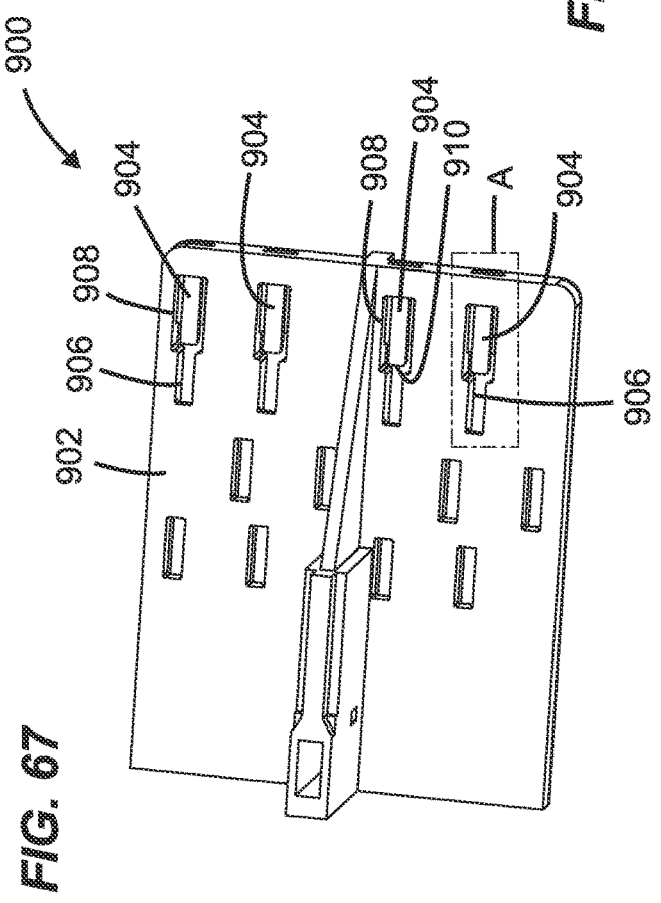
FIG. 67 is a perspective view of a further example base plate for mounting cable fixation bodies according to the present disclosure.

Referring to FIGS. 67 and 68, a further example base plate 900 for mounting cable fixation bodies is shown. FIG. 68 is an enlarged view of the called out portion A of FIG. 67.

The base plate 900 includes features similar to one or more other base plate assemblies and members described herein, and the following discussion will be limited primarily to features of the base plate 900 that do not overlap with one or more base plate assemblies.

Spring elements 904 can be unitarily integrated with the plate member 902. The spring elements 904 cooperate with the corresponding through slots 906 to lock hooked members of cable fixation bodies to the plate member 902, as described herein. To install and remove a cable fixation body, one or more of its hooked members must clear the free end 910 of the corresponding spring element(s) 904. To do this, the free ends 910 of the corresponding spring element(s) 904 are flexed downward toward a wall 908 that is positioned within the corresponding through slot 906. The wall(s) 908 can be unitarily integrated with the plate member 902. The wall(s) 908 can advantageously serve as a flexion stop that can minimize (e.g., inhibit) over flexing of the flex spring elements 904 when installing and removing cable fixation bodies to or from the plate member 902, thereby minimizing unwanted breakage or loss of resiliency over time of the spring elements 904.

From the foregoing detailed description, it will be evident that modifications and variations can be made in the devices of the disclosure without departing from the spirit or scope of the invention.

What is claimed is:

1. A cable fixation assembly, comprising:
   a cable fixation body including a cable jacket fixation portion and a strength member fixation portion, the cable jacket fixation portion including first teeth configured to dig into a jacket of a cable, the cable jacket fixation portion being configured to couple to a jacket clamp, the cable jacket fixation portion defining a socket;
   a jacket clamp component configured to be received in the socket to adjustably couple the jacket clamp component to the cable jacket fixation portion, the jacket clamp component including second teeth configured to dig into the jacket of the cable; and
   a strength member fixation component configured to adjustably couple to the strength member fixation portion.

2. A cable fixation assembly, comprising:
   a cable fixation body including a cable jacket fixation portion and a strength member fixation portion, the cable jacket fixation portion including first teeth configured to dig into a jacket of a cable, the cable jacket fixation portion being configured to couple to a jacket clamp;
   a jacket clamp component configured to adjustably couple to the cable jacket fixation portion, the jacket clamp component including second teeth configured to dig into the jacket of the cable; and
   a strength member fixation component configured to adjustably couple to the strength member fixation portion,
   wherein the strength member fixation portion includes a track; and
   wherein the strength member fixation component is configured to slide along the track to adjust a position of the strength member fixation component relative to the cable fixation body.

3. The cable fixation assembly of claim 2, wherein the cable fixation body defines two tracks.

4. The cable fixation assembly of claim 1, wherein the jacket clamp component and the strength member fixation component are separate pieces that are configured to separately couple to the cable fixation body.

5. The cable fixation assembly of claim 1, wherein the jacket clamp component is configured to pivotally couple to the socket of the cable fixation body.

6. The cable fixation assembly of claim 1, wherein the jacket clamp component includes a curved arm and a clamp portion, the clamp portion including the second teeth.

7. The cable fixation assembly of claim 1, further comprising the jacket clamp, the jacket clamp configured to fully surround a portion of the cable fixation body, a portion of the jacket clamp component, and the cable jacket of the cable to clamp the cable to the cable jacket fixation portion of the cable fixation body.

8. The cable fixation assembly of claim 7, further comprising the cable.

9. The cable fixation assembly of claim 7, wherein the cable clamp is a hose clamp.

10. The cable fixation assembly of claim 1, wherein the jacket clamp component is constructed of electrically conductive material.

11. The cable fixation assembly of claim 10, wherein the material includes a metal.

12. The cable fixation assembly of claim 1, wherein the second teeth are configured to oppose the first teeth when the cable jacket is fixed by the cable fixation assembly.

13. The cable fixation assembly of claim 1, wherein the strength member fixation component includes a surface configured to support a strength rod of the cable.

14. The cable fixation assembly of claim 13, further comprising a strength member clamp body configured to cooperate with the strength member fixation component to clamp the strength rod of the cable.

15. The cable fixation assembly of claim 14, wherein the strength member clamp body includes a press pin and a thread, the thread being configured to threadably couple to the strength member fixation component.

16. A cable fixation assembly, comprising:
   a cable fixation body including a cable jacket fixation portion and a strength member fixation portion, the cable jacket fixation portion being configured to couple to a jacket clamp and including first teeth configured to dig into a jacket of a cable, the strength member fixation portion including a track;
   a jacket clamp component configured to adjustably couple to the cable jacket fixation portion, the jacket clamp component including second teeth configured to oppose the first teeth when the jacket clamp component is coupled to the cable fixation body, the second teeth being further configured to dig into the jacket of the cable, the jacket clamp component being constructed of an electrically conductive material, the material including a metal;
   a strength member fixation component configured to slide along the track to adjust a position of the strength member fixation component relative to the cable fixation body, the strength member fixation component including a surface configured to support a strength rod of the cable; and
   a strength member clamp body configured to cooperate with the strength member fixation component to clamp the strength rod of the cable.

17. The cable fixation assembly of claim 16, further comprising the jacket clamp, the jacket clamp configured to fully surround a portion of the cable fixation body, a portion of the jacket clamp component, and the cable jacket of the cable to clamp the cable to the cable jacket fixation portion of the cable fixation body.

18. The cable fixation assembly of claim 16, wherein the jacket clamp component and the strength member fixation component are separate pieces that are configured to separately couple to the cable fixation body.

* * * * *